United States Patent [19]
Shinohara et al.

[11] Patent Number: 5,956,454
[45] Date of Patent: *Sep. 21, 1999

[54] DIGITAL VTR

[75] Inventors: Junko Shinohara; Tomohiro Ueda; Sadayuki Inoue; Masako Asamura; Ken Onishi, all of Nagaokakyo, Japan

[73] Assignee: Mitsubishi Denki Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/532,308

[22] Filed: Sep. 22, 1995

[30] Foreign Application Priority Data

Sep. 26, 1994 [JP] Japan .................................. 6-230064
Sep. 26, 1994 [JP] Japan .................................. 6-230065

[51] Int. Cl.$^6$ .............................. H04N 5/91; H04N 5/917
[52] U.S. Cl. .............................................. 386/68; 386/109
[58] Field of Search .................................. 358/335, 342, 358/310, 312; 360/33.1, 10.1, 10.2, 10.3, 32; 348/384; 386/109, 111, 112, 33, 27, 67, 68, 69, 6, 7; H04N 5/91, 5/917

[56] References Cited

U.S. PATENT DOCUMENTS 5,282,049  1/1994  Hatakenaka et al. ................. 386/68
5,377,051  12/1994  Lane et al. ............................ 360/33.1
5,386,213  1/1995  Haupt et al. ........................... 341/67

OTHER PUBLICATIONS

HDTV '93, International Workshop on HDTV '93, Proceedings, vol. II, Oct. 26–28, 1993, "A Recording Method of ATV data on a Consumer Digital VCR," Yanagihara et al.

*Primary Examiner*—Robert Chevalier

[57] ABSTRACT

In a digital VTR which receives at least a digital video signal input in the form of a bit stream, and which records the bit stream according to a transparent recording method, header information is extracted from the bit stream and modified. Intra-coded block components are also detected and extracted from the bit stream, and one track is configured with an area for recording the input bit stream and an area for recording fast playback HP data. Extracted as the intra-coded block components are a predefined number of orthogonal transform coefficients, and the fast playback HP data is configured without appending EOB codes to the intra-coding block components. Alternatively, EOB codes are appended except that the shortest EOB code from a plurality of code maps is used. The digital VTR also records more than one fast playback signal in predefined regions on predefined tracks such that a first playback signal is recorded in an area at one location on one track, while a second playback signal is recorded in a plurality of areas on a track adjacent thereto.

38 Claims, 47 Drawing Sheets

FIG.3A

| VARIABLE LENGTH | RUN | LEVEL |
|---|---|---|
| 10 | End of block | |
| 1s(*) | 0 | 1 |
| 11s(**) | 0 | 1 |
| 011s | 1 | 1 |
| 0100s | 0 | 2 |
| 0101s | 2 | 1 |
| 0010 1s | 0 | 3 |
| 0011 1s | 3 | 1 |
| 0011 0s | 4 | 1 |
| 0001 10s | 1 | 2 |
| 0001 11s | 5 | 1 |
| 0001 01s | 6 | 1 |
| 0001 00s | 7 | 1 |
| 0001 110s | 0 | 4 |
| 0001 100s | 2 | 2 |
| 0001 111s | 8 | 1 |
| 0001 101s | 9 | 1 |
| 0000 01 | Escape | |
| 0010 0110s | 0 | 5 |
| 0010 0001s | 0 | 6 |
| 0010 0101s | 1 | 3 |
| 0010 0100s | 3 | 2 |
| 0010 0111s | 10 | 1 |
| 0010 0011s | 11 | 1 |
| 0010 0010s | 12 | 1 |
| 0010 0000s | 13 | 1 |
| 0000 0010 10s | 0 | 7 |
| 0000 0011 00s | 1 | 4 |
| 0000 0010 11s | 2 | 3 |
| 0000 0011 11s | 4 | 2 |
| 0000 0010 01s | 5 | 2 |
| 0000 0011 10s | 14 | 1 |
| 0000 0011 01s | 15 | 1 |
| 0000 0010 00s | 16 | 1 |

FIG.3B

| VARIABLE LENGTH | RUN | LEVEL |
|---|---|---|
| 0110 | End of block | |
| 10s | 0 | 1 |
| 010s | 1 | 1 |
| 110s | 0 | 2 |
| 0010 1s | 2 | 1 |
| 0111 s | 0 | 3 |
| 0011 1s | 3 | 1 |
| 0001 10s | 4 | 1 |
| 0011 0s | 1 | 2 |
| 0001 11s | 5 | 1 |
| 0000 110s | 6 | 1 |
| 0000 100s | 7 | 1 |
| 1110 0s | 0 | 4 |
| 0000 111s | 2 | 2 |
| 0000 101s | 8 | 1 |
| 1111 000s | 9 | 1 |
| 0000 01 | Escape | |
| 1110 1s | 0 | 5 |
| 0001 01s | 0 | 6 |
| 1111 001s | 1 | 3 |
| 0010 0110s | 3 | 2 |
| 1111 010s | 10 | 1 |
| 0010 0001s | 11 | 1 |
| 0010 0101s | 12 | 1 |
| 0010 0100s | 13 | 1 |
| 0001 00s | 0 | 7 |
| 0010 0111s | 1 | 4 |
| 1111 1100s | 2 | 3 |
| 1111 1101s | 4 | 2 |
| 0000 0010 0s | 5 | 2 |
| 0000 0010 1s | 14 | 1 |
| 0000 0011 1s | 15 | 1 |
| 0000 0011 01s | 16 | 1 |

FIG.10
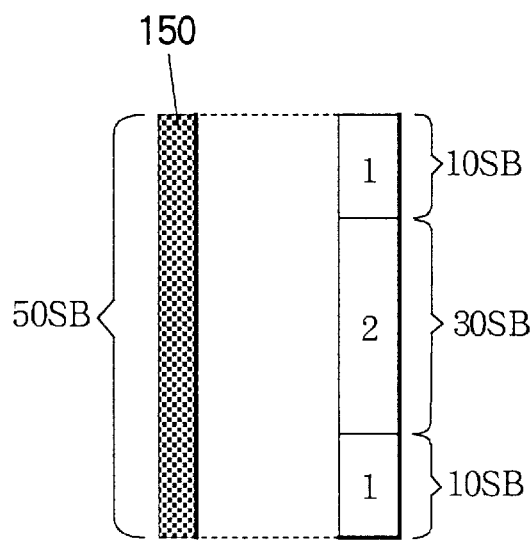
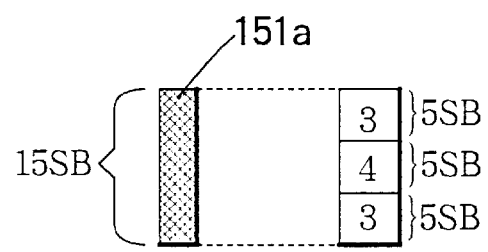
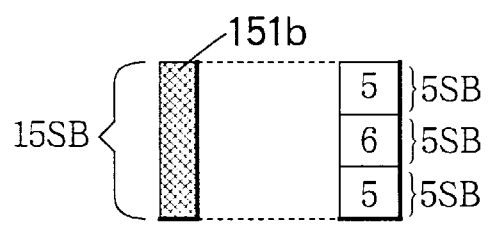
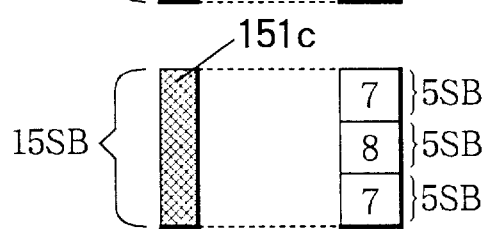
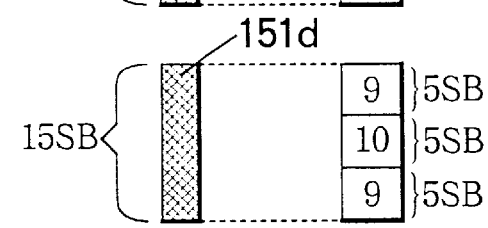

FIG.11

|  | 2× | 4× | 8× | 16× |
|---|---|---|---|---|
| 9000rpm SYSTEM | 186SB | 62SB | 26SB | 12SB |
| 4500rpm SYSTEM | 93SB | 31SB | 13SB | 6SB |

1 FRAME

NORMAL PLAYBACK

FAST PLAYBACK

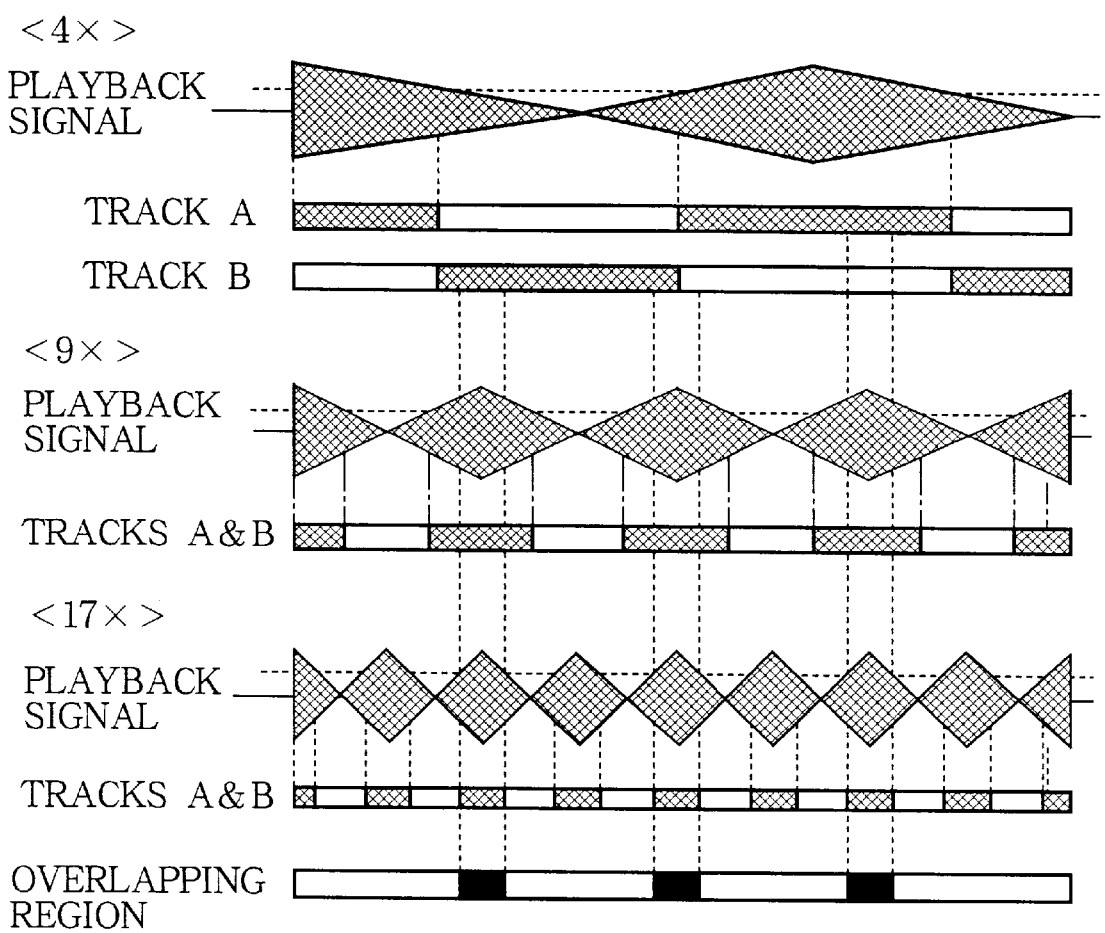

FIG. 53A
PRIOR ART

B A B A B A B A B A B A
   HEAD A     HEAD B

FIG. 53B
PRIOR ART

B A B A B A B A B A B A
   HEAD A     HEAD B

FIG. 54
PRIOR ART

SYNC BLOCK NUMBER
0,1,2, ······   ······ 134

TRACK

SYNC BLOCK NUMBER   201 VIDEO AREA
0   16  27    60  70    103  114

▩ MAIN AREA 220
☐ DUPLICATUON AREA 221

DIGITAL VTR

BACKGROUND OF THE INVENTION

This invention relates to a digital video tape recorder (VTR) having a track format in which digital video and audio signals are recorded in predefined areas on helical tracks, wherein digital video and audio signals are input in the form of a bit stream, and are recorded.

FIG. 46 shows the track pattern of an ordinary consumer digital VTR. In the figure, helical tracks are formed on a magnetic tape 200, each being divided into a video area 201 for recording digital video signals and an audio area 202 for recording digital audio signals.

There are two ways of recording video and audio signals on this consumer digital VTR. One is baseband recording wherein analog video and audio signals are input and high-efficiency coding is performed on them. The other is transparent recording wherein a digitally transmitted bit stream is recorded.

The latter, transparent recording is more suitable for recording ATV (advanced television) signals now being discussed in the U.S.A. This is because ATV signals are already digitally compressed, do not require a high efficiency coder or decoder, and can be recorded as they are, with no picture quality deterioration. The problem however is picture quality during special playback such as fast, still and slow playback. Specifically, almost no pictures are reproduced during fast playback if a bit stream is recorded on the helical tracks as they are.

One method of using a digital VTR to record these ATV signals is described in a "A Recording Method of ATV Data on a Consumer Digital VCR", a technical presentation given at the "International Workshop on HDTV '93 held from 26–28 October, 1993 at Ottawa, Canada. This technique will now be described as an example of the prior art.

According to one basic specification of a prototype consumer digital VTR, in the SD (Standard Definition) mode, one video frame is recorded in video areas of 10 tracks if the recording rate of the digital video signal is 25 Mbps and the field frequency is 60 Hz. If the data rate of an ATV signal is 17–18 Mbps, therefore, ATV signals can be recorded in this SD mode transparently.

FIG. 47A and FIG. 47B respectively show the head traces of a rotary head during normal playback and fast playback of a consumer digital VTR. In the figure, tracks are recorded slantwise by heads having different azimuth angles. During normal playback, the tape transport speed is the same as in recording, so the head traces the recorded tracks as shown in FIG. 47A. During fast playback however, the tape speed is different so the head cuts across several tracks and can only reproduce fragments of tracks having the same azimuth. FIG. 47B shows the case for 5 times speed playback (5× speed playback).

In an MPEG bit stream, only intra-encoded blocks are decoded independently, without referring to other frames. Assuming the MPEG2 bit stream is sequentially recorded on each track, intra-encoded data will be separated from intermittently reproduced data during fast playback, and the image will be reconstructed only from this separated intra-encoded data. The reproduced area on the screen will be discontinuous, and block fragments will be scattered over the screen. Further, as the bit stream is variable length encoded, there is no guarantee that the whole screen will be periodically updated, and some parts may not be updated for long periods. As a result, the image quality during fast playback is unsatisfactory, and is unsuitable for consumer digital VTR.

FIG. 48 is a block diagram of a conventional bit stream recording device that is capable of fast playback. Here, the video area of each track is divided into a main area for recording the bit stream of the whole ATV signal, and a duplication area for recording important parts of the bit stream (HP data) used in reconstructing the image during fast playback. During fast playback, only intra-encoded blocks are effective so these are recorded in the duplication area. However to further reduce the amount of data, low frequency components are extracted from all intra-encoded blocks and recorded as HP data. In FIG. 48, an input terminal 1 is for receiving the bit stream. An output terminal 2 is for outputting the bit stream. An output terminal 3 is for outputting the HP data.

The MPEG2 bit stream is input via the input terminal 1, output via the output terminal 2 and sequentially recorded in the main area. The bit stream from the input terminal 1 is also input to a variable length encoder 210, where the syntax of the MPEG2 bit stream is analyzed, and intra-images are detected, timing is generated by a counter 211. Low frequency components are extracted from all blocks in the intra-images by a data extractor 212, and EOB's are appended by an EOB (End of Block) appending circuit 213 so as to construct HP data which is recorded in the duplication area.

FIG. 49A and FIG. 49B are schematic diagrams showing the basic functions in the playback. During normal playback, all of the bit stream recorded in the main area 220 is reproduced and output to the MPEG2 decoder outside the digital VTR, while the HP data recorded in the duplication area 221 is discarded, as shown in FIG. 49A. On the other hand, during fast playback, only the HP data in the duplication area 221 is collected and sent to the decoder, while the bit stream in the main area 220 is discarded, as shown in FIG. 49B.

FIG. 50A and FIG. 50B show an example of head trace during fast playback. When the data speed is an integer multiple and phase-locked state is maintained, head scanning is synchronized with tracks having the same azimuth and the positions from which data is reproduced are fixed. In the figure, assuming that useful data is obtained from a part of the playback signal having an output level higher than −6 dB, the hatched areas will be reproduced by one head. FIG. 50A and FIG. 50B show the case of 9 times speed (9×speed), so signal reading of this hatched area is guaranteed at 9×speed. The HP data may therefore be recorded in this area. At other speeds however, signal reading is not guaranteed. The areas where the HP data is recorded must thus be chosen so that it can be read at any of several tape speeds.

FIG. 51 shows examples of scanning areas for three tape speeds at which the head is synchronized with tracks having the same azimuth, and overlapping areas (at the bottom of FIG. 51) at the three fast playback speeds (the areas which are reproduced at any of the three fast playback speeds). The locations where a duplication area is formed is selected from these overlapping areas, in such a manner that reading of HP data at different tape speeds is guaranteed. FIG. 51 shows the case of 4×, 9× and 17×speed, forward playback, but these scanning areas are the same as those for −2×, −7× and −15× speed playback (i.e., 2, 7 and 15 times reverse speed).

However, it is impossible for the head to trace exactly the same area at several tape speeds due to the fact that the number of tracks the head cuts across depends on the tape speed. Also, the head must be able to trace from any identical-azimuth track. FIG. 52 shows head traces at different tape speeds. FIG. 52 shows 5× and 9×speed head scanning trace in a conventional VTR. In the figure, areas 1, 2, 3 are selected from 5×and 9×speed overlapping areas. By repeatedly recording the same HP data on 9 tracks, the HP data can be read at either 5 or 9 times speed.

FIG. 53A and FIG. 53B show example of head traces at five 5×speed playback. As seen from FIG. 53A and FIG. 53B, by repeatedly recording identical HP data over the number of tracks equal to the speed multiplier (ratio of the fast playback speed to normal playback speed), the HP data can be reproduced by means of a head in synchronism with the track of the same azimuth. By repeating the duplication of HP data over the number of tracks equal to the speed multiplier corresponding to the maximum playback speed (the maximum of the fast playback speeds), the HP data can be reproduced at any playback speed, either in forward or reverse direction.

FIG. 54 shows examples of main and duplication areas. In a consumer digital VTR, the video area of each track comprises 135 sync blocks, the main area comprises 97 sync blocks and the duplication area comprises 32 sync blocks. For the duplication areas, overlapping areas corresponding to the 4×, 9×, and 17×speed playback shown in FIG. 51 are selected. In this case, the data rate for the main area is approx. 17.46 Mbps and as the same data is recorded 17 times in the duplication area, the data rate for the duplication areas is approx. 338.8 kbps.

As the conventional VTR has the construction described above, the data recorded in the duplication area 221 is always provided with an EOB. If the EOB code consists of four bits, four times the number of blocks per picture, i.e., 4×46,080=184,320 bits are required.

The number of bits per picture is given by 1920 pels×1024 lines for 4:2:0 luminance/color difference components signals.

The EOB code indicates the end of the data of each DCT block, and is not directly related to the quality of the picture. It is undesirable to use 184,320 bits of the duplication areas 221 for the EOB codes which do not directly contribute to the quality of the picture.

In addition, when the track is non-linear or the scanning trace is non-linear during fast playback, or when there is an error in the recording start point on the track at the lower edge of the tape, the data in the fast playback region corresponding to these parts are not reproduced.

Moreover, since the data in a plurality of fast playback regions needs to be reproduced during one scan of the head, playback cannot be conducted at speeds which do not satisfy the above requirement. There is thus a limitation as to the speeds at which the fast playback is achieved.

Moreover, the rotation speed of the drum of a four-head configuration is half the the rotation speed of the drum of a two-head configuration, so that the angle between the scanning trace and the track is larger with the four-head drum, and the data in the fast playback regions which is reproduced with the two-head drum at a certain speed can be reproduced with the four-head drum at a speed half that of said certain speed.

Furthermore, since the fast playback data for all the playback speeds are used in common, and since the interval at which one frame of image data is reproduced and displayed at each fast playback speed depends on the time taken by the head to pass the region in the longitudinal direction of the tape in which one frame of image data is recorded, and the above-mentioned interval is therefore inversely proportional to the tape transport speed. It is thus difficult to display images which is easy to see at all the playback speeds.

SUMMARY OF THE INVENTION

This invention has been conceived to overcome the above problems and aims at providing a system for recording certain of the DCT coefficients in duplication areas, or recording a predefined number of variable length codes in the duplication areas, in which the duplication areas can be effectively utilized, and the header information and the playback bit stream are not contradictory.

Another object of the invention is to provide a magnetic recording/playback device which can reproduce fast playback data without fail, even when the track or the scanning trace is non-linear, or when the recording start position at the lower edge of the tape is erroneous.

Another object of the invention is to provide a magnetic recording/playback device which is capable of fast playback at a multiplicity of speeds, and which is convenient to use.

Another object of the invention is to provide a magnetic recording/playback device which is capable of fast playback at the same speed regardless of whether the drum is of the two-head configuration or the four-head configuration.

A further object of the invention is to provide a magnetic recording/playback device which can renew or update the displayed picture at a predefined, suitable interval regardless of the speed of the fast playback.

According to one aspect of the invention, there is provided a digital VTR which receives at least a digital video signal input in the form of a bit stream, and which records the bit stream in a transparent recording method, comprising:

means for extracting header information from the bit stream;

means for modifying the header information;

means for detecting and extracting intra-coded block components from the bit stream; and means for configuring one track with an area for recording the input bit stream and an area for recording fast playback HP data;

said extracting means extracting, as said intra-coded block components, a predefined number of orthogonal transform coefficients; and said configuring means configuring the fast playback HP data without appending EOB codes to the said intra-coded block components.

With the above configuration, it is possible to efficiently record the bit stream of the digital video signal in the area (duplication area) for recording the fast playback data.

Accordingly, it is possible to reduce the EOB codes, and more DCT blocks can be recorded in the given recording area.

It may so arranged that said extracting means extracts only the DC components of the orthogonal transform coefficients, as said intra-coded block components.

An additional advantage of the above arrangement is that the interval of refresh can be shortened.

It may so arranged that components of the playback bit stream formed from HP data during fast playback is made up of a predefined number of orthogonal transform coefficients, and said VTR further comprises means for playing back by appending EOB codes to said components of the bit stream.

It may so arranged that the digital VTR further comprises means for separating the bit stream into the bit stream from the main area and the bit stream from the duplication area, and transmitting the bit stream to a decoder depending on the playback mode.

According to another aspect of the invention, there is provided a digital VTR which receives at least a digital video signal input in the form of a bit stream, formed of variable-length codes, and which records the bit stream in a transparent recording method, comprising:

means for extracting header information from the bit stream;

means for modifying the header information;

means for detecting and extracting intra-coded block components from the bit stream; and means for configuring one track with an area for recording the input bit stream and an area for recording fast playback HP data, said extracting means extracting, as said intra-coded block components, a predefined number of variable-length codes; and said configuring means configuring the fast playback HP data without appending EOB codes to said intra-coded block components.

With the above configuration, it is possible to efficiently record the bit stream of the digital video signal in the area (duplication area) for recording the fast playback data.

Accordingly, it is possible to reduce the EOB codes, and more DCT blocks can be recorded in the given recording area.

It may so arranged that components of the playback bit stream formed from HP data during fast playback is made up of a predefined number of orthogonal transform coefficients, and said VTR further comprises means for playing back by appending EOB codes to said components of the bit stream.

It may so arranged that the digital VTR further comprises means for separating the bit stream into the bit stream from the main area and the bit stream from the duplication area, and transmitting the bit stream to a decoder depending on the playback mode.

According to another aspect of the invention, there is provided a digital VTR which receives at least a digital video signal input in the form of a bit stream, formed by variable-length coding using a plurality of code maps, and which records the bit stream in a transparent recording method, comprising:

means for extracting header information from the bit stream;

means for modifying the header information;

means for detecting and extracting intra-coded block components from the bit stream; and means for configuring one track with an area for recording the input bit stream and an area for recording fast playback HP data;

said extracting means extracting, as said intra-coded block components, a predefined number of orthogonal transform coefficients, and said configuring means selecting the shortest EOB code from said plurality of code maps, and configuring the fast playback HP data by appending the selected EOB code to said intra-coded components.

With the above configuration, it is possible to efficiently record the bit stream of the digital video signal (including the EOBs) in the area (duplication area) for recording the fast playback data.

It may so arranged that extracting means extracts only the DC components of the orthogonal transform coefficients, as said intra-coded block components.

With the above configuration, it is possible to efficiently record the bit stream of the digital video signal (including the EOBs) in the area (duplication area) for recording the fast playback data.

It may so arranged that said header information modifying means modifies at least a signal in the header identifying the code map used by the input bit stream, into a signal indicating the code map containing the shortest EOB.

With the above arrangement, it is possible to cause the length of the EOB code to be shortest in the code map used by the variable length codes.

According to another aspect of the invention, there is provided a digital VTR which receives at least a digital video signal input in the form of a bit stream, formed by variable-length coding using a plurality of code maps, and which records the bit stream in a transparent recording method, comprising:

means for extracting header information from the bit stream;

means for modifying the header information;

means for detecting and extracting intra-coded block components from the bit stream; and means for configuring one track with an area for recording the input bit stream and an area for recording fast playback HP data;

said extracting means extracting, as said intra-coded block components, a predefined number of variable-length codes; and said configuring means selecting the shortest EOB code from said plurality of code maps, and configuring the fast playback HP data by appending the selected EOB code to said components.

With the above configuration, it is possible to efficiently record the bit stream of the digital video signal (including the EOBs) in the area (duplication area) for recording the fast playback data, and it is possible to shorten the interval of the refresh during the fast playback.

It may so arranged that said header information modifying means modifies at least a signal in the header identifying the code map used by the input bit stream, into a signal indicating the code map containing the shortest EOB.

With the above arrangement, it is possible to cause the length of the EOB code to be shortest in the code map used by the variable length codes.

According to another aspect of the invention, there is provided a magnetic recording/playback device recording signals along helical tracks formed on a magnetic tape by means of a rotary drum with heads having two different azimuths mounted thereon, and playing back the signals, comprising:

means for extracting fast playback signals from normal recording signals;

means for recording the fast playback signals in predefined regions on predefined tracks;

means for recording identification signals for identifying the tracks on which the fast playback signals are recorded; and means for reproducing the identification signals;

said fast playback signal recording means recording the fast playback signal for each of the playback speeds on tracks predefined for each of the playback speeds.

With the above arrangement, it is possible to achieve an efficient, fast playback data arrangement and hence fast playback image of a high picture quality.

It may so arranged that said fast playback signals recorded by said fast playback signal recording means include a first playback signal used for playback at a first speed, and a second playback signal used for playback at a second speed which is higher than said first speed.

It may so arranged that said fast playback signal recording means records said first playback signal in an area at one location on one track per one scan of the head, within a first region of a track of a first azimuth, and said second playback signal for said second speed in a plurality of areas on one track per one scan of the head, within a second region of a track of a second azimuth.

It may so arranged that said first speed is an even multiple of a normal playback speed, and said second speed is also an even multiple of the normal playback speed, With the above arrangement, it is possible to achieve efficient data reproduction during playback at the higher speed. During the lower speed playback, the fast playback data is reproduced from one location on one track during one scan of the head, so that it is ensured that, even when there is track non-linearity or scanning trace non-linearity, the data can be reproduced accurately, by scanning such that the tracking error is minimized at the area at the one location where the fast playback data is recorded. A highly reliable device can thus be obtained.

It may so arranged that during playback at each of the playback speed, the head scans a tracking signal area and sub-code area.

With the above arrangement, it is possible to record additional information in the sub-code area, and use the additional information during fast playback. Thus, a device with additional functions can be obtained.

It may so arranged that a first region for recording the first playback signal is substantially equally divided into five sections, with the sections at both ends of the first region recording identical signals, and a second region for recording the second playback signal is substantially equally divided into three sections, with the sections at both ends of the second region recording identical signals.

With the above arrangement, the effects of any track non-linearity, head scanning trace non-linearity, and error in the track recording start point at the lower edge of the tape can be minimized by interpolation of the fast playback data by the duplicating writing of data. A highly reliable device can thus be obtained.

It may so arranged that the first region is in a track of a first azimuth, and the second region is in a track of a second azimuth.

It may so arranged that identical signals containing error correction code data and image data are recorded in sections at both ends of said first region, and identical error correction code data are recorded in sections at both ends of said second region.

It may so arranged that signals containing different error correction code data and identical image data are recorded in sections at both ends of said first region, and different error correction code data are recorded in sections at both ends of said second region.

It may so arranged that different error correction code data are recorded in sections at both ends of said first region, and different error correction code data are recorded in sections at both ends of said second region.

With the above arrangement, stable error correction can be achieved, and a reliable device can thus be obtained. In addition, the error correction codes are common between the data for playback at a higher speed and the data for playback at a lower speed, so that the same error correction circuit can be shared. The size of the circuitry can thus be reduced.

It may so arranged that second playback data is recorded on a trace position intermediate a first head scanning position by means of two heads at a speed 2n (n being an even multiple) times the normal playback speed and a second head scanning position by means of four heads at a speed n times the normal playback speed, with said heads having two different azimuths.

With the above arrangement, the head configuration does not impose any restriction with regard to the fast playback speed, and a device which is convenient to use can be obtained.

It may so arranged that a first region on a track of a first azimuth for recording a first signal used for playback at a first speed is larger than a second region on a track of a second azimuth for recording a second signal used for playback at a second speed higher than said first speed, and said first and second regions are provided with copy areas where identical data is recorded in duplication.

With the above arrangement, the effects of any track non-linearity, head scanning trace non-linearity, and error in the track recording start point at the lower edge of the tape can be minimized by interpolation of the fast playback data by the duplicating writing of data. A highly reliable device can thus be obtained.

It may so arranged that the copy areas provided at both ends of said first and second regions for recording signals in duplication are provided in greater numbers toward the edges of the tape.

With the above arrangement, the head configuration does not impose any restriction with regard to the fast playback speed, and a device which is convenient to use can be obtained.

It may so arranged that a signal for playback at a first speed is recorded in a first region in a track of a first azimuth, a signal for playback at a second speed higher than said first speed is recorded in a second region in a track of a second azimuth, the first region is provided at its both ends with first and second sections as the copy areas, and the second region is provided at its both ends with first and second sections as the copy areas.

It may so arranged that identical signals consisting of error correction code data and image are data recorded in said sections at both ends of the first region, and identical error correction code data is recorded in said sections at both ends of the second region.

It may so arranged that signals containing different error correction code data and identical image data are recorded in said sections at both ends of the first region, and different error correction code data are recorded in said sections at both ends of the second region.

It may so arranged that different error correction code data are recorded in said sections at both ends of the first region, and different error correction code data are recorded in said sections at both ends of the second region.

With the above arrangement, stable error correction can be achieved, and a reliable device can thus be obtained. In addition, the error correction codes are common between the data for playback at a higher speed and the data for playback at a lower speed, so that the same error correction circuit can be shared. The size of the circuitry can thus be reduced.

It may so arranged that said copy areas have a size of five sync blocks or a multiple thereof.

With the above arrangement, the effects of any track non-linearity, head scanning trace non-linearity, and error in the track recording start point at the lower edge of the tape can be minimized by interpolation of the fast playback data by the duplicating writing of data. A highly reliable device can thus be obtained.

It may so arranged that signals used for fast playback include a signal for playback at a first speed of an even multiple of the normal playback speed, a signal for playback at a second speed higher than said first speed and in a forward direction, and a signal for playback at a third speed higher than said first speed and in a reverse direction.

With the above arrangement, it is not necessary to provide a memory for rearranging the reproduced data during reverse fast playback. The size of the circuit can thus be reduced.

It may so arranged that the fast playback signals recorded by said fast playback signal recording means include a first playback signal used for playback at a first speed, and a second playback signal used for playback at a second speed which is higher than said first speed and in a forward direction, and a third playback signal used for playback at a third speed which is higher than said first speed, and in a reverse direction.

It may so arranged that said fast playback signal recording means records said first playback signal in an area at one location on one track per one scan of the head, within a region of a track of a first azimuth, said playback signal for said second speed in a plurality of areas on one track per one scan of the head, within a region of a track of a second azimuth, and said playback signal for said third speed in a plurality of areas on one track per one scan of the head, within a region of a track of a second azimuth.

It may so arranged that said first speed is an even multiple of a normal playback speed, and said second speed is also an even multiple of the normal playback speed, With the above arrangement, during fast playback at a lower speed, data can be reproduced accurately, by scanning such that the tracking error is minimized at the area at the one location where the data for fast playback at the lower speed is recorded. Data for playback at a higher speed can be obtained from a plurality of areas in one track per one scan of the head during forward or reverse playback at the higher speed. An efficient device capable of fast playback can thus be obtained.

It may so arranged that during playback at each of the playback speed, the head scans a tracking signal area and sub-code area.

With the above arrangement, it is possible to record the additional information in the sub-code area, and use the additional information during fast playback at a higher speed. A device having additional functions can thus be obtained.

It may so arranged that there are provided a first region for recording a first playback signal for playback at a first speed on a track of a first azimuth, a second region for recording a second playback signal for playback at the first speed on a subsequent track of a second azimuth, and the length of the second region being about twice the length of the first region, and the center of the second region in the track and the center of the first region in the track are about the same.

With the above arrangement, if the device used for playback is of the two head configuration, the data in the region for higher speed playback on a track of the second azimuth is reproduced. If the device used for playback is of the four head configuration, it is possible to reproduce data in the regions for the higher speed playback in tracks of first and second azimuths, and the total length of the track regions from which the data is reproduced by the combination of the heads of two different azimuths will be the same between the two head configurations. As a result, the head configuration does not impose any restriction on the playback speed. Moreover, the picture quality can be maintained constant regardless of the head configuration. A device which is convenient to use can thus be obtained.

It may so arranged that said first playback signal is recorded in a first region, said second playback signal is recorded in a second region, said second region is substantially equally divided into three sections and the signals recorded in the sections at both ends of said second region are the same as the signal recorded in said first region.

With the above arrangement, the data recorded in the track of the first azimuth can be obtained by a simple rearranging means.

It may so arranged that different sets of signals are recorded for each of the playback speeds at different positions on the tape.

With the above arrangement, it is possible to obtain a screen of pictures which are updated at an optimum interval.

It may so arranged that fast playback signals for predefined speeds are disposed at predefined positions on predefined tracks in M consecutive tracks, and the signals are recorded, being repeated, taking the arrangement over the M tracks as a unit, and a plurality of playback signals for playback at M×n (n being a positive integer) times the normal playback speed are recorded, and the signal for each of the speeds is recorded, being repeated 2×n times, taking the M tracks as a unit.

During fast playback, it is sufficient if the drum rotation control and tape speed control be achieved such that the fast playback data which is recorded at one location in M tracks is reproduced. For instance, let us assume that fast playback is conducted at a speed M×n times the normal playback speed. Compared with the case where fast playback data is recorded at one location in M×n tracks, the amount of movement to the desired track after transition for changing the playback speed, for instance, is smaller, and it is therefore possible to more promptly commence reproduction of data.

It may so arranged that M is 4, and pilot signals consisting of repetitions of three types of frequency signals f0, f1 and f2 for control over the tape speed are used.

With the above arrangement, it is possible to scan an arbitrary one of the four tracks by means of the three types of pilot signals f0, f1 and f2. Fast playback data recorded in the predefined regions can thus be reproduced in accordance with the pilot signals.

It may so arranged that playback at a speed which is an arbitrary even multiple of the normal playback speed and which is not larger than (M×n) data is performed using a signal recorded as the M×n speed playback signal.

With the above arrangement, a device convenient to use can be obtained.

BRIEF DESCRIPTION OF THE DRAWINGS

In the drawings:

FIG. 3A and FIG. 3B are tables showing variable-length coding maps;

FIG. 10 shows an example of configuration of the special playback data;

FIG. 11 is a table showing the number of sync blocks obtainable from one track during each of the speed multipliers;

FIG. 51 is a diagram illustrating overlapping areas at a plurality of fast playback speeds;

FIG. 53A and FIG. 53B show example of head traces at five 5×speed playback.

FIG. 54 shows how one track is divided into main areas and duplication areas;

DETAILED DESCRIPTION OF THE PREFERRED EMBODIMENTS

Embodiment A1

Figure 1:
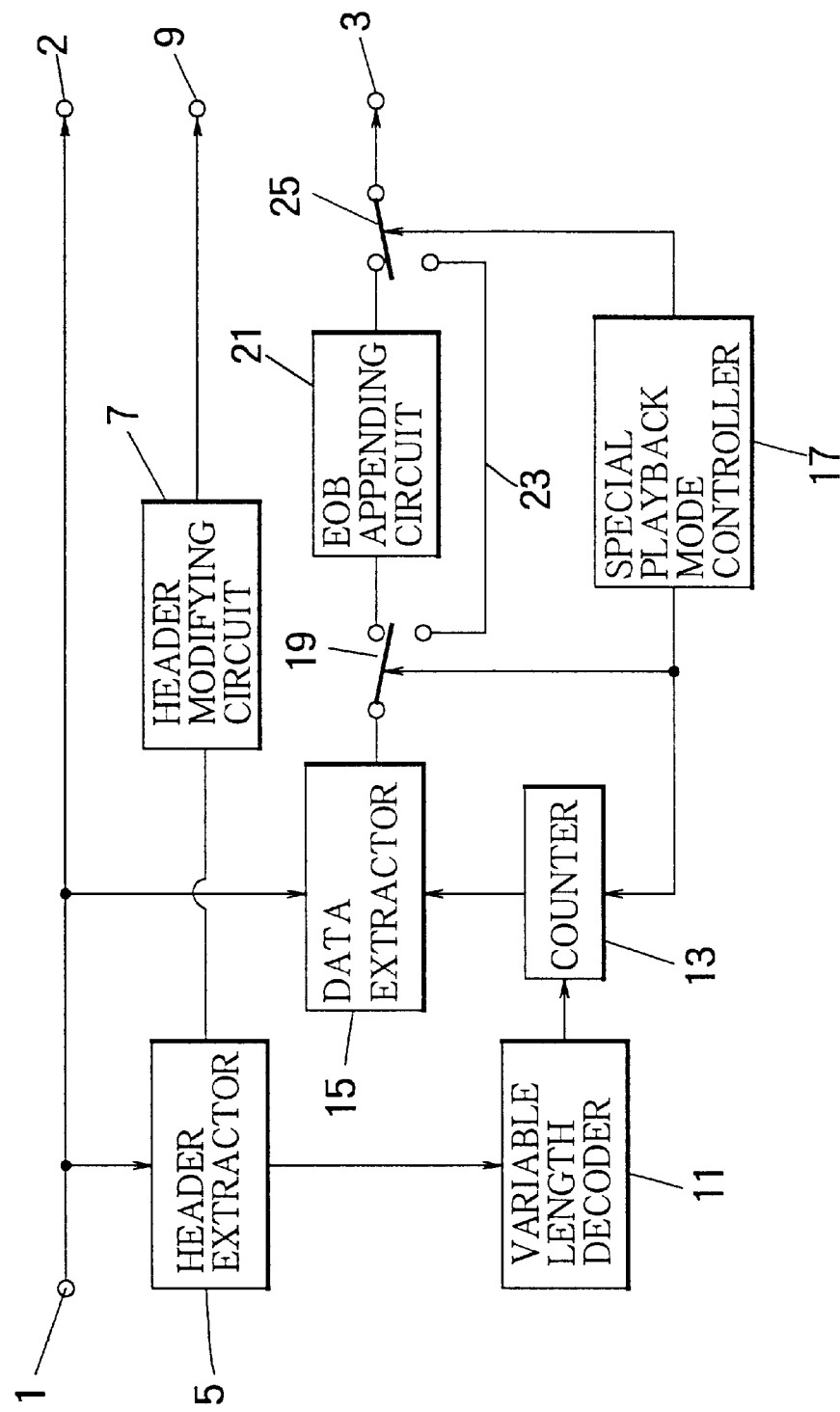
FIG. 1 is a block diagram showing a part of a recording section of a magnetic recording/playback device of Embodiment A1.

FIG. 1 shows part of a recording section of a magnetic recording/playback device of an embodiment of the invention, called Embodiment A1. In the figure, reference numeral 1 denotes a bit stream input terminal, 2 denotes a main bit stream output terminal, 3 denotes an output terminal for HP data which is a fast playback data, 5 denotes a header extractor, 7 denotes a header modifying circuit, 9 denotes a modified header output terminal, 11 denotes a variablelength decoder, 13 denotes a counter, 15 denotes another data extractor, 17 denotes a special playback mode controller for controlling the path of the signal depending on the fast playback mode, 19 denotes a switch, 21 denotes an EOB appending circuit, 23 denotes a bypass for a signal to which no EOB needs to be appended, and 25 denotes another switch.

The operation of the circuitry shown in FIG. 1 will next be described. An ATV bit stream is input via the input terminal 1, and output via the main bit stream output terminal 2 as a main bit stream for normal playback, and also input to the header extractor 5, where the headers are extracted from the input ATV bit stream. The extracted headers are supplied to the header modifying circuit 7. The ATV bit stream from which the headers have been removed is supplied to the variable length decoder 11. The ATV bit stream is also supplied to the second header extractor 15.

Figure 49A:
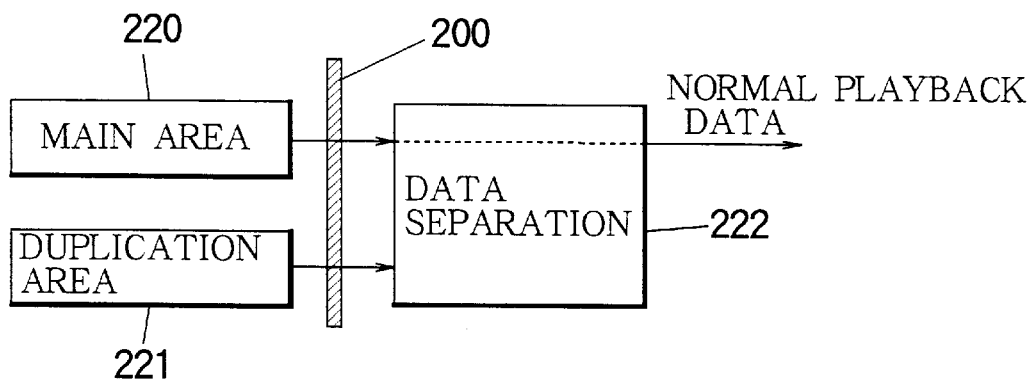
FIG. 49A and FIG. 49B are schematic diagrams showing the basic functions of normal playback and fast playback in a conventional digital VTR.
Figure 49B:
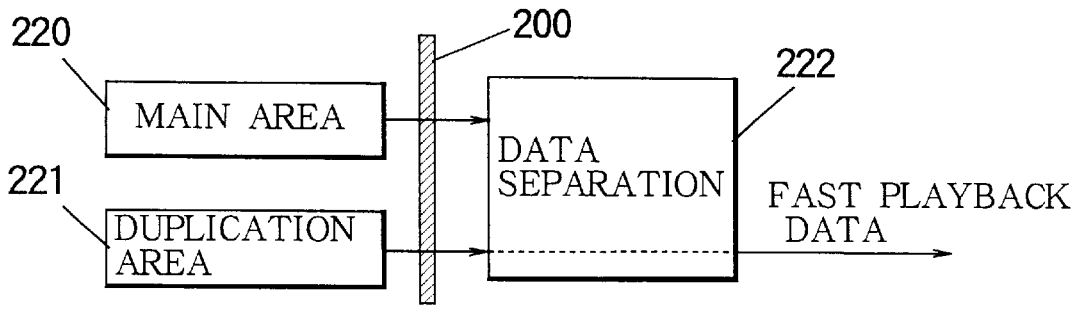
Figure 50A:
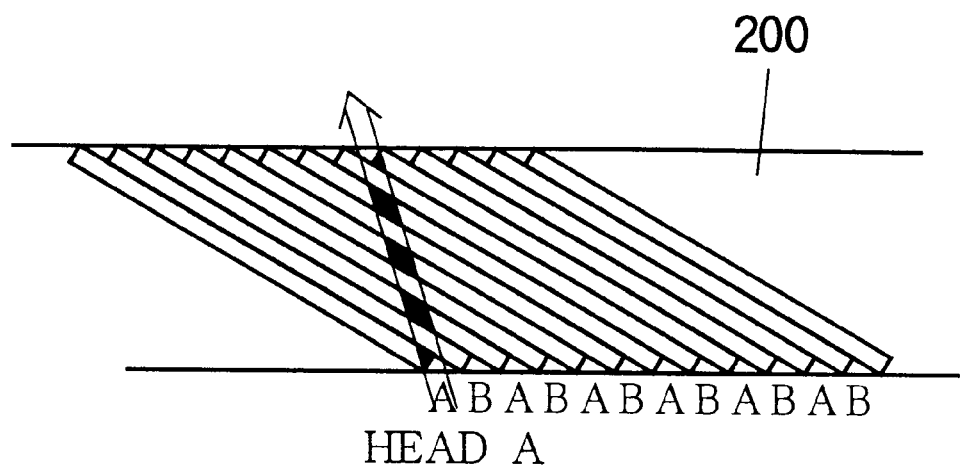
FIG. 50A and FIG. 50B show an example of head trace during fast playback.
Figure 50B:
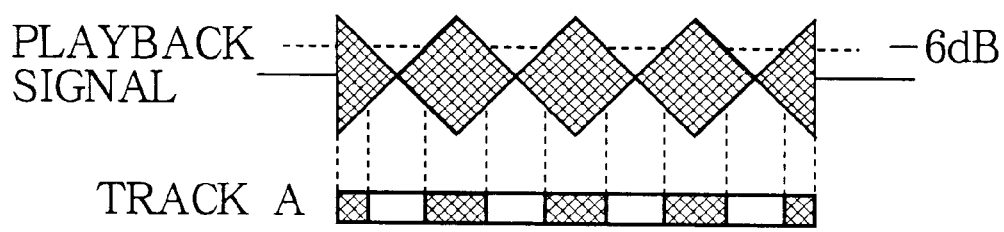
Figure 52:
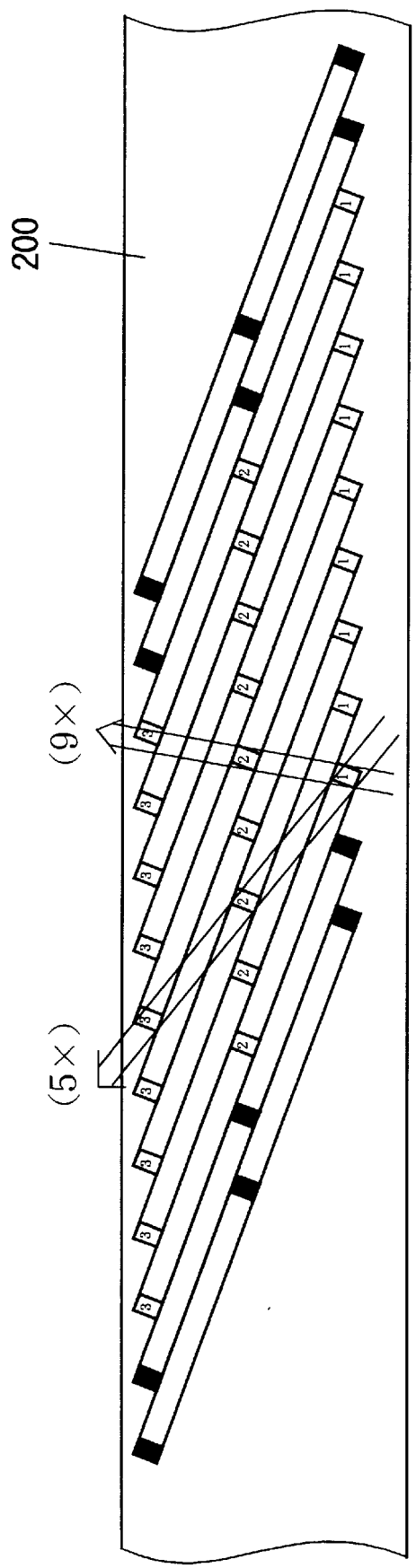
FIG. 52 shows head scanning traces at 5 times speed and 9 times speed in a conventional digital VTR.

The header modifying circuit 7 modifies the headers extracted by the header extractor 5, and outputs the modified headers via the modified header output terminal 9. There are various modifications that may be applied. An example of the modifications will be described in connection with Embodiment A2. The modified header information is recorded in the duplication areas 221 (FIG. 49A and FIG. 49B), together with the HP data for fast playback.

The variable length decoder 11 performs variable length decoding on the input bit stream. The number of DCT coefficients obtained by variable-length decoding is counted by the counter 13. The counter 13 supplies the data extractor 15 with a timing signal for extracting data, when the number of the DCT coefficients reaches a predetermined value, on the basis of the signal from the special playback mode controller 17.

The special playback mode controller 17 controls the switches 19 and 25 on the basis of the number of DCT coefficients predetermined for the speed multiplier of the fast playback (the speed multiplier being defined by the ratio of the fast playback speed to the normal playback speed), or the number of DCT coefficients externally designated by the user at the time of recording. The special playback mode controller 17 also supplies the counter 13 with a signal indicative of the number of the DCT coefficients to be extracted from the bit stream.

Of the DCT coefficients, only the DC (direct-current) components may be extracted, or a plurality of AC (alternating-current) components as well as the DC component may be extracted. First, let us consider a situation in which only the DC components are extracted. The DC components are necessarily contained in each DCT component (8 lines×8 pels) which is the unit of coding of bit stream. In such a case, EOB codes need not be appended. This is because the EOB code indicates a signal indicating that no meaningful data is present within the DCT block and after it, and indicating that the transmission of the block should be terminated here. If the termination is known beforehand, it is not necessary to append the EOB. If the data of the DCT block contains only the DC components during recording, or if the playback system knows the number of DCT coefficients per DCT block, it is not necessary to append the EOB code. For instance, if the system is configured to record HP data wherein DCT coefficients are formed of DC components only, it is not necessary to append the EOB codes in the recording system, so that the duplication areas 221 can be utilized effectively.

Figure 2A:
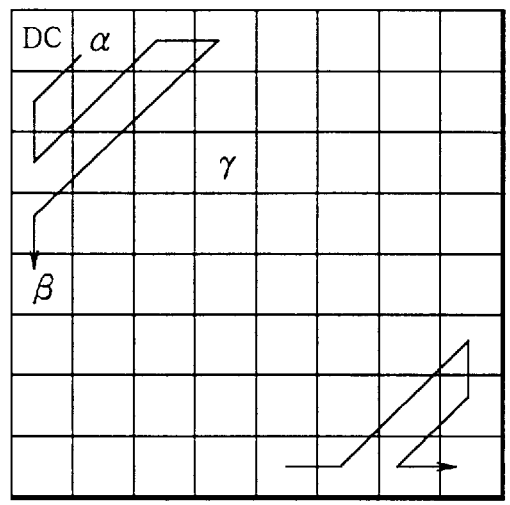
FIG. 2A and FIG. 2B are diagrams for explaining the DCT configuration.

Referring now to FIG. 2A, if two or more meaningful AC components are contained (in the example shown in FIG. 2A, three components, α, β and γ), it is necessary to transmit all the 64 pieces of data, or to append a code, i.e., an EOB code, indicating the end of the meaningful data (i.e., the data in the remaining part represent only meaningless coefficients). From the viewpoint of intended data compression, transmitting all the 64 pieces of data is not adopted. However, when there is only DC component as in FIG. 2B, and there is no meaningful AC components, and if it is known beforehand that only such blocks are present, it will be known that when a DC component is detected, what is left in the subsequent part are the meaningless coefficients only, and the end of the DCT block is thus known, and it is therefore not necessary to append the EOB code at the time of recording.

Figure 2B:
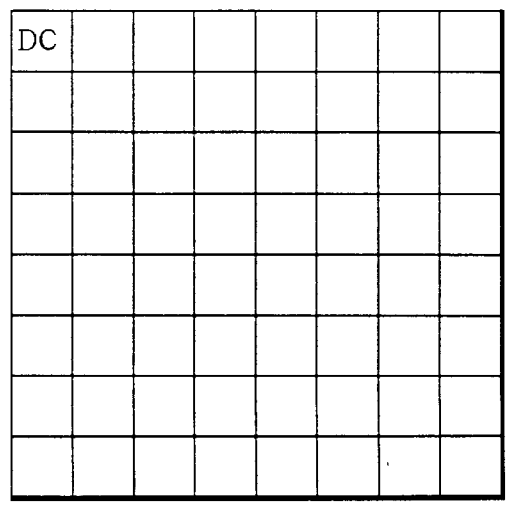

If it is known at the time of playback that only blocks supplied are like that shown in FIG. 2B, then the end of each DCT block can be recognized. Where the decoder employed is of such a type as to require EOB codes, some arrangement may be added to append the EOB codes to the playback data. For these reasons, the EOB code may be removed at the time of recording.

When DC components alone are extracted as described above, it is not necessary to append an EOB code, so that the switches 19 and 25 may be in a state of connecting the lower side (as seen in FIG. 1), and the bit stream extracted by the data extractor 15 is passed through the signal path 23 to the output terminal 3 for the fast playback HP data.

When both DC components and AC components are contained, it is necessary to append an EOB code. Accordingly, the switches 19 and 25 in FIG. 1 are in the state of connecting the upper side (as seen in FIG. 1), and an EOB code is appended at the EOB appending circuit 21, and the signal is output via the output terminal 27 for the fast playback HP data.

Because of the configuration described above, it is possible to eliminate EOB codes which are redundant in one DCT block, and the more data of DCT blocks can be recorded in the same duplication area 221 as in the prior art example.

In the embodiment described above, only DC components are recorded. However, the number of coefficients transmitted in each DCT block may be any other predefined number.

In the embodiment described above, the coefficients are counted so that the number of coefficients in one DCT block is a predefined number. As an alternative, the variable-length codes (VLC's) may be counted so that the number of the variable-length codes is a predefined number.

Embodiment A2

Embodiment A2 relates to an example of the modifications to the header and a method of shortening the EOB code appended to the DC component (where an EOB code is appended to the DC component). This eliminates the necessity to read the HP data in a predefined format, and insert a new signal, and enables the HP data to be transmitted to the decoder as it is.

In ATV, MPEG2 is used as a method of compressing the video information. In MPEG2, variable-length coding is used as a method of coding the DCT coefficients. There are two code maps for the variable-length coding. Which of them is to be used is determined by a flag in a header. Part of the two code maps are shown in FIG. 3A and FIG. 3B. In FIG. 3A and FIG. 3B, the least significant bit "s" in the column of "VARIABLE-LENGTH CODE" denotes the sign of the level, "0" for positive and "1" for negative. The code marked with "*" should be used for the first (DC) coefficient in the block. The code marked with "**" should be used for all other coefficients.

In MPEG2, there is a flag in a part of the header called a picture coding extension for determining which of the variable-length cod maps shown in FIG. 3A and FIG. 3B is to be used. Responsive to this flag, the MPEG2 decoder decides which of the variable-length code maps in FIG. 3A and FIG. 3B is to be used.

In the present embodiment, only the DC components are extracted from the bit stream and EOB codes are appended.

Figure 4:
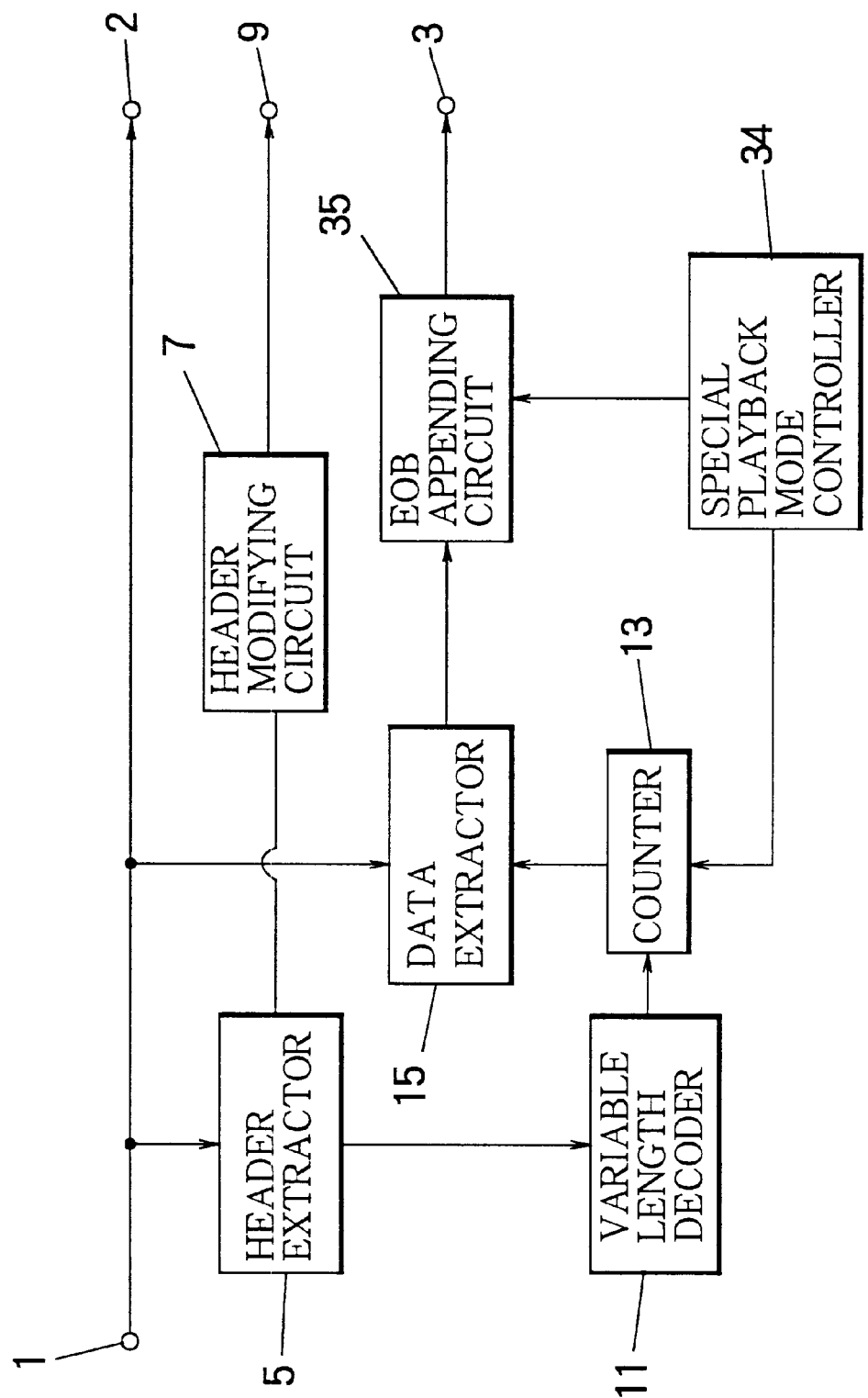
FIG. 4 is a block diagram showing part of a recording section of a magnetic recording/playback device of Embodiment A2.

FIG. 4 shows part of a recording section of a magnetic recording/playback device of Embodiment A2. In the figure, reference numerals 1 to 15 denotes members identical to those in FIG. 1. Reference 34 denotes a special playback mode controller, and 35 denotes an EOB appending circuit.

The operation will now be described. The EOB appending circuit 35 appends a code of two bits "10" as EOB code to the data extracted by the data extractor 15. The data extractor 15 extracts the DC components of the DCT coefficients, and this is instructed by the special playback mode controller 34. The data with the EOB code appended thereto is output via the output terminal 3 for the fast playback HP data.

It is necessary to make the flag in the header indicate the map in FIG. 3A. This is because the original bit stream may use the code map in FIG. 3B, and if the header is not altered, the data and the map do not agree.

The flag formed of a predetermined part of the header extracted by the header extractor 5 is made to indicate that the code map in FIG. 3A is used, without regard to the state in the input bit stream. If this flag is "0", the MPEG2 uses the code map in FIG. 3A, so that during fast playback (when DC components only are used), this flag is made set to "0" and a code of two bits "10" is appended to the EOB code.

By doing so, the length of the EOB code is only two bits, and the amount of the code can be limited, and more DCT block data can be recorded in the duplication area 221 of the given space. Moreover, since the EOB codes are always appended, the data can be transmitted to the decoder without inserting new signals.

In the above embodiment, only DC components are processed. However, the number of the coefficients within one DCT block may be any predefined number, and variablelength codes may be converted.

In the above embodiment, the coefficients are counted so that the number of the coefficients in one DCT block is a predefined number. As an alternative, the variable length codes (VLC's) may be counted so that the number is a predefined number, and variable-length codes may be converted.

Embodiment A3

Embodiment A3 relates to playback of HP data recorded as in Embodiment A1.

Figure 5A:
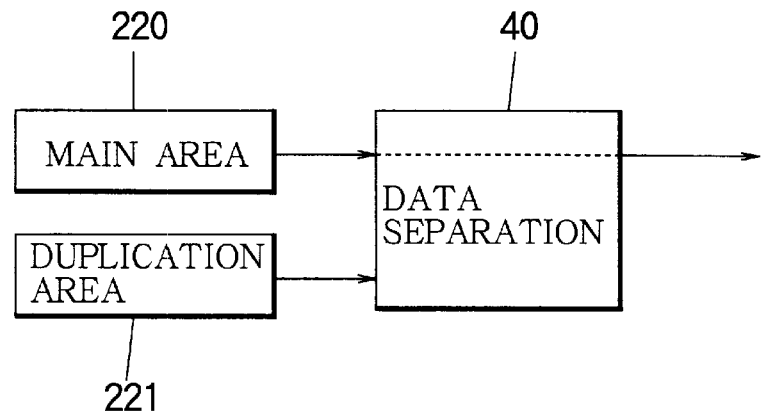
FIG. 5A and FIG. 5B are block diagrams showing the playback system according to the invention.
Figure 5B:
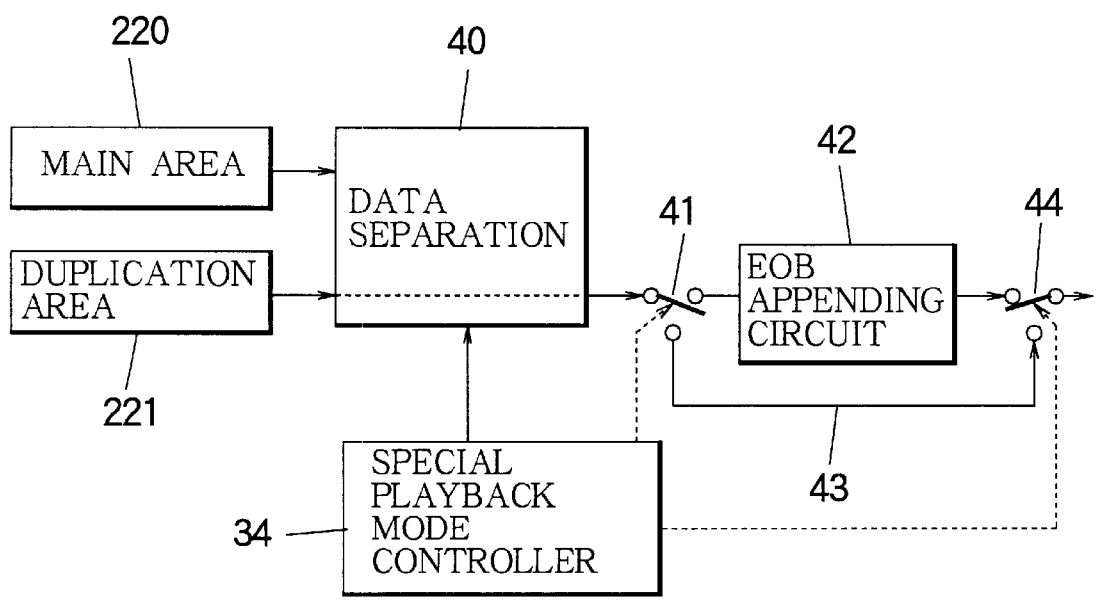

FIG. 5A and FIG. 5B are block diagrams showing the playback system according to the invention. In the figure, reference numeral 220 denotes a main area where normal playback data is recorded, 221 denotes a duplication area where fast playback HP data is recorded, 40 denotes a data separator for separating the playback data, 41 denotes a switch, 42 denotes an EOB appending circuit, 43 denotes a signal path for transmitting data to which it is not necessary to append EOB codes, and 44 denotes a switch.

The operation will next be described. During normal playback, the signals reproduced from the main area 220 and the duplication area 221 are input to the data separator 40, where the data from the duplication area is discarded, and the data from the main area 220 is output as normal playback data from the data separator 40.

During fast playback, the signals are input to the data separator 40 in the same way as in fast playback. However, the special playback mode controller 34 supplies a signal for causing the data separator 40 to output the HP data for the speed multiplier which the user has designated. A signal for controlling the switches 41 and 44, depending on whether the DC components alone of the DCT coefficients, or both DC and AC components are reproduced, is also output by the special playback mode controller 34.

Thus, the data separator 40 outputs the data of the speed multiplier designated by the special playback mode controller 34. As was described in connection with Embodiment A1, there are instances where only the DC components are reproduced, and where both the DC and AC components are reproduced. First, let us consider the situation where DC components alone are reproduced. The special playback mode controller 34 instructs the data separator 40, the switches 41 and 44 to reproduce the HP data consisting only of the DC components.

The switches 41 and 44 are brought to the state of connecting the upper side (as seen in FIG. 5B) in compliance with the instruction from the special playback mode controller 34, so that the EOB codes are appended to the output of the data separator 40 at the EOB circuit 42, and the data with the EOB codes appended thereto is output via the switch 44.

When HP data containing AC components in addition to the DC components is reproduced, the switches 41 and 44 are brought to the state of connecting the lower side (as seen in FIG. SB). The HP data from the data separator 40 is passed through the switch 41, the signal path 43 and the switch 44, and output as fast playback HP data.

In this way, the data in the main and duplication areas 220 and 221 recorded in the manner described in Embodiment A1 is reproduced.

In Embodiment A3, the data recorded in Embodiment A1 is reproduced. The data recorded in Embodiment A2 can be reproduced in the same way as in the prior art example.

Embodiment B1

Figure 6:
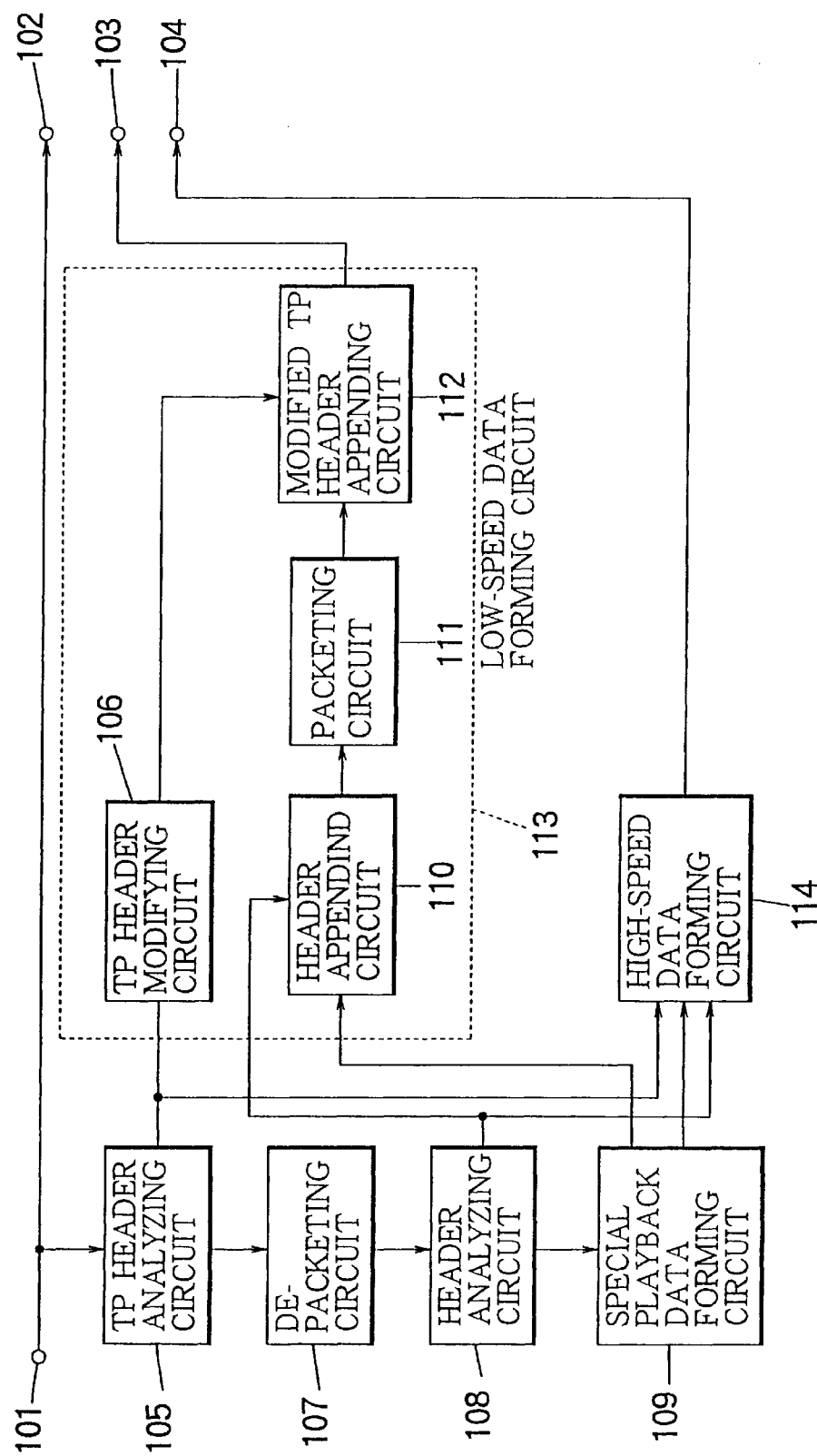
FIG. 6 is a block diagram showing part of a recording section of a magnetic recording/playback device of Embodiment B1.

FIG. 6 shows another embodiment, Embodiment B1, of the invention. In FIG. 6, an input terminal 101 is for receiving a bit stream, an output terminal 102 is for outputting a bit stream from main areas, another output terminal 103 is for outputting a low-speed fast playback data, and yet another output terminal 104 is for outputting a high-speed playback data.

A TP header analyzing circuit 105 analyzes transport headers and outputs transport packet containing the transport header and intra header. A TP header modifying circuit 106 modifies the transport header that has been separated. A depacketing circuit 107 converts the transport packets into a bit stream. A header analyzing circuit 108 analyzes sequence headers, picture headers and the like contained in the bit stream, and outputs the headers and the intra-data. A special playback data forming circuit 109 forms special playback data for each of the playback speeds from the intra-bit stream. A header appending circuit 110 appends necessary headers from among the headers extracted by the header analyzing circuit 108 for the low-speed playback. A packeting circuit 111 is for packeting the data into transport packets. A modified TP header appending circuit 112 appends modified transport headers. The TP header modifying circuit 106, the header appending circuit 110, the packeting circuit 111 and the modified TP header appending circuit 112 in combination form a low-speed data forming circuit. A high-speed data forming circuit 114 has a configuration similar to the low-speed data forming circuit 113.

The operation will next be described. The bit stream input via the bit stream input terminal 101 is output via the main area bit stream output terminal 102, and also led to the TP header analyzing circuit 105. The TP header analyzing circuit 105 detects transport packet headers in the input bit stream, and analyzes the header, and, if the subsequent bit stream contains intra data, outputs the transport packet to the depacketing circuit 107, and outputs the transport header to the TP header modifying circuit 106.

The depacketing circuit 107 disintegrates or depackets the input transport packets into a bit stream and outputs the bit stream to the header analyzing circuit 108. The header analyzing circuit 108 analyzes headers such as sequence headers and picture headers in the bit stream, and outputs only the intra-data to the special playback data forming circuit 109, and outputs the header to the header appending circuit 110.

The special playback data forming circuit 109 forms low-speed special playback data and high-speed special playback data from the input intra data. The subsequent processings are common between different playback speeds, so further description will be made in connection with the low-speed data. The low-speed data output by the special playback data forming circuit 109 is input to the header appending circuit 110 in the low-speed data forming circuit 113, where necessary headers from among the headers input from the header analyzing circuit 108 are appended. The low-speed data with the headers appended thereto is input to the packeting circuit 111, and packeted or divided into transport packets. The packeted low-speed data is supplied to the modified TP header appending circuit 112, where modified transport headers are appended, and the low-speed data is then output. The modified transport headers are obtained by modifying the transport headers separated at the TP header analyzing circuit 105, into suitable form, at the TP header modifying circuit 106. The low-speed special playback data is thus converted into the form of packets, and output via the low-speed data output terminal 103.

Description has been made of the packeting of the low-speed data. The high-speed data is similarly processed. The high-speed special playback data output from the special playback data forming circuit 109 is input to the high-speed data forming circuit 114, where headers and modified transport headers are appended, and output, in the form of transport packets, via the high-speed data output terminal 104.

Figure 7:
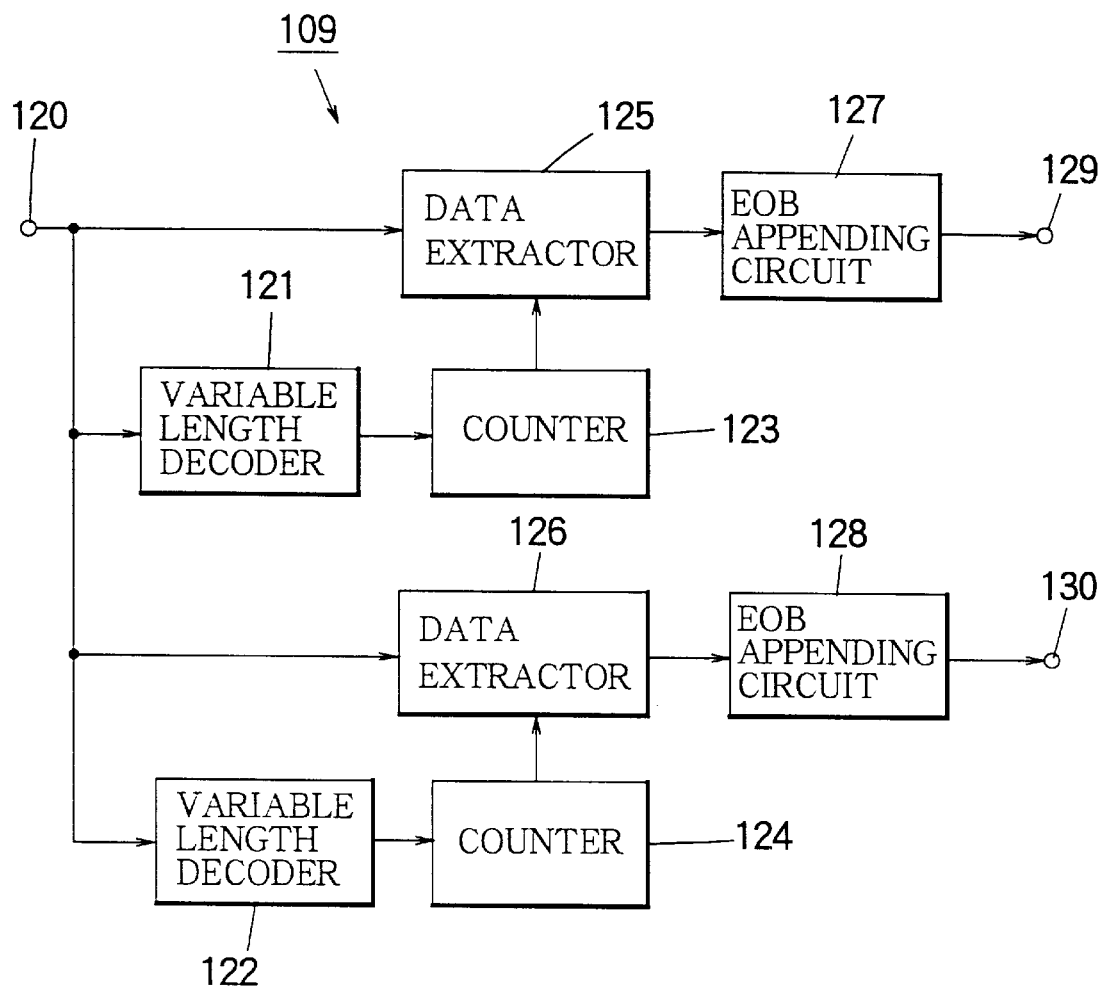
FIG. 7 shows an example of special playback data forming circuit.

The special playback data forming circuit 109 will next be described in detail. FIG. 7 shows an example of special playback data forming circuit 109. An input terminal 120 is for inputting the bit stream of the intra data. A variable-length decoder 121 is for forming low-speed data, another variable-length decoder 122 is for forming high-speed data. Reference numerals 123 and 124 denote counters. A data extractor 125 is for extracting low-speed data special playback data. Another data extractor 126 is for extracting high-speed special playback data. An EOB appending circuit 127 appends EOB (end-of-block) codes to the low-speed special playback data. Another EOB appending circuit 128 appends EOB codes to the high-speed special playback data. An output terminal 129 is for outputting the low-speed special playback data, and another output terminal 130 is for outputting high-speed special playback data.

The operation of the circuit shown in FIG. 7 will next be described. The variable-length decoder 121 variable-length decodes the input bit stream. The number of the decoded DCT coefficients is counted by the counter 123, and the result of the counting is output to the data extractor 125. The data extractor 125 extracts, from the input bit stream, parts of the bit stream corresponding to the predetermined number of DCT coefficients, at predefined timings, responsive to the input from the counter 123. The counter 124 and the data extractor 126 perform similar operations. The data extractor 125 extracts low-speed special playback data from the input bit stream, while the data extractor extracts high-speed special playback data from the input bit stream. The extracted low-speed special playback data data is supplied to the EOB appending circuit 127, where EOB codes are appended, and then output via the output terminal 129 as the low-speed data. The extracted high-speed special playback data is supplied to the EOB appending circuit 128, where EOB codes are appended, and then output via the output terminal 130 as the high-speed data.

The data extractors may extract the data at timings identical to or different from each other. If the timings are different, the numbers of the DCT coefficients in one recorded video block (the unit after the orthogonal transform in the coder side) are also different. Since the special playback areas where special playback data is recorded are limited, if the special playback areas are of the same size, and if the number of DCT coefficients is increased, a greater number of special playback areas are required, and the refreshing of the screen (picture) during playback becomes less frequent. The picture quality however is improved. The timing at which the data is extracted is determined on trade-off between the refreshing interval and the picture quality.

Figure 8:
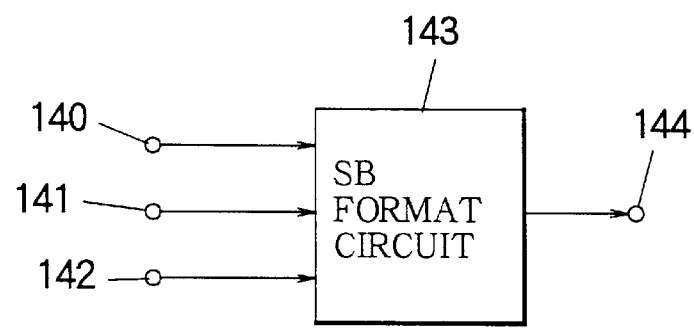
FIG. 8 is a block diagram showing an example of SB format circuit.

Description will next be made of the synthesis of the main area bit stream and special playback data for each of various playback speeds with reference to FIG. 8. An input terminal 140 is for receiving main area bit stream. Another input terminal 141 is for receiving low-speed special playback data. A further input terminal 142 is for receiving a high-speed special playback data. An SB (sync block) format circuit 143 is for converting the input data and bit stream into the form of sync blocks. An SB output terminal 144 is for outputting SB data.

The operation of the circuit shown in FIG. 8 will next be described. The data and bit stream input via the respective input terminals are input to the SB format circuit 143, which selects the data to be recorded in each sync block, for each track and for each sync block. Headers are appended to each of the sync block of the data, and the sync blocks in each track are configured so as to form a predefined pattern, and the sync blocks are output via the SB output terminal 144.

Figure 9A:
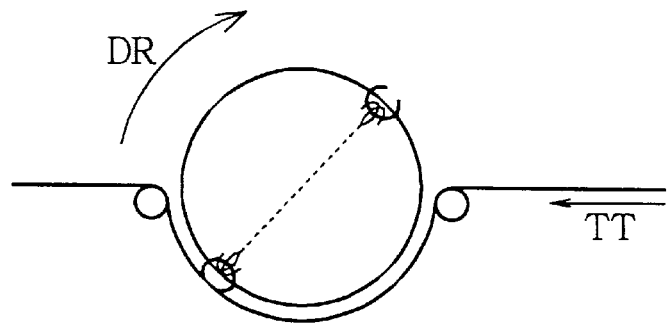
FIG. 9A to FIG. 9C are schematic diagrams showing three different rotary drum configurations.
Figure 9B:
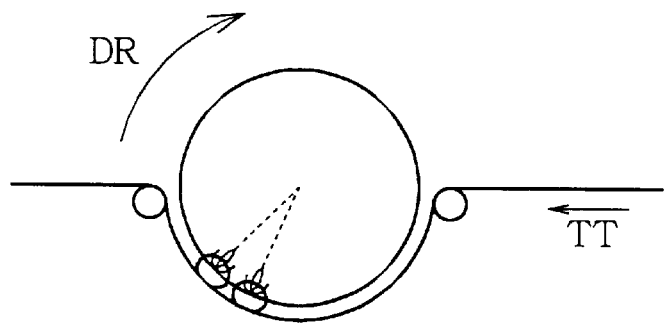
Figure 9C:
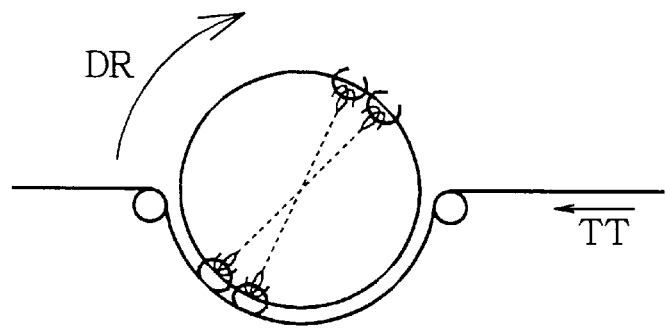

The operation of the SB format circuit 143 will next be described in further detail. The drum may be any of the three configurations shown in FIG. 9A to FIG. 9C, in which "DR" indicates the direction of drum rotation, while "TT" indicates the direction of tape transport. The head having one of the two azimuth angles is called a head of A channel, and the head having the other azimuth angle is called a head of B channel. FIG. 9A shows a case of 1 channel×2 configuration, FIG. 9B shows a case of 2 channels×1 configuration, and FIG. 9C shows a case of 2 channels×2 configuration. In the following description, 4×speed (four times normal speed) is employed for the low-speed playback and 16×speed (sixteen times normal speed) is employed for the high-speed playback.

The configuration of the special playback data is illustrated in FIG. 10. In FIG. 10 and the subsequent figures, "SB" stands for "sync blocks". In FIG. 10, a B-channel low-speed data recording area is for recording low-speed data by means of a B-channel head. A-channel high-speed data recording areas 151a to 151d are for recording high-speed data by means of an A-channel head. Where a drum of the 2 channels×2 configuration is employed, the data in the area 150 will be the data for one half the speed multiplier of the low-speed playback (speed multiplier being defined as the ratio of the special playback speed to the normal playback speed), and the data in the areas 151a to 151d will be the data for one half the speed multiplier of the high-speed playback. This is because, in the case of 2 channels×2 configuration, the head crosses the tracks more times than in the cases of the other drum configurations, so that the number of sync blocks that can be reproduced per track (the area from which reproduction is possible per one track will hereinafter be called "burst") will be about one half. That is, the number of the sync blocks reproduced per track during N×(N times) speed playback using 1 channel×2 or 2 channels×1 configuration is substantially equal to the number of sync blocks reproduced per track during (N/2)×speed (N/2 times speed) playback using 2 channels×2 configuration.

The numbers #1 to #10 allotted to the respective blocks in FIG. 10 denote the content of the data: the same number indicate the same content of the data. Details of the data configuration will be described later.

The data in the area 150 in FIG. 10 consists of 50 sync blocks, and the data of each of the areas 151a to 151d consists of 15 sync blocks. The number of sync blocks allotted to the data in each of the areas is determined based on the result of calculation of the sync blocks obtainable at each of the speed multipliers in high-speed playback.

The table of FIG. 11 shows the number of sync blocks obtainable from one track during each of the speed multipliers. In the figure, "9000 rpm system" means the system with the drum configuration shown in FIG. 9A or FIG. 9B, while "4500 rpm system" means the system with the drum configuration shown in FIG. 9C. The values in the table of FIG. 11 are the number of sync blocks (SB) reproduced from one track at each of the playback speed when a high-speed playback is conducted using a rotary head having of a 10 $\mu$m (the track pitch is 10 $\mu$m according to the SD specification). It is assumed that the number of sync blocks per track (corresponding to 180 degrees) is 186, and the playback signal level not less than −6 dB can be obtained as effective data.

It is seen from FIG. 11 that, in a 9000 rpm system, 62 sync blocks can be obtained from one track during 4×speed playback and 12 sync blocks can be obtained from one track during 16×speed playback. The track configuration designed taking the above facts into consideration, and taking account of the track non-linearity, head scanning trace nonlinearity, and the errors in the recording starting position at the lower edge of the tape is as shown in FIG. 10. The central part of the 4×speed playback data area 150 is used for data #2 of 30 sync blocks. Data #1 is disposed at 10 sync blocks above and below the data #2. The central part of the 16×speed playback data in the area 151a is used for data #4 of 4 sync blocks, and data #3 is disposed above and below the data #4. The central part of the 16×speed playback data in the area 151b is used for data #6 of 4 sync blocks, and data #5 is disposed above and below the data #6. The central part of the 16×speed playback data in the area 151c is used for data #8 of 4 sync blocks, and data #7 is disposed above and below the data #8. The central part of the 16×speed playback data in the area 151d is used for data #10 of 4 sync blocks, and data #9 is disposed above and below the data #10. Thus, identical data (data #1 in 4×speed playback, or data #3, #5, #7 or #9 in 16×speed playback) is written in duplication. With such an arrangement, the effects of the positional offset in the vertical direction can be minimized in the case of track non-linearity, head scanning trace non-linearity, or errors in the recording starting position of the track at the lower edge of the tape.

Figure 12:
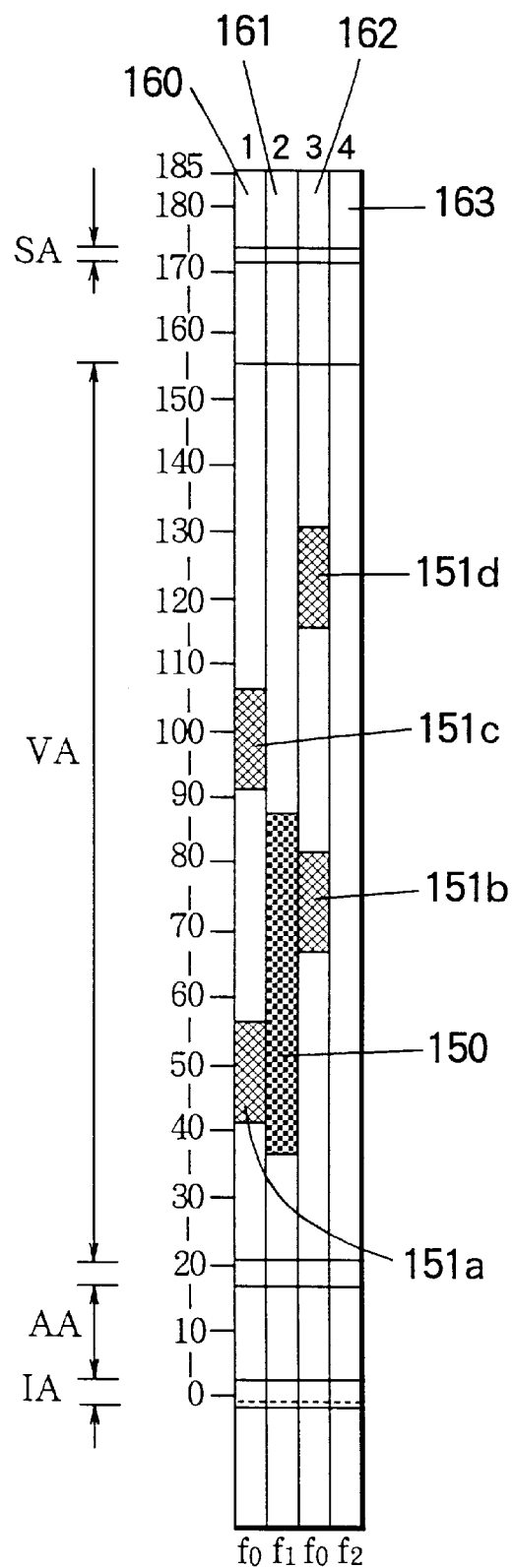
FIG. 12 is a track pattern diagram showing an example of arrangement of special playback areas on tracks.

An example of arrangement of special playback areas on tracks is illustrated in FIG. 12. As indicated on the left edge of the figure, the ITI area (IA), audio area (AA), video area (VA) and sub-code area (SA) are provided in the stated order from the lower to upper ends of the tracks. The figures also on the left side of the tracks denote the sync block addresses, and it is assumed that each track (corresponding to 180 degrees) has 186 sync blocks. That is, the sync block at the lower end is given the sync block number 0, while the sync block at the upper end is given the sync block number 185, and the sync blocks midway between these two sync blocks at the upper and lower ends are given the sync blocks numbers in the ascending order, from the lower to upper ends of each track. The reference numeral 160 denotes a first track recorded by an A-channel head, 161 denotes a second track recorded by a B-channel head, 162 denotes a third track recorded by an A-channel head, and 164 denotes a fourth track recorded by a B-channel head. These four tracks, i.e., the first to fourth tracks 160 to 163, form a unit, and similar units each comprising four tracks are repeated in the longitudinal direction of the magnetic tape. f0, f1, f2 at the foot of the tracks indicate the contents of the pilot signals recorded on the respective tracks. f1 and f2 indicate the frequencies of the pilot signals recorded throughout the respective tracks. f0 indicates that no pilot signals are actually recorded, or absence of pilot signals of specific frequencies (f1, f2). In the case of the 9000 rpm drum configuration, the areas on the tracks other than the areas 150 and 151a to 151d are used as main areas for recording normal playback data. The data in the areas 150 for 4×speed playback can be reproduced as data of the areas concentrated areas during one scan. In the case of 4500 rpm drum configuration, the data for playback at 2×speed (which is one half the 4×speed) can be reproduced as data from concentrated areas during one scan. In the case of the 9000 rpm drum configuration, the data in the areas 151a to 151d for 16×speed playback can be reproduced as data from four areas during one scan. In the case of 4500 rpm drum configuration, the data for playback at 8×speed (which is one half the 16×speed) can be reproduced as the data from four areas during one scan.

Referring further to FIG. 12, it may be so arranged that the 16×speed playback data areas nearer to the edge of the tape may have more parts where identical data is recorded in duplication. In the example of FIG. 12, there may be more areas 151a and 151d toward the edges of the tape than the areas 15ib mand 151c in the central part of the tape. By securing areas in this way, it is possible to cope with certain errors in the head scanning traces in the 16×speed playback with the 9000 rpm drum configuration and 8×speed playback with the 4500 rpm drum configuration, and high-speed playback can be achieved reliably.

The number of the 4×speed playback data areas, and the number of the 16×speed playback data areas are not limited to those of the illustrated example.

According to the data arrangement for one unit shown in FIG. 12, the ITI area and the sub-code area can be scanned by the head during 4×speed playback and 16×speed playback. That is, the pilot signals f0, f1 and f2 used for tracking control can be obtained from ITI areas, and since the sub-code areas are also scanned by the head, it is possible to add the functions, such as head-of-item finding function, by recording time information or the item (-of-music) number information in the sub-code areas.

Figure 13:
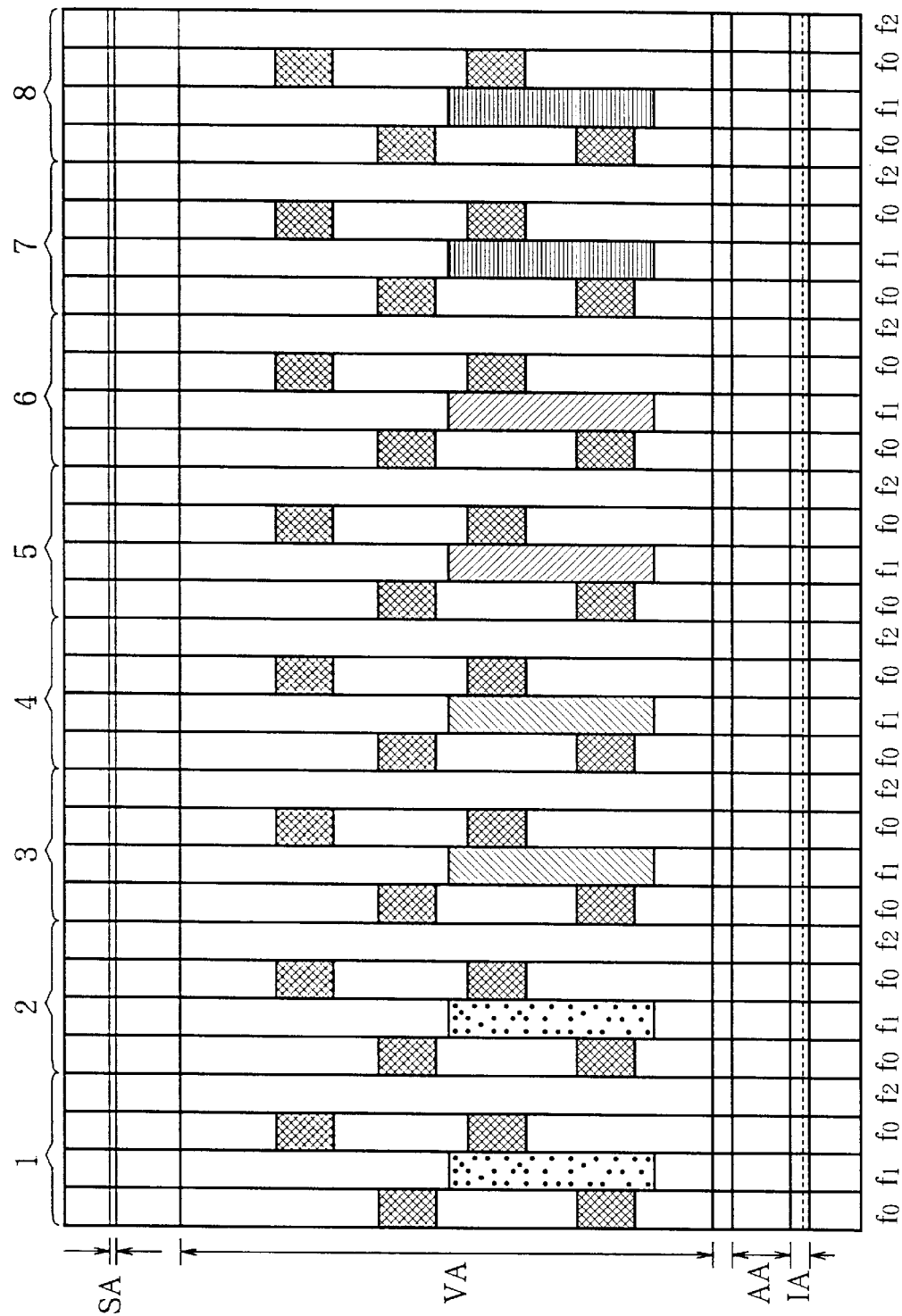
FIG. 13 shows an example of recording pattern.

By repeatedly recording the unit shown in FIG. 12, the recording pattern can be formed on the magnetic tape. An example of the recording pattern is shown in FIG. 13. In this example, the 4×speed data is repeated twice, while the 16×speed data is repeated 8 times.

By forming the recording pattern, the effects of track non-linearity, head scan non-linearity, and error in the recording start position can be minimized. Moreover, since dedicated areas are provided for the respective playback speeds, refreshing interval and picture quality can be set for each of the playback speeds. Furthermore, since the ITI areas and sub-code areas can be scanned by the head during high-speed playback, the additional function, such as head-of-item finding, may be utilized while the tracking control is effected.

The configuration of the data areas 150 and 151a to 151d need not be as shown in FIG. 10, but may be different.

Embodiment B2

In Embodiment B1, the special playback data is formed by the special playback data forming circuit 109 in the form as shown in FIG. 7. An alternative configuration is shown in FIG. 14.

Figure 14:
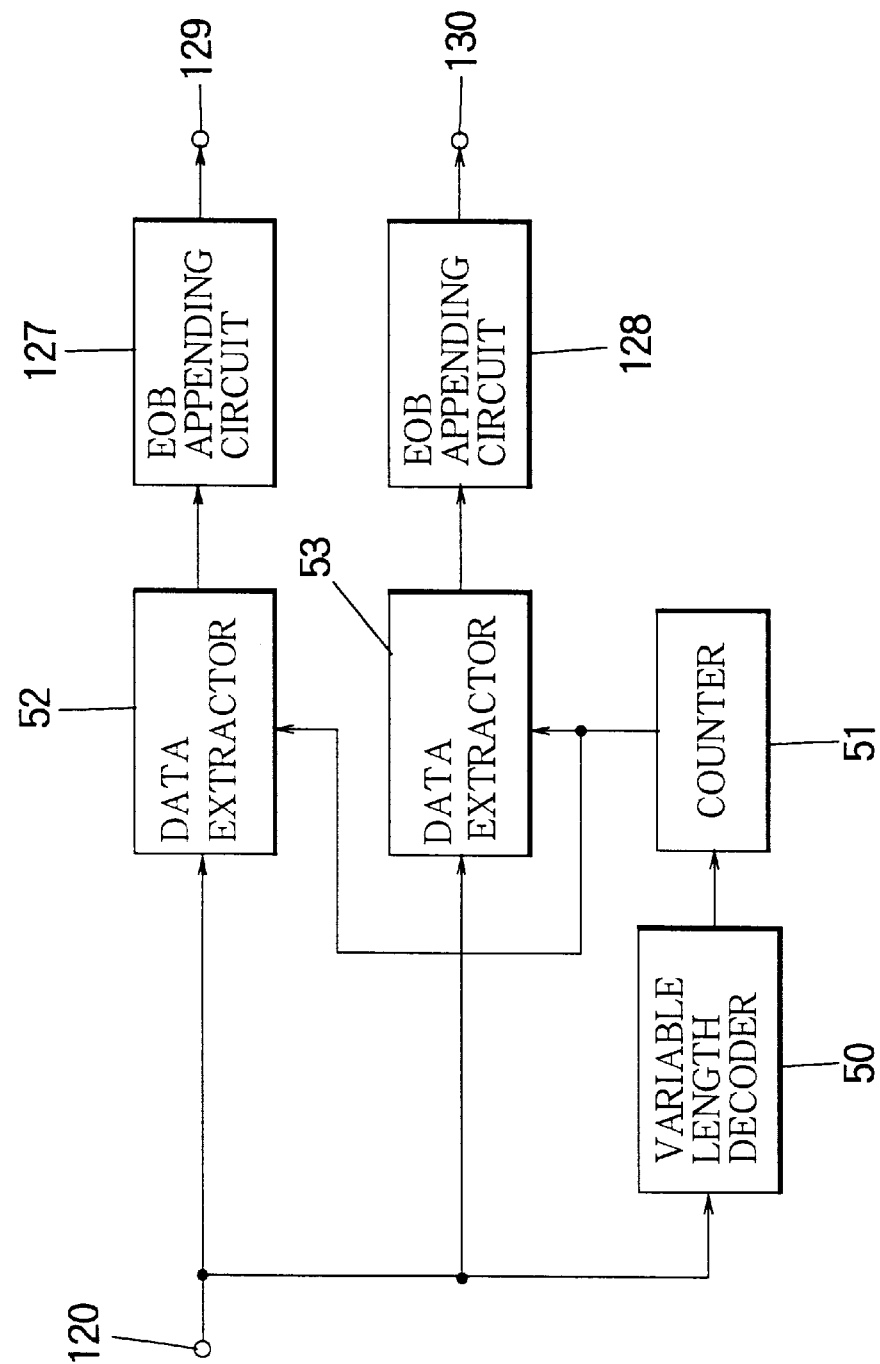
FIG. 14 is a block diagram showing another example of special data forming circuit.

In the special playback data forming circuit 109 shown in FIG. 14, reference numerals 120, 127, 128, 129 and 130 denote members identical to those of the same reference numerals in FIG. 7. In place of the variable-length decoders 121 and 122 in FIG. 7, a single variable-length decoder 50 is provided. It variable-length decodes the input bit stream. In place of the counters 123 and 124 in FIG. 7, a single counter 51 is provided. A low-speed data extractor 52 extracts the low-speed data, while a high-speed data extractor 53 extracts the high-speed data.

The operation will next be described. The intra data input via the input terminal 120 is input to the variable-length decoder 50, and the data extractors 52 and 53. The variable-length decoder 50 variable-length decodes the bit stream. According to the result of the variable-length decoding, the counter 51 counts the number of DCT coefficients obtained by the decoding. The data extractors 52 and 53 extract the data at predefined timings independent of each other and in accordance with the input from the counter 51. The extracted data is supplied to the EOB appending circuits 127 and 128, where EOB's are appended to to extracted data, and the extracted data with the EOB's appended thereto is then output via the output terminals 129 and 130. By employing the configuration described above, the special playback can be obtained, as in the case of FIG. 7.

The configuration of the special playback data forming circuit is not limited to that shown in Embodiments B1 and B2. For instance, the data may be formed by quantization after variable-length decoding, and then variable-length coding.

Embodiment B3

Embodiment B3 relates to playback of the magnetic tape which has been recorded as in Embodiment B1. In Embodiment B1, 4×speed is set for the low-speed playback with the 9000 rpm system, and 16×speed is set for the high-seed system. Moreover, for 4500 rpm, 2×speed and 8×speed are set as the low-speed playback speed and a high-speed playback speed. In Embodiment B3, playback can be achieved at any of the playback speeds.

Figure 15:
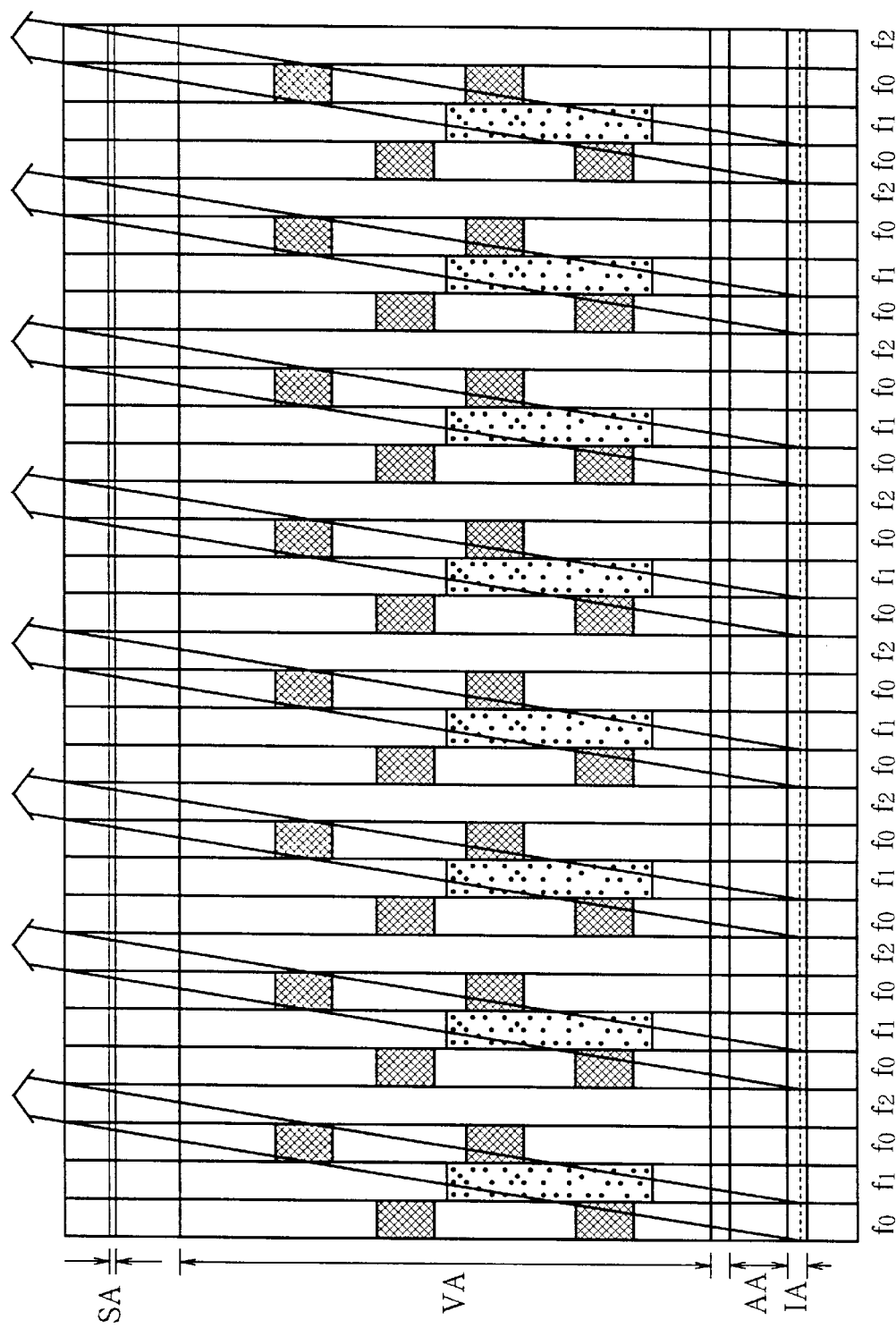
FIG. 15 shows the scanning traces when 4×speed playback is conducted with 1 channel×2 drum configuration.

FIG. 15 shows the scanning traces when 4×speed playback is conducted with 1 channel×2 drum configuration. The arrows indicate the scans of the head during 4×speed playback. In this case, the tracking is so controlled that the tracking error is zero at the special playback area for 4×speed playback. The special playback data for 4×speed is recorded, being repeated twice forming two units of such special playback data, with a B-channel, so that one of the two unit is scanned by an A-channel head and the other unit is scanned by a B-channel head, with the result that it is possible to reproduce the special playback data for 4×speed recorded by the B-channel head. The head also scans the sub-code area and obtains the signals in the sub-code area.

Figure 16:
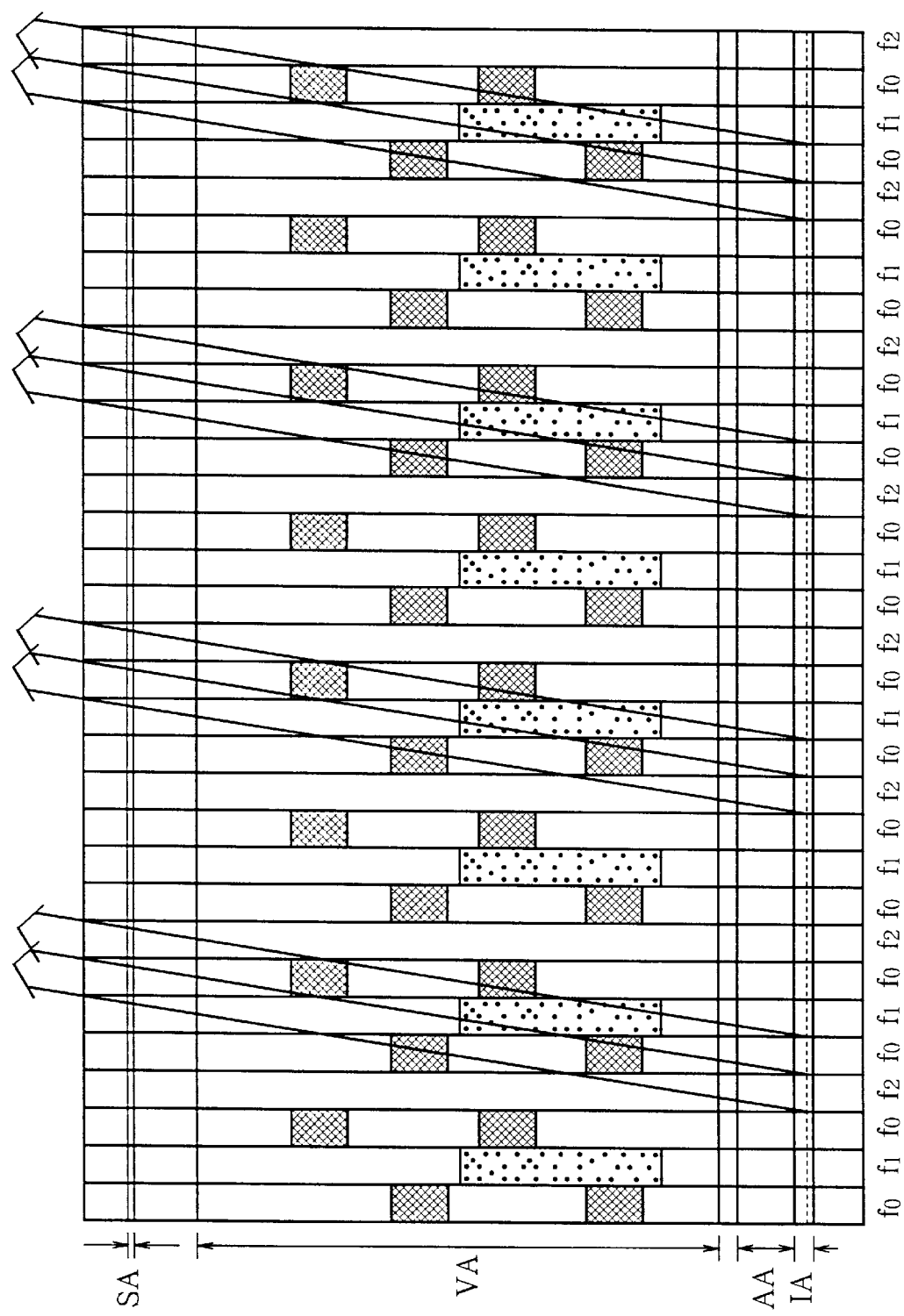
FIG. 16 shows the scanning traces when 4×speed playback is conducted with 2 channels×1 drum configuration.

FIG. 16 shows the scanning traces when 4×speed playback is conducted with 2 channels×1 drum configuration. The arrows indicate the scans of the head during 4×speed playback. In this case, the tracking is so controlled that the tracking error is zero at the special playback area for 4×speed playback. The special playback data for 4×speed is recorded, being repeated twice forming two units of such special playback data, with a B-channel, so one of the two units is scanned by a B-channel head, with the result that it is possible to reproduce the special playback data for 4×speed recorded by the B-channel head. The head also scans the sub-code area and obtains the signals in the sub-code area.

Figure 17:
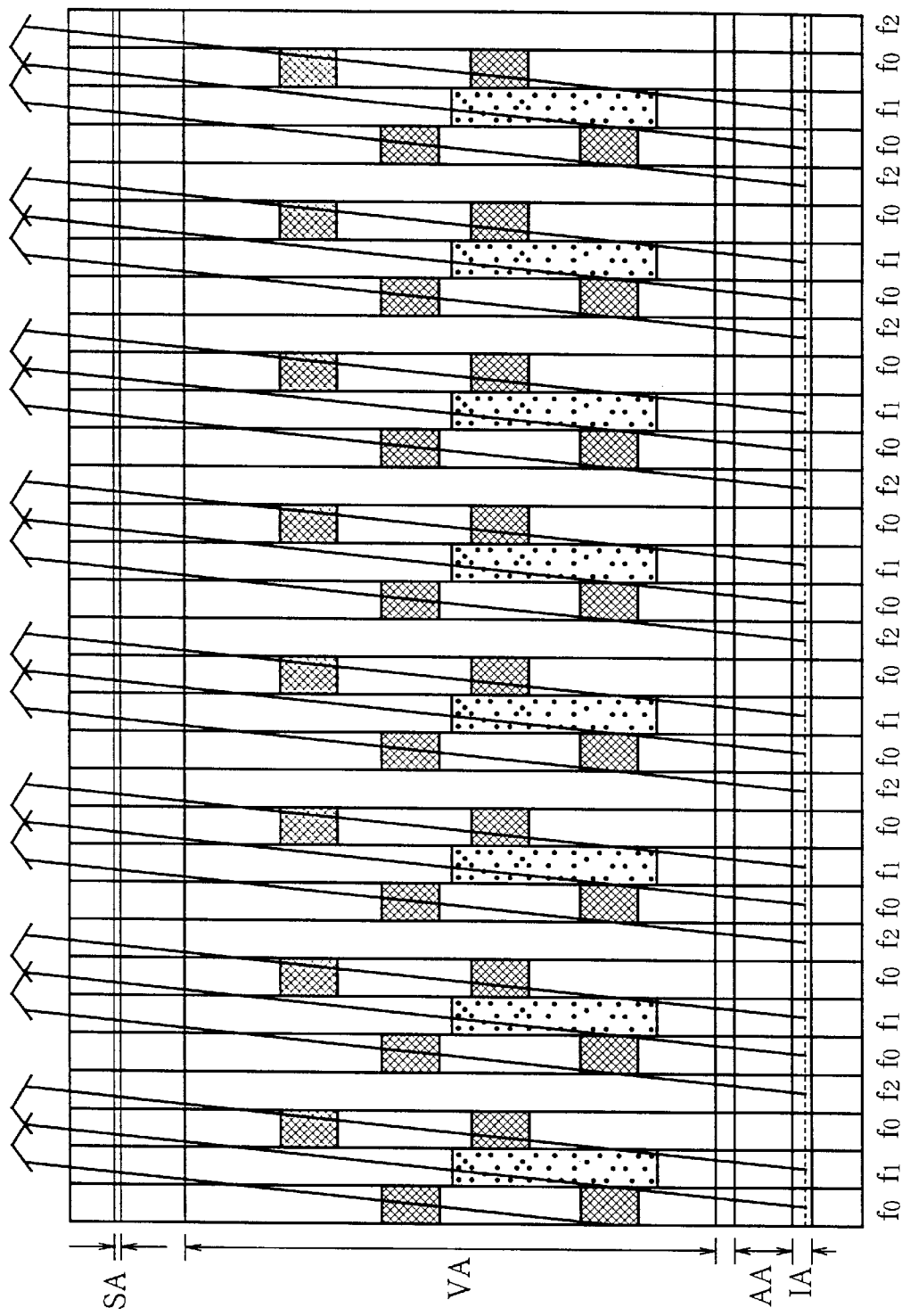
FIG. 17 shows the scanning traces when 2×speed playback is conducted with 2 channels×2 drum configuration.

FIG. 17 shows the scanning traces when 2×speed playback is conducted with 2 channels ×2 drum configuration. The arrows indicate the scans of the head during 2×speed playback. In this case, the tracking is so controlled that the tracking error is zero at the special playback area for 4×speed playback. The special playback data for 4×speed is recorded, being repeated twice forming two units of such special playback data, with a B-channel, so one of the two units is scanned by a B-channel head, with the result that it is possible to reproduce, during 2×speed playback, the special playback data for 4×speed recorded by the B-channel head. The head also scans the sub-code area and obtains the signals in the sub-code area.

Figure 18:
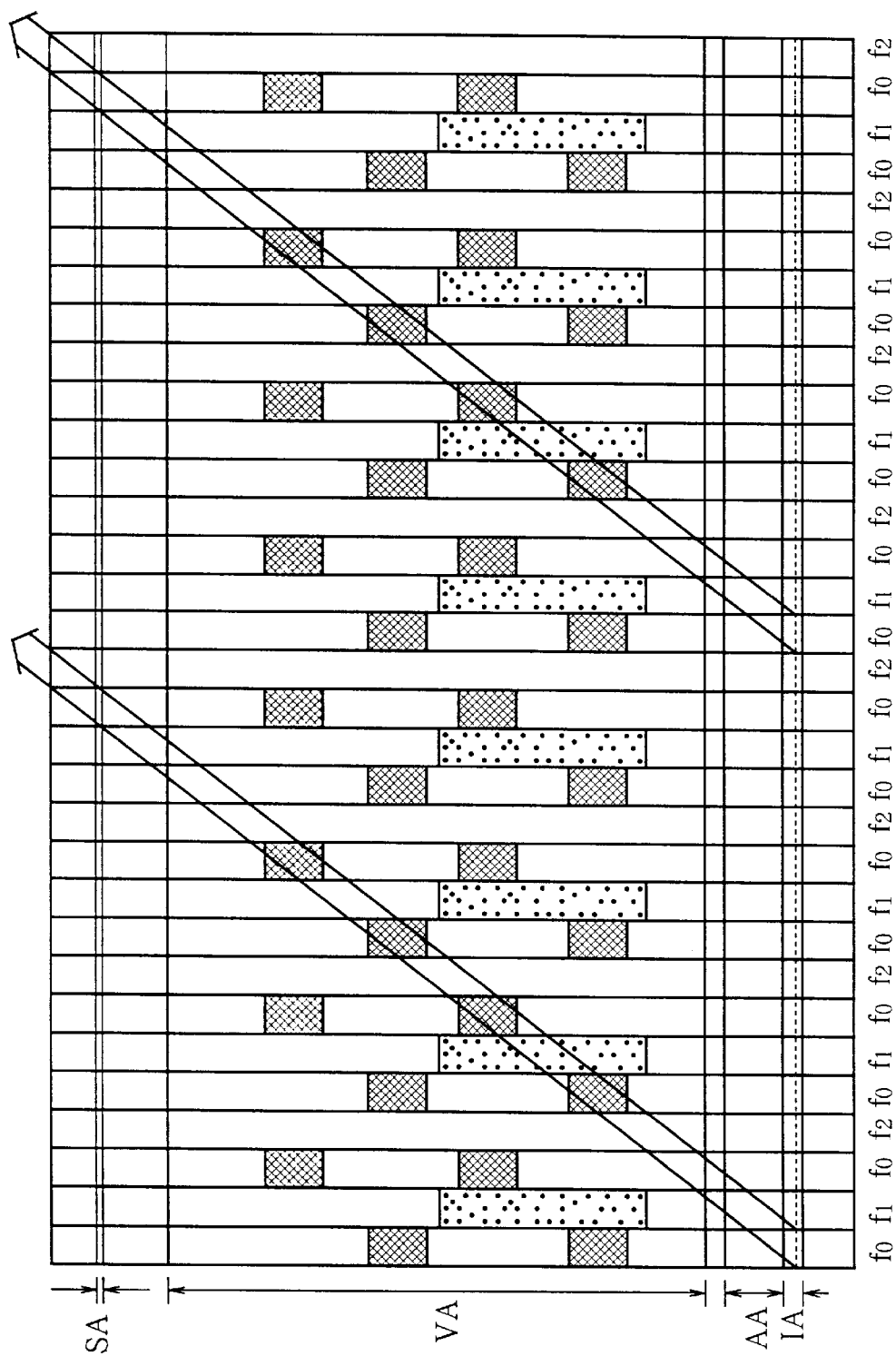
FIG. 18 shows the scanning traces when 16×speed playback is conducted with 1 channel×2 drum configuration.

FIG. 18 shows the scanning traces when 16×speed playback is conducted with 1 channel×2 drum configuration. The arrows indicate the scans of the head during 16×speed playback. The special playback data for 16×speed is recorded, being repeated eight times forming eight units of such special playback data, with an A-channel, so that one of the eight units is scanned by an A-channel head and the one of the other eight units is scanned by a B-channel head. As a result, it is possible to reproduce the special playback data for 4×speed recorded by the A-channel head. The head also scans the sub-code area and obtains the signals in the sub-code area.

Figure 19:
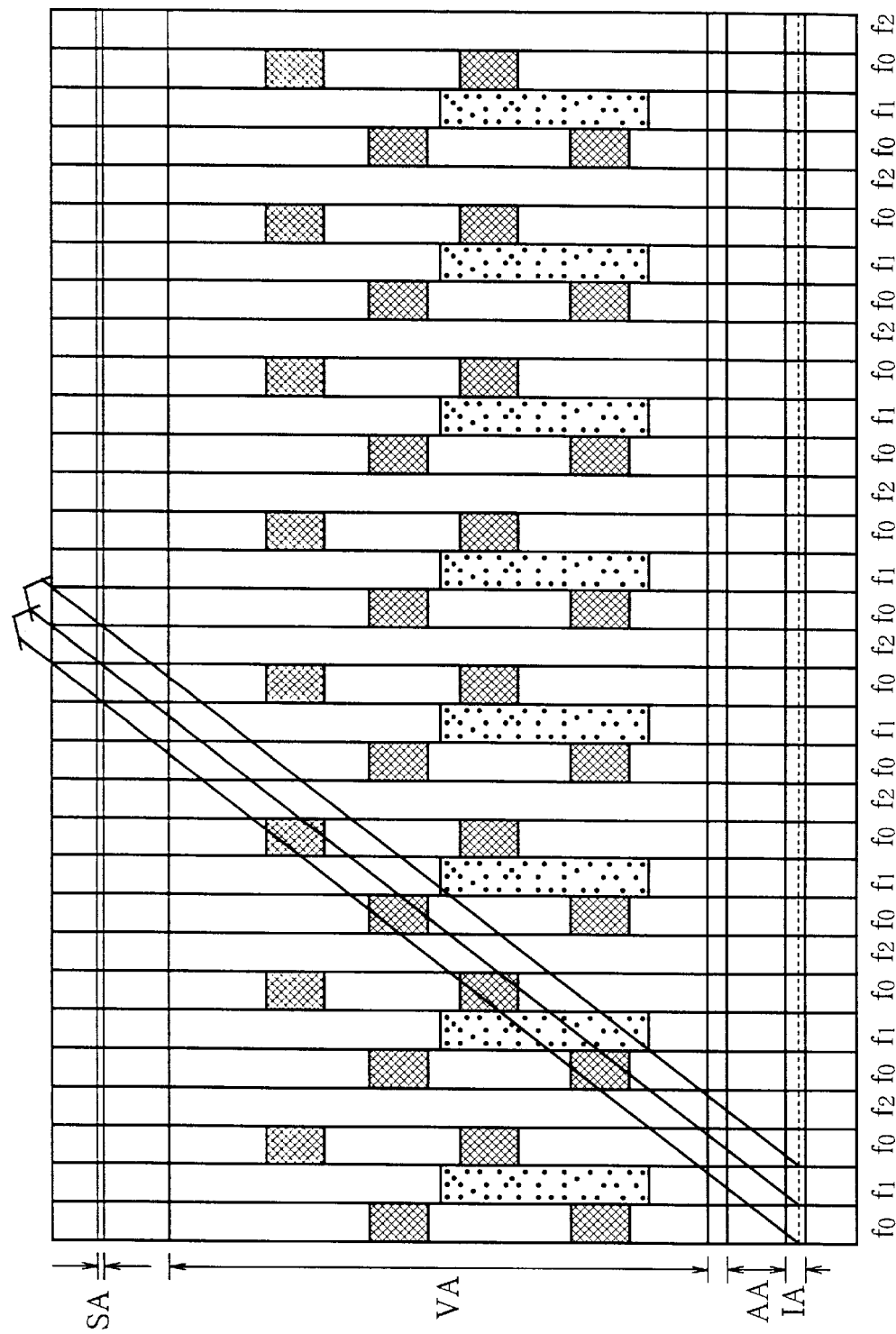
FIG. 19 shows the scanning traces when 16×speed playback is conducted with 2 channels×1 drum configuration.

FIG. 19 shows the scanning traces when 16×speed playback is conducted with 2 channels×1 drum configuration. The arrows indicate the scans of the head during 16×speed playback. The special playback data for 16×speed is recorded, being repeated eight times forming eight units of such special playback data, so that one of the eight units is scanned by the 2-channel head. As a result, it is possible to reproduce the special playback data for 4×speed recorded by the A-channel head. The head also scans the sub-code area and obtains the signals in the sub-code area.

Figure 20:
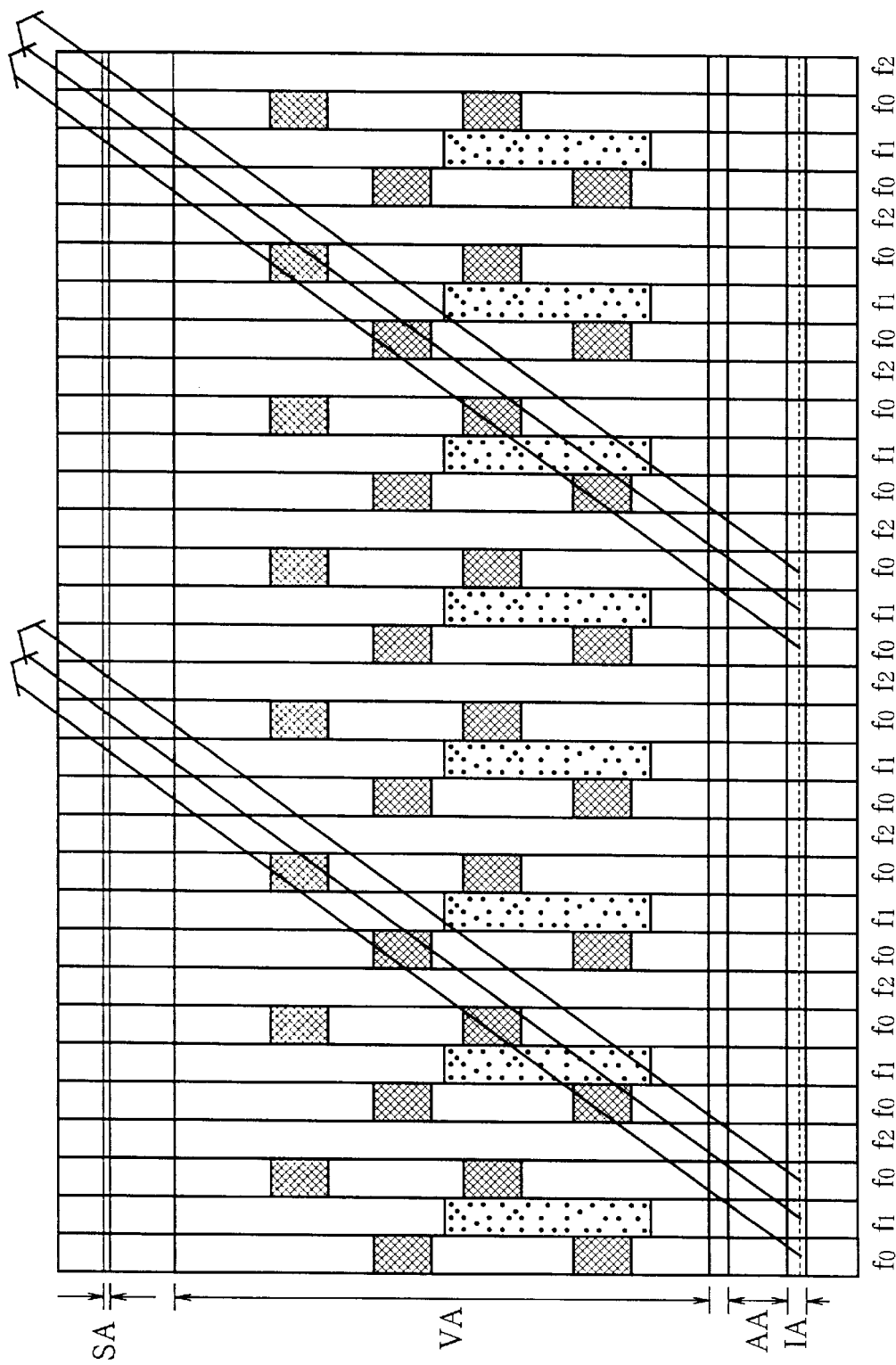
FIG. 20 shows the scanning traces when 16×speed playback is conducted with 2 channels×2 drum configuration.

FIG. 20 shows the scanning traces when 16×speed playback is conducted with 2 channels×2 drum configuration. The arrows indicate the scans of the head during 8×speed playback. The special playback data for 16×speed is recorded, being repeated eight times forming eight units of such special playback data, so that one of the eight units is scanned by the 2-channel head. As a result, it is possible to reproduce, during 8×speed playback, the special playback data for 16×speed recorded by the A-channel head.

Figure 21:
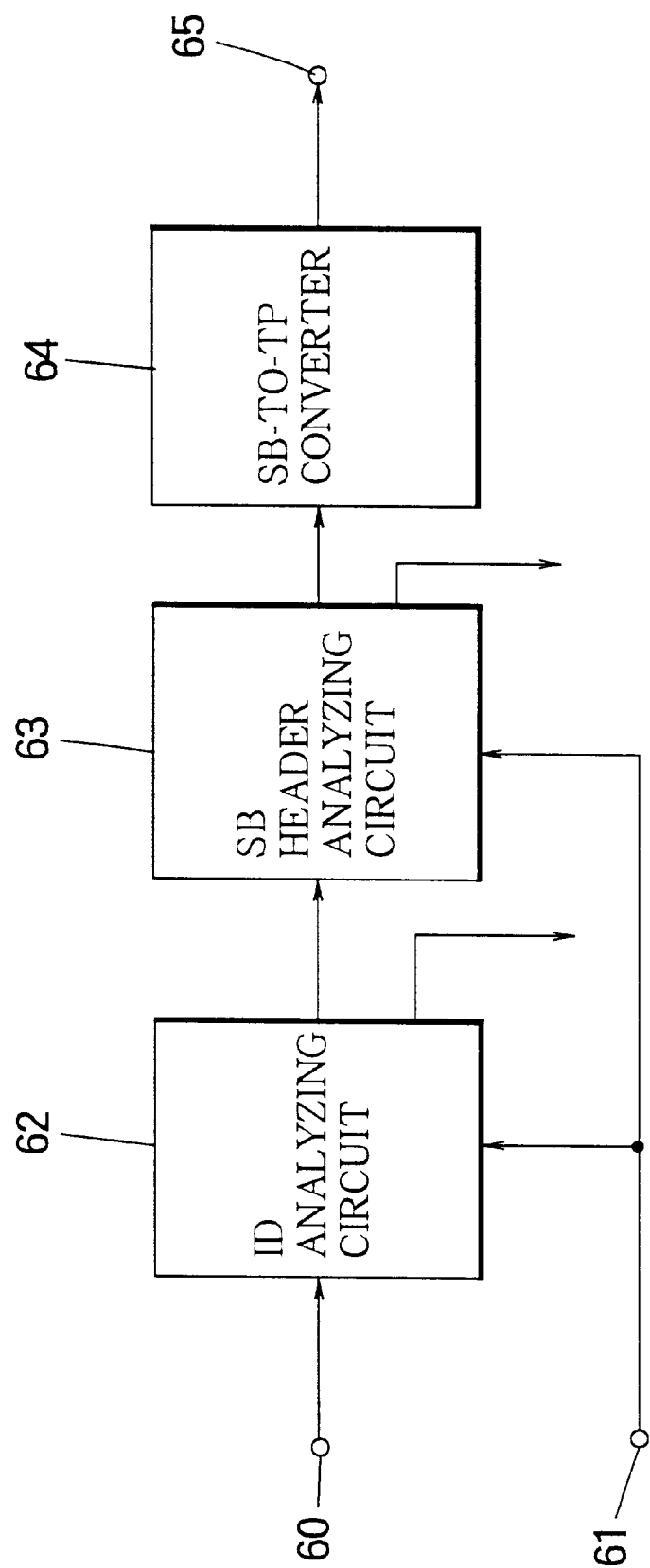
FIG. 21 is a block diagram of a circuitry for processing the playback signals from the recording pattern according to Embodiment B1.

The signal processing during playback will next be described with reference to FIG. 21. Referring to the figure, a playback data input terminal 60 is for receiving playback data, a mode signal input terminal 61 is for receiving a mode signal from a system controller or the like, an ID analyzer 62 analyzes the ID's in the reproduced sync blocks, and selects the reproduced data, an SB header analyzer 63 analyzes the header appended to each sync block, and selects the reproduced data, an SB-to-TP converter for converting the reproduced sync blocks into transport packets, and a reproduced SB output terminal 65 is for outputting the reproduced SB's.

The operation will next be described. Playback data input via the playback data input terminal 60 (to which error correction decoding according to SD specification has been applied) is input to the ID analyzer 62, to which the signal indicating the playback mode is also input via the mode input terminal 61. The ID analyzer 62 finds which of the normal playback and the special playback the playback mode signal indicates. In the case of the normal playback, the normal playback data output, sync he main areas is output, sync block by sync block, to the subsequent stage. In the case of the special playback data the data recorded in the special playback data is output, sync block by sync block, to the subsequent state. In each of the playback mode, the data for the other playback mode is discarded, sync block by sync block. Whether the current sync block is from the main area or the special playback area can be recognized by the ID or the header appended to each sync block.

The data selected by and output from the ID analyzer 62 is input to the SB header analyzer 63, which finds the speed multiplier on the basis of the information from the playback mode signal, and outputs the sync blocks from the special playback data for which the speed multiplier has been found to match. The data from the special playback data areas for which matching with the playback mode signal has not been recognized is discarded. During normal playback, the input data is output without modification. The judgement is achieved by analyzing the ID's or the header appended to each sync block.

The data output from the SB header analyzer 63 is input to the SB-to-TP converter 64, where the sync blocks are converted into transport packets, and output via the reproduced SB output terminal 65.

In this way, during normal playback, only the data recorded in the main areas is used, and during special playback for each of various playback speeds, only the data recorded in the corresponding special playback area is used. It is thus possible to achieve playback at each of the playback speeds.

Embodiment B4

In Embodiment B3, the playback is effected at a playback speed set in Embodiment B1. In Embodiment B4, the playback is effected by reproducing the data in special playback areas for a certain playback speed set in Embodiment B1, and at a speed different from said certain playback speed.

Figure 22:
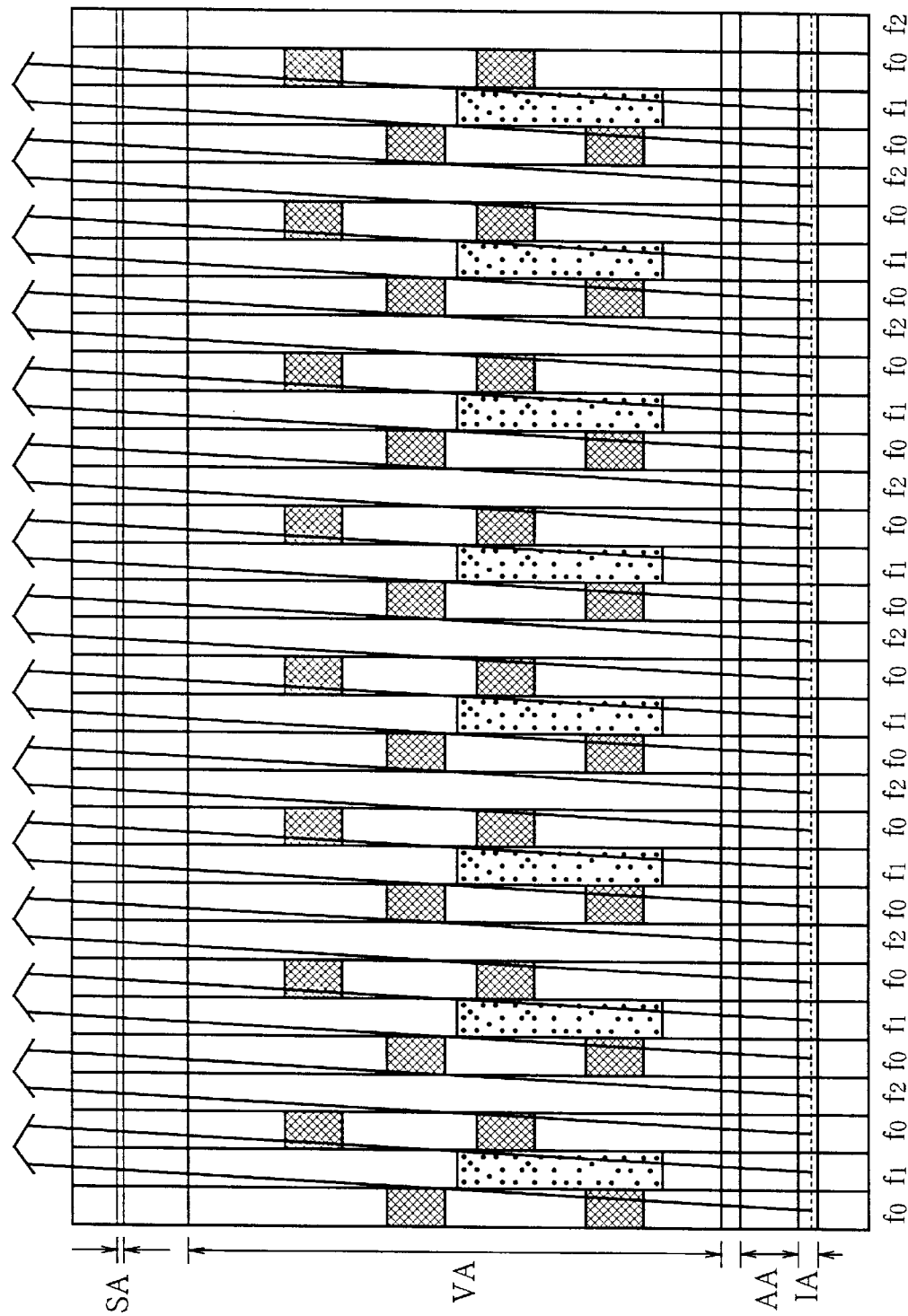
FIG. 22 shows the scanning traces when 2×speed playback is conducted from 4×speed special playback areas with 1 channel×2 drum configuration.

FIG. 22 shows the scanning traces when 2×speed playback is conducted with 1 channel×2 drum configuration. The arrows indicate the scans of the head. The tracking control is so made that the tracking error at the special playback data area for 4×speed playback is minimized. The 4×speed special playback data recorded, being repeated twice, in the special playback data for 2×special playback is utilized. Then, the same special playback data is reproduced twice. One of such two units of data is discarded, to achieve 2×speed playback.

Figure 23:
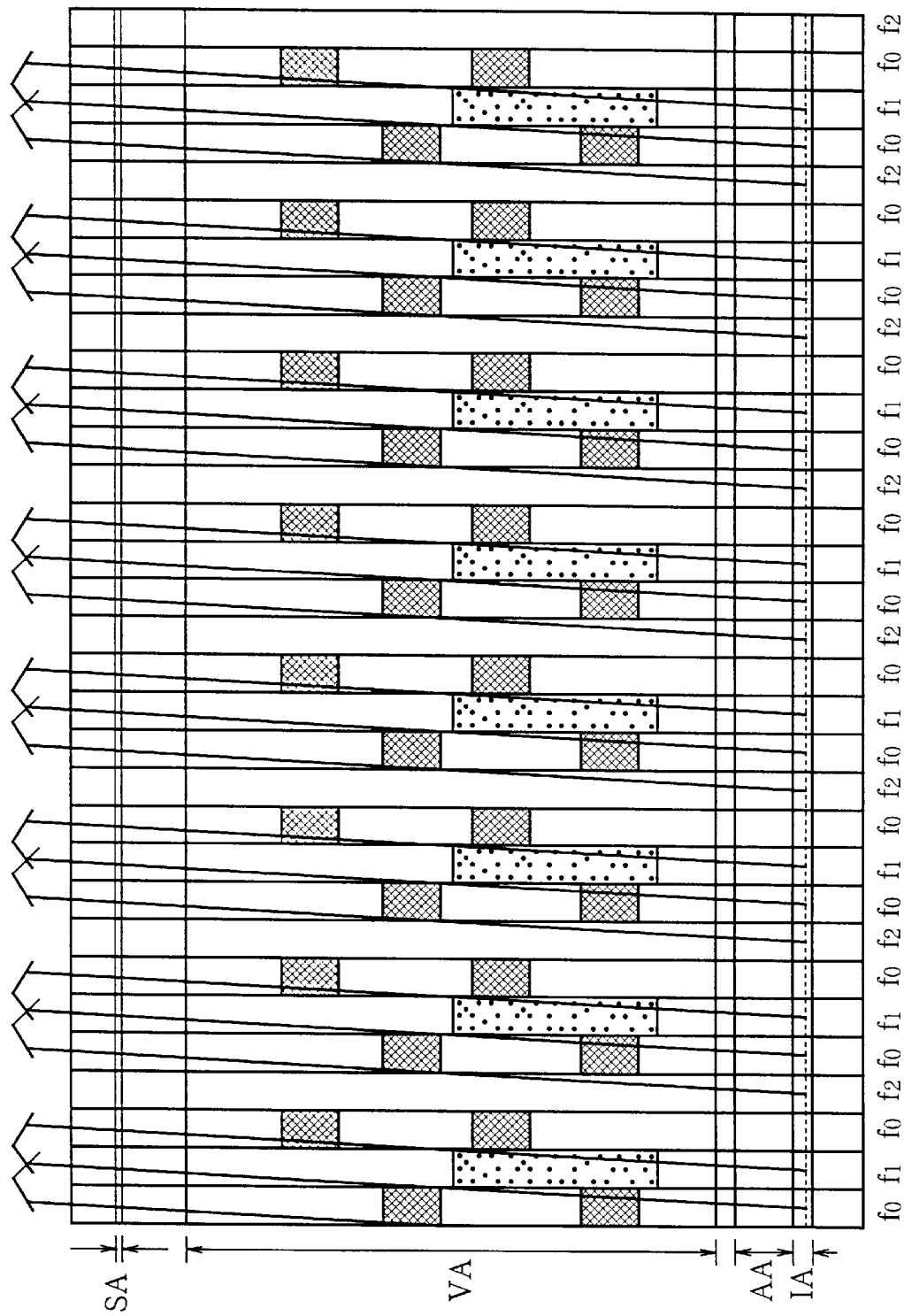
FIG. 23 shows the scanning traces when 2×speed playback is conducted from 4×speed special playback areas with 2 channels×1 drum configuration.

FIG. 23 shows the scanning traces when 2×speed playback is conducted with 2 channels×1 drum configuration. The arrows indicate the scans of the head. In this case, the tracking is so controlled that the tracking error is zero at the special playback area for 4×speed playback. The tracking control is so made that the tracking error at the special playback data area for 4×speed playback is minimized. The 4×speed special playback data recorded, being repeated twice, in the special playback data for 4×special playback is utilized. Then, the same special playback data is reproduced twice. One of such two units of data is discarded, to achieve 2×speed playback.

In Embodiment B4, the data in the 4×speed speed area is reproduced at 2×speed. The invention is not limited to this particular example. When the special playback data is recorded, being concentrated at one location, as in the case of the 4×speed playback data of the present embodiment, the data in the special playback area for a set playback speed may be reproduced by a speed lower than said set playback speed.

Embodiment B5

Embodiment B5 uses a recording format different from that of Embodiment B1. In this embodiment, 4×speed playback is taken as an example of low-speed playback.

Moreover, for high-speed playback, both playback in forward and playback in reverse direction are set. The forward high-speed playback is assumed to be 16×speed playback, while the reverse high-speed playback is assumed to be −16×speed playback.

The circuits and operations of this embodiment are basically identical to those described with reference to FIG. 6 and FIG. 7 in connection with Embodiment B1, or with reference to FIG. 14 in connection with Embodiment B9.

Figure 24A:
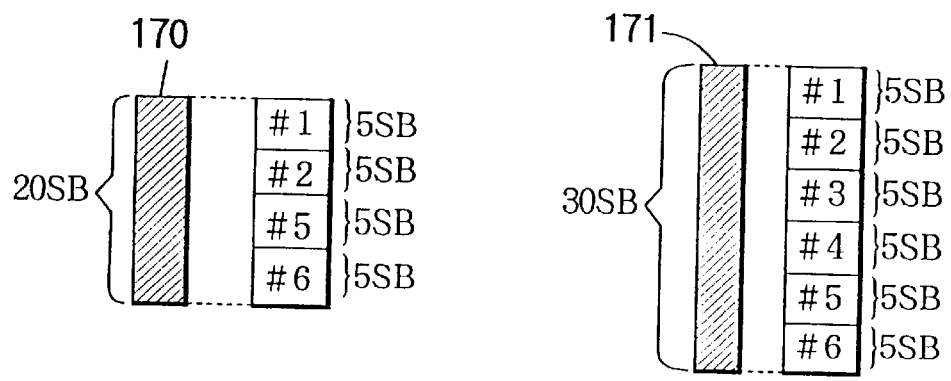
FIG. 24A to FIG. 24C shows an example of the configuration of the special playback areas in Embodiment B5.
Figure 24B:
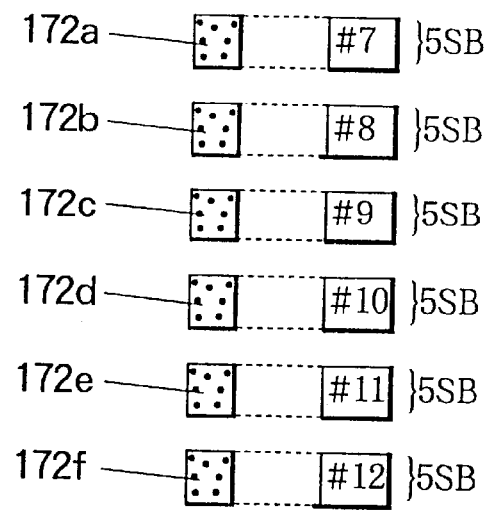
Figure 24C:
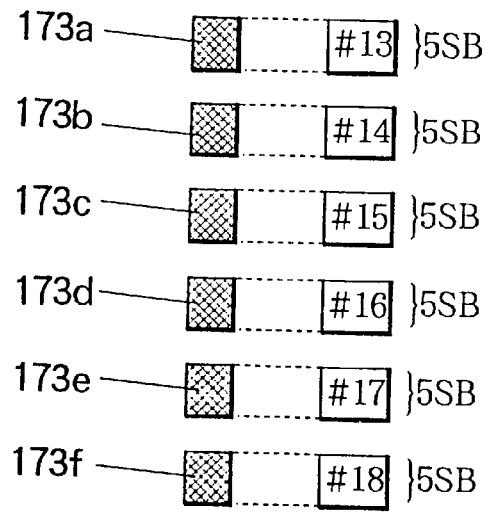

The configuration of the special playback areas is as shown in FIG. 24A to FIG. 24C. In the figures, A-channel low-speed playback data recording areas 170 are for recording low-speed playback data by means of an A-channel head, B-channel low-speed playback data recording areas 171 are for recording low-speed playback data by means of a B-channel head, A-channel forward high-speed playback data recording areas 172a to 172f are for recording forward high-speed playback data by means of an A-channel head, and A-channel reverse high-speed playback data recording areas 173a to 173f are for recording forward high-speed playback data by means of an A-channel head. When 2 channels×2 drum configuration is employed, the data in the areas 172a to 172f will be used as forward high-speed playback data for a speed one half the above-mentioned speed, i.e., the speed for which the data recorded in the areas are used in the case of the 1 channel×2 or 2 channels ×1 drum configuration, and the data in the areas 173a to 173f will be used as reverse high-speed playback data for a speed one half the above-mentioned speed, i.e., the speed for which the data recorded in the areas are used in the case of the 1 channel×2 or 2 channels×1 drum configuration. The reason is as described in connection with Embodiment B1.

The low-speed playback data areas will next be described. As described above, in this embodiment, A-channel low-speed playback data areas and B-channel low-speed playback data areas are provided as the low-speed playback data areas. If, in a 4500 rpm drum configuration, the same playback speed is used as in a 9000 rpm drum configuration, the number of tracks the head crosses is larger and the number of sync blocks obtained by one burst will be one half. Taking this into consideration, the low-speed playback data areas enables substantially equal number of playback sync blocks to be obtained at the same playback speed when a 4500 rpm drum configuration is used as when a 9000 rpm drum configuration is used. That is, when a 4500 rpm drum configuration is used, the data in B-channel low-speed playback data areas which cannot be reproduced by a B-channel head can be obtained from A-channel low-speed playback data areas by an A-channel head.

The numbers #1 to #18 allotted to the blocks in FIG. 24A to FIG. 24C identify the contents of the data: the same numbers indicate the same contents of the data. In the figures, the data at the upper and lower ends of the B-channel low-speed playback data areas 171 form the data for the A-channel low-speed playback data areas 170. The reason is as described above.

The data in the area 170 consists of 20 sync blocks, the data in the area 171 consists of 30 sync blocks, the data in each of the area 172a to 172f and 173a to 173f 170 consists of 5 sync blocks. The number of sync blocks allocated to each unit of data is based on the number of sync blocks which can be obtained at each of the high-speed playback speed (see FIG. 11).

Figure 25:
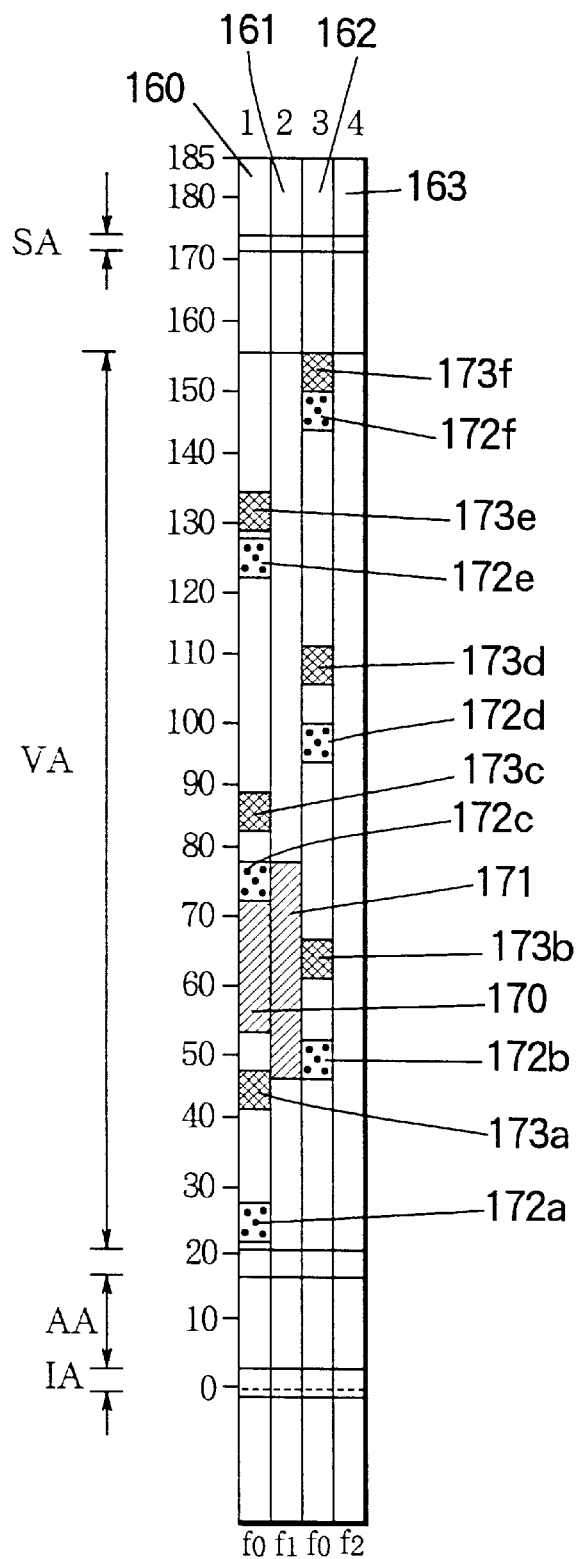
FIG. 25 is a track pattern diagram showing an example of arrangement of the special playback data areas.

An example of arrangement of the special playback data areas is shown in FIG. 25. The explanation for FIG. 12, including that for the reference numerals 160 to 163, and f0 to f2, applies also to FIG. 25. Areas other than the areas 170, 171, 172a to 172f and 173a to 173f are used as main areas for recording normal playback data. In the case of 9000 rpm drum configuration, the data in the 4×speed playback area 171 can be reproduced as data in one concentrated area by one scan during 4×speed playback. In the case of the 4500 rpm drum configuration, by supplementing the data from the area 171 by the data from the adjacent area 170, all the 4×speed playback data can be obtained. In the case of 9000 rpm drum configuration, the data in the 16×speed playback data areas 172a to 172f can be reproduced by one scan of the head as data from six areas at the 16×speed. In the case of 4500 rpm drum configuration, the data in the 16×speed playback data areas 172a to 172f can be reproduced by one scan of the head as the data from six areas at the 8×speed which is one half the 16×speed. In the case of 9000 rpm drum configuration, the data in the −16×speed playback data areas 173a to 173f can be reproduced by one scan of the head as data from six areas at the −16×speed. In the case of 4500 rpm drum configuration, the data in the −16×speed playback data areas 173a to 173f can be reproduced by one scan of the head as the data from six areas at the −8×speed which is one half the −16×speed.

The 16×speed playback data and the −16×speed playback data are identical in the data rate, and the like, and the SB formatting circuit 143 effects the formatting such that arrangement is opposite between the 16×speed playback data and the −16×speed playback data. That is, in FIG. 25, the data recorded in the area 172a (which is one of the 16×speed playback data areas) is also recorded in the area 173f (which is one of the −16×speed playback data areas). Similarly, the recording format is so made that the same data is recorded in the the areas 172b and 173a, the areas 172c and 173d, the areas 172d and 173c, the areas 172e and 173b and the areas 172f and 173a.

Also in FIG. 25, it may be so arranged that the 16×speed playback data areas and −16×speed playback data areas nearer to the edge of the tape have more parts where identical data is recorded in duplication. In the example of FIG. 25, there may be more areas 172b and 172e, or 173b and 173e toward the edges of the tape than the areas 172c and 172d, or 173c and 173d in the central part of the tape, and there may be even more areas 172a and 172f, or 173a and 173f. By securing areas in this way, it is possible to cope with certain errors in the head scanning traces in the 16×speed playback and −16×speed playback with the 9000 rpm drum configuration and 8×speed playback and −8×speed playback with the 4500 rpm drum configuration, and high-speed playback can be achieved reliably.

The numbers of the 4×speed playback data areas, 16×speed playback data areas and −16×speed playback data areas are not limited to the examples described.

Figure 26:
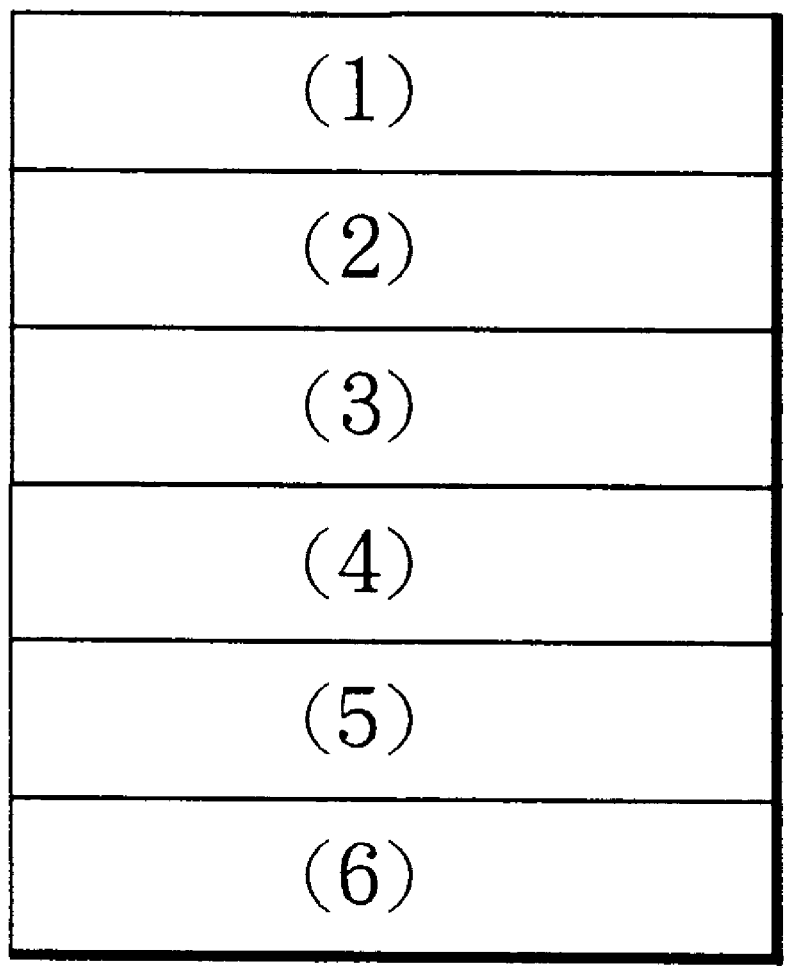
FIG. 26 shows reproduced screen of one frame.

Further details will next be given by indicating the positions from which the data is reproduced. FIG. 26 shows reproduced screen of one frame. In this embodiment one frame is divided into six areas. (The number of areas into which one frame is divided is not limited to this example.) The data having been equally divided into six is disposed in the 16×speed playback data areas and −16×speed playback data areas as shown in FIG. 25. For the 16×speed playback data, the data for part (1) is recorded in the area 172a, the data for part (2) is recorded in the area 172b, the data for part (3) is recorded in the area 172c, the data for part (4) is recorded in the area 172d, the data for part (5) is recorded in the area 172e, and the data for part (6) is recorded in the area 172f.

For the −16×speed playback data, the data for part (6) is recorded in the area 173a, the data for part (5) is recorded in the area 173b, the data for part (4) is recorded in the area 173c, the data for part (3) is recorded in the area 173d, the data for part (2) is recorded in the area 173e, and the data for part (1) is recorded in the area 173f.

By disposing the data as described above, even during reverse high-speed playback, such as −16×speed playback, the playback data is obtained in the order from the top to bottom of the screen, so that a high-speed playback can be achieved without providing a memory for rearranging the data (reversing the order of the data).

According to the disposition of the data of one unit shown in FIG. 25, the ITI area and the sub-code area are scanned by the head during 4×speed playback, 16×speed playback data and −16×speed playback. That is, the pilot signals f0, f1 and f2 for tracking control can be obtained at the ITI areas. Moreover, by recording additional information such as time information, the item number information, additional function such as head-of-item finding function can be realized.

Figure 27:
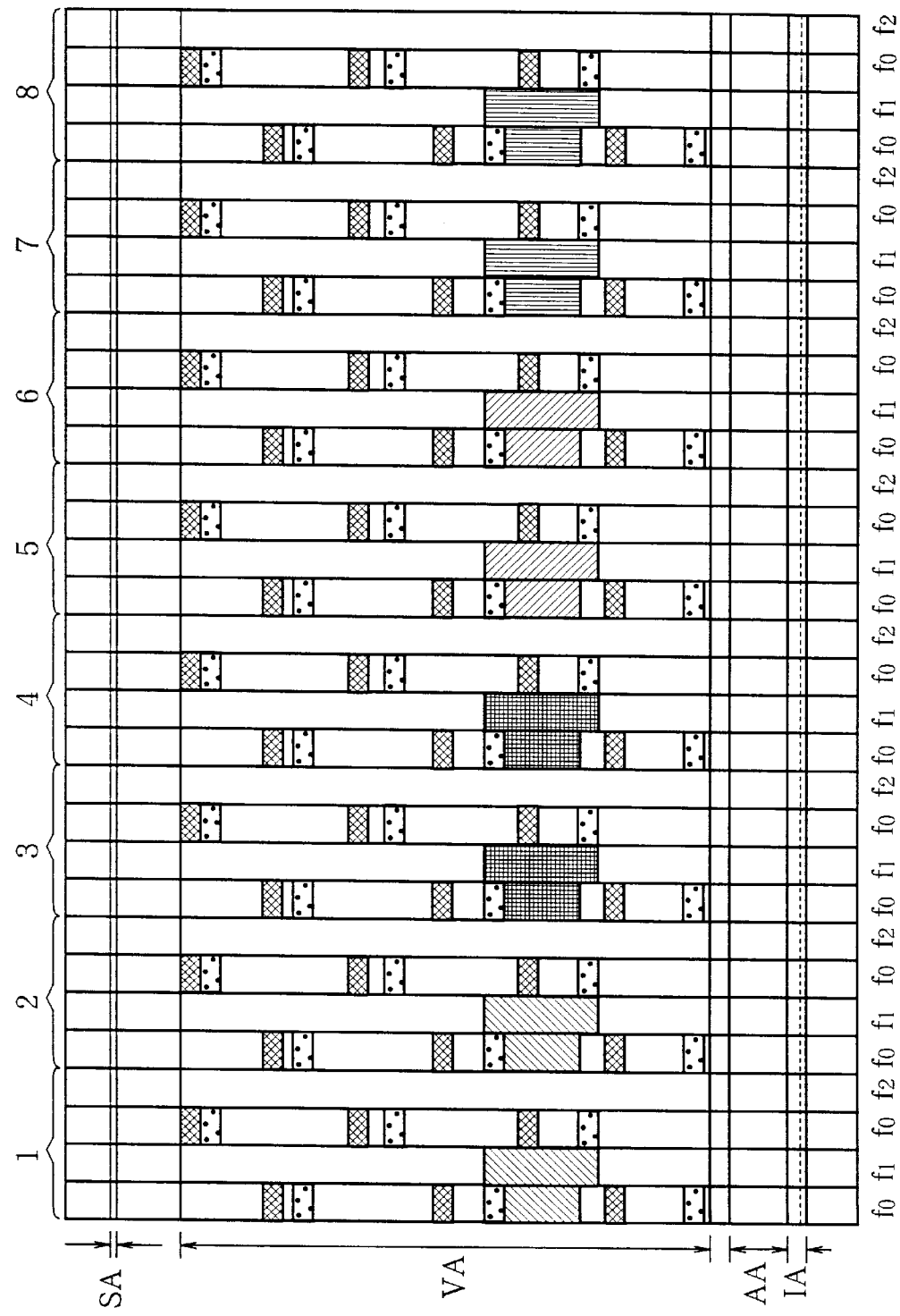
FIG. 27 shows recording pattern according to Embodiment B5.

By repeatedly recording the unit of data shown in FIG. 25, a recording pattern shown in FIG. 27 is formed. The 4×speed playback data is recorded, being repeated twice, and 16×speed playback data and −16×speed playback data are recorded, being repeated eight times.

By forming the recording pattern in this way, the effects of the track non-linearity and head scanning trace non-linearity can be minimized. Moreover, since the areas dedicated for each of the playback speeds are provided, the refresh interval and picture quality can be set for each of the playback speed. Furthermore, since the ITI area and sub-code area are also scanned by the head, it is possible to obtain additional function such as head-of-item finding function by using a signal recorded in the sub-code area. In addition, by providing areas for recording data for use in reverse high-speed playback, reverse fast-playback data areas can be realized without providing a memory for rearranging the data during playback.

Embodiment B6

Embodiment B6 relates to playback of data recorded according to Embodiment B5. As an example of low-speed playback data, 4×speed playback data will be considered. It is assumed that for a 9000 rpm system, 16×speed playback is used as a forward high-speed playback, and −16×speed playback is used as a reverse high-speed playback. For 4500 rpm system, 8×speed playback is used as a forward high-speed playback, and −8×speed playback is used as a reverse high-speed playback. In Embodiment B6, playback is effected at each of the set playback speed.

Figure 28:
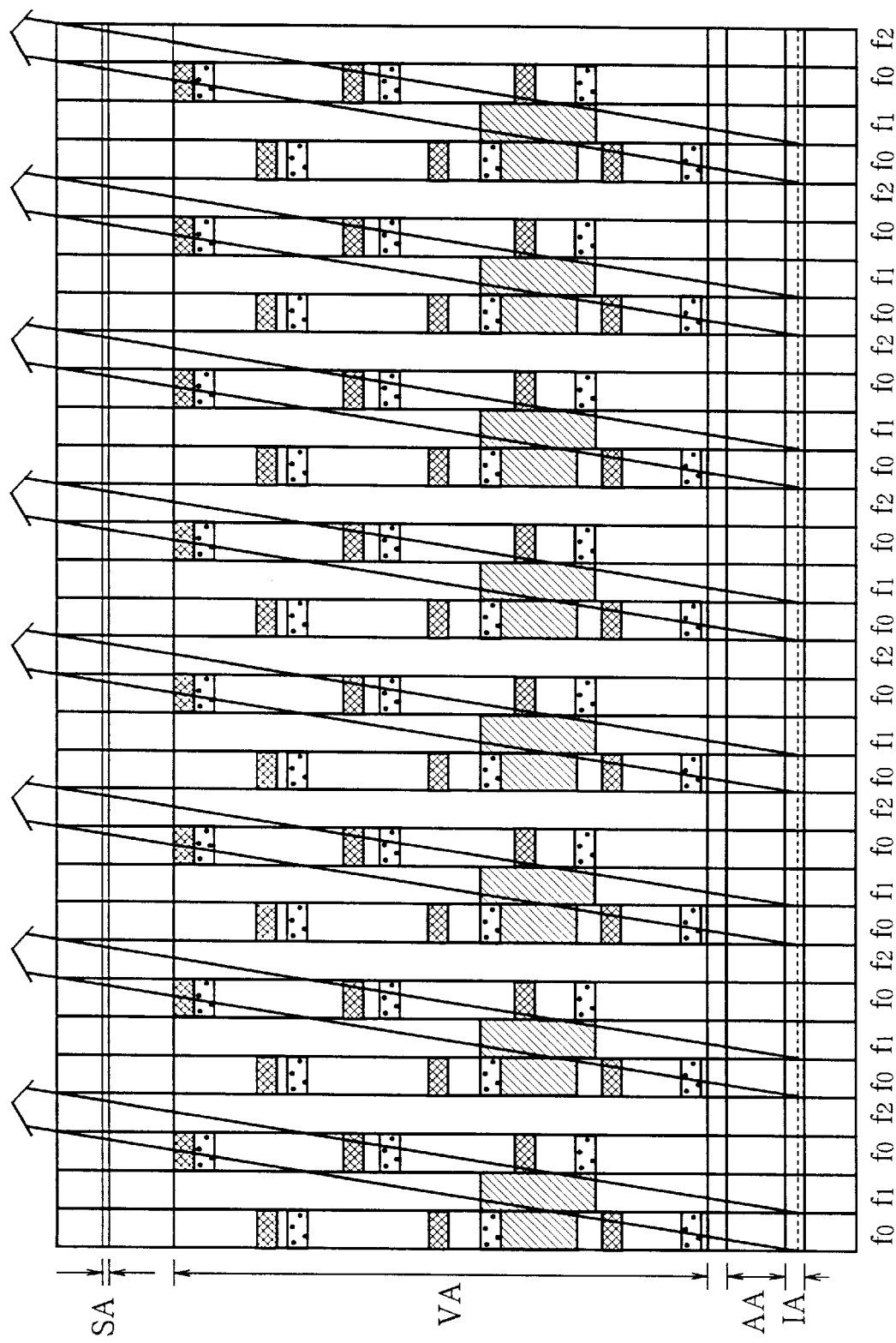
FIG. 28 shows scanning traces when 4×speed playback is performed from the recording pattern according to Embodiment B5 with a 1 channel×2 drum configuration.

FIG. 28 shows scanning traces when 4×speed playback is performed with a 1 channel×2 drum configuration. The arrows indicate scanning traces during 4×speed playback. The tracking control is so made that the tracking error is minimized at the special playback data area. The 4×speed playback data is recorded by a B-channel head, being repeated twice to form two units of such 4×speed playback data. One of the two units is scanned by an A-channel head, while the other unit is scanned by a B-channel head. It is therefore possible to reproduce 4×speed playback data recorded by the B-channel head. The head also scans the sub-code area to obtain the signals in the sub-code area.

Figure 29:
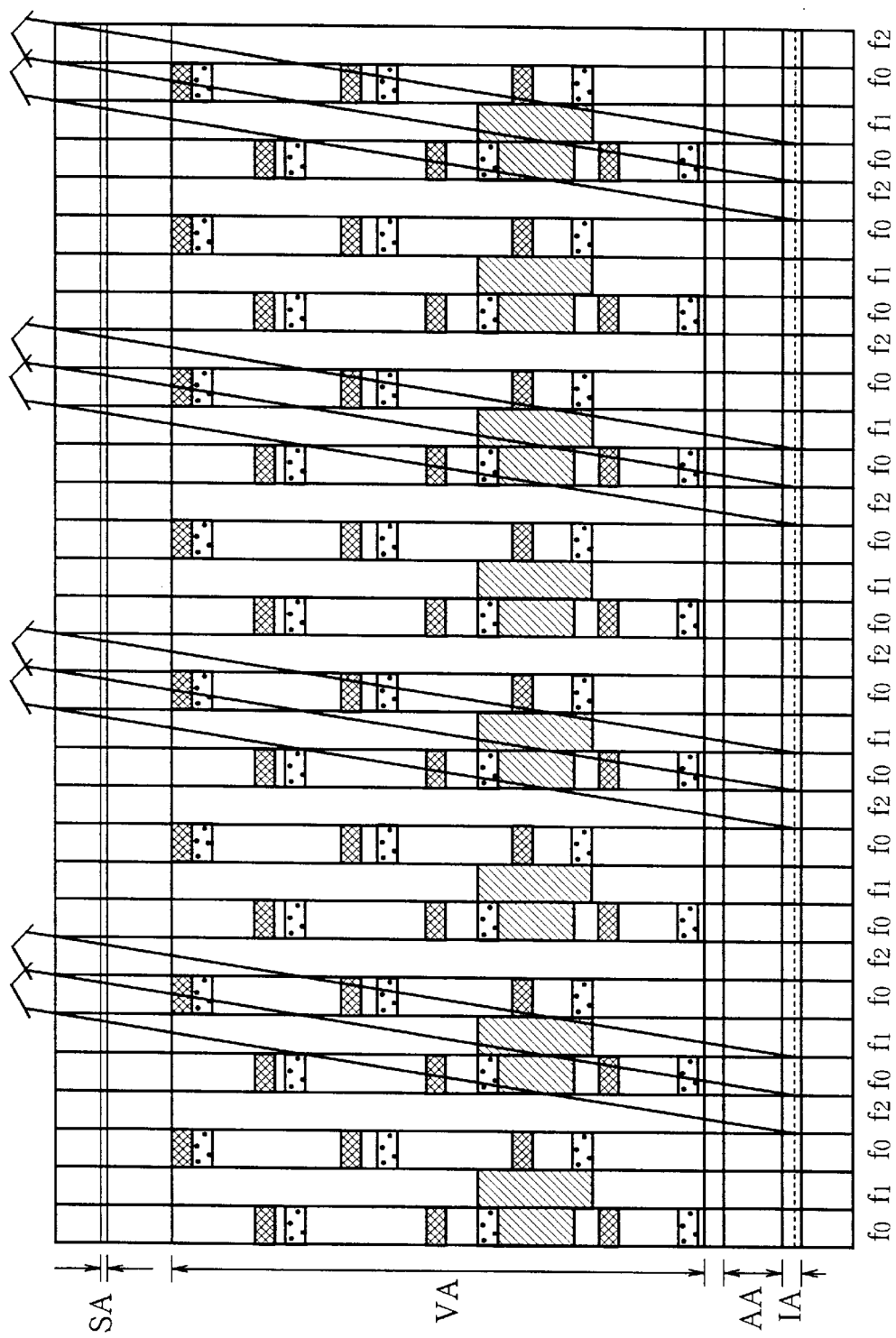
FIG. 29 shows scanning traces when 4×speed playback is performed from the recording pattern according to Embodiment B5 with a 2 channels×1 drum configuration.

FIG. 29 shows scanning traces when 4×speed playback is performed with a 2 channels×1 drum configuration. The arrows indicate scanning traces during 4×speed playback. The tracking control is so made that the tracking error is minimized at the special playback data area. The 4×speed playback data is recorded by a B-channel head, being repeated twice to form two units of such 4×speed playback data. One of the two units is scanned by the heads of 2 channels. It is therefore possible to reproduce 4×speed playback data recorded by the B-channel head. The head also scans the sub-code area to obtain the signals in the sub-code area.

Figure 30:
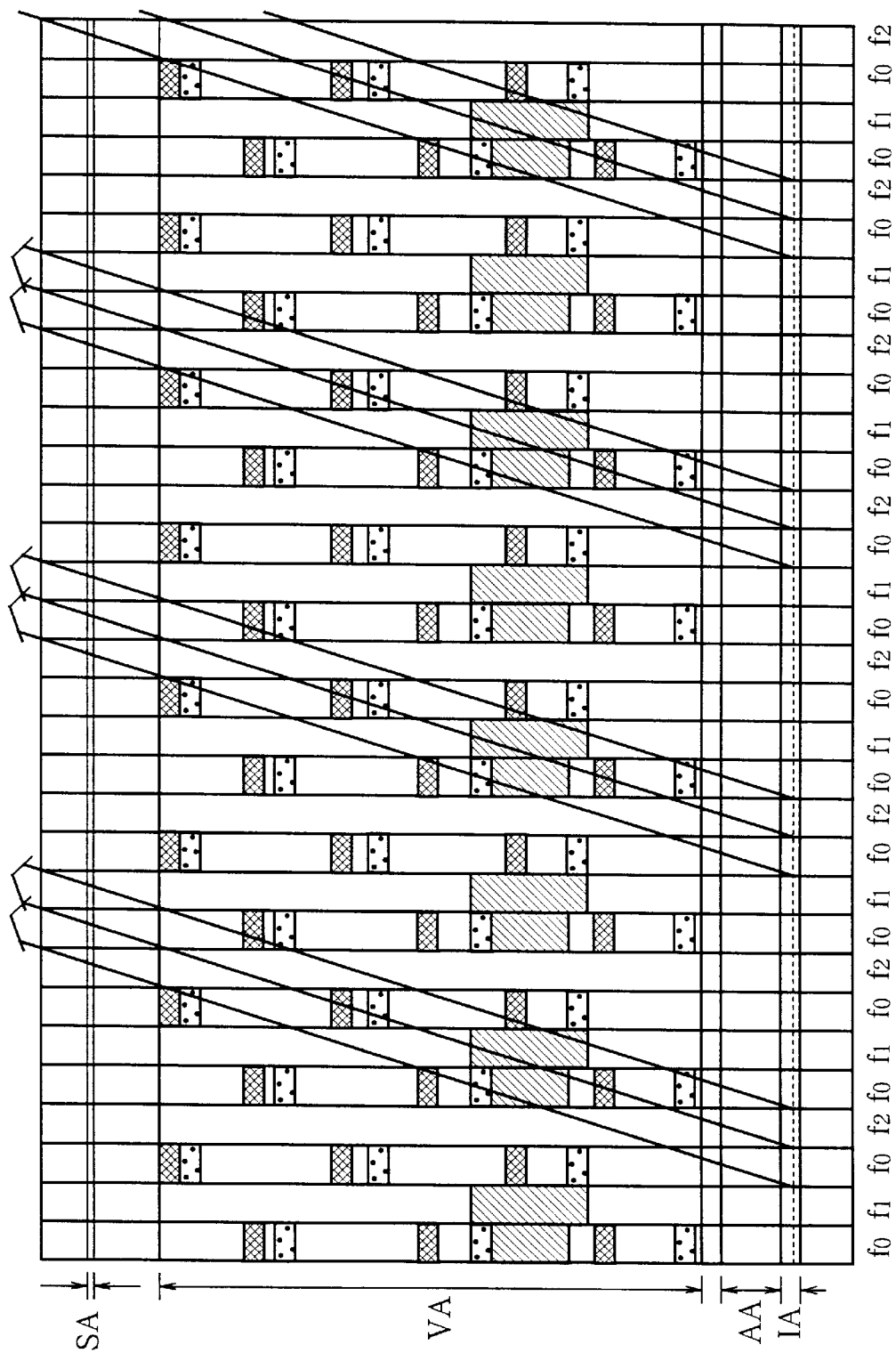
FIG. 30 shows scanning traces when 4×speed playback is performed from the recording pattern according to Embodiment B5 with a 2 channel×2 drum configuration.

FIG. 30 shows scanning traces when 4×speed playback is performed with a 2 channel×2 drum configuration. The arrows indicate scanning traces during 4×speed playback. The tracking control is so made that the tracking error is minimized at the special playback data area. The 4×speed playback data is recorded by a B-channel head, being repeated twice to form two units of such 4×speed playback data. One of the two units is scanned by the heads of 2 channels. However, for the reason set forth in connection with Embodiment B5, not all the data is reproduced by the B channel head alone. But, by supplmenting by the 4×speed playback data which was recorded by an A-channel head and reproduced by an A-channel head, all the data can be obtained. The head also scans the sub-code area to obtain the signals in the sub-code area.

Figure 31:
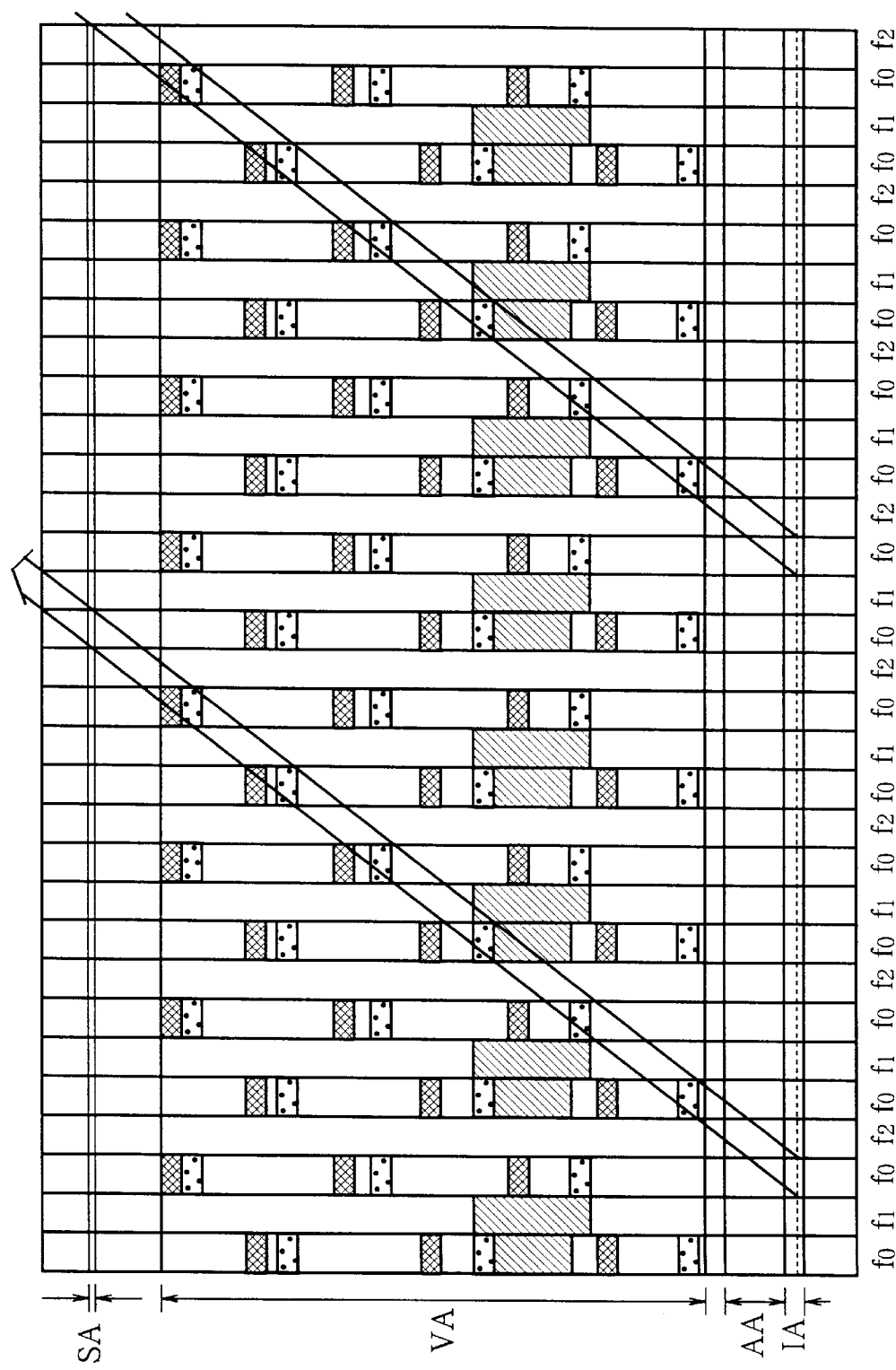
FIG. 31 shows scanning traces when 16×speed playback is performed from the recording pattern according to Embodiment B5 with a 1 channel×2 drum configuration.

FIG. 31 shows scanning traces when 16×speed playback is performed with a 1 channel×2 drum configuration. The arrows indicate scanning traces during 16×speed playback. The 16×speed playback data is recorded by an A-channel head, being repeated eight times to form eight units of such 16×speed playback data. One of the eight units is scanned by an A-channel head, while one of the other eight units is scanned by a B-channel head. It is therefore possible to reproduce 16×speed playback data recorded by the A-channel head. The head also scans the sub-code area to obtain the signals in the sub-code area. Incidentally, it is possible to apply tracking using the pilot signals recorded in the ITI areas.

Figure 32:
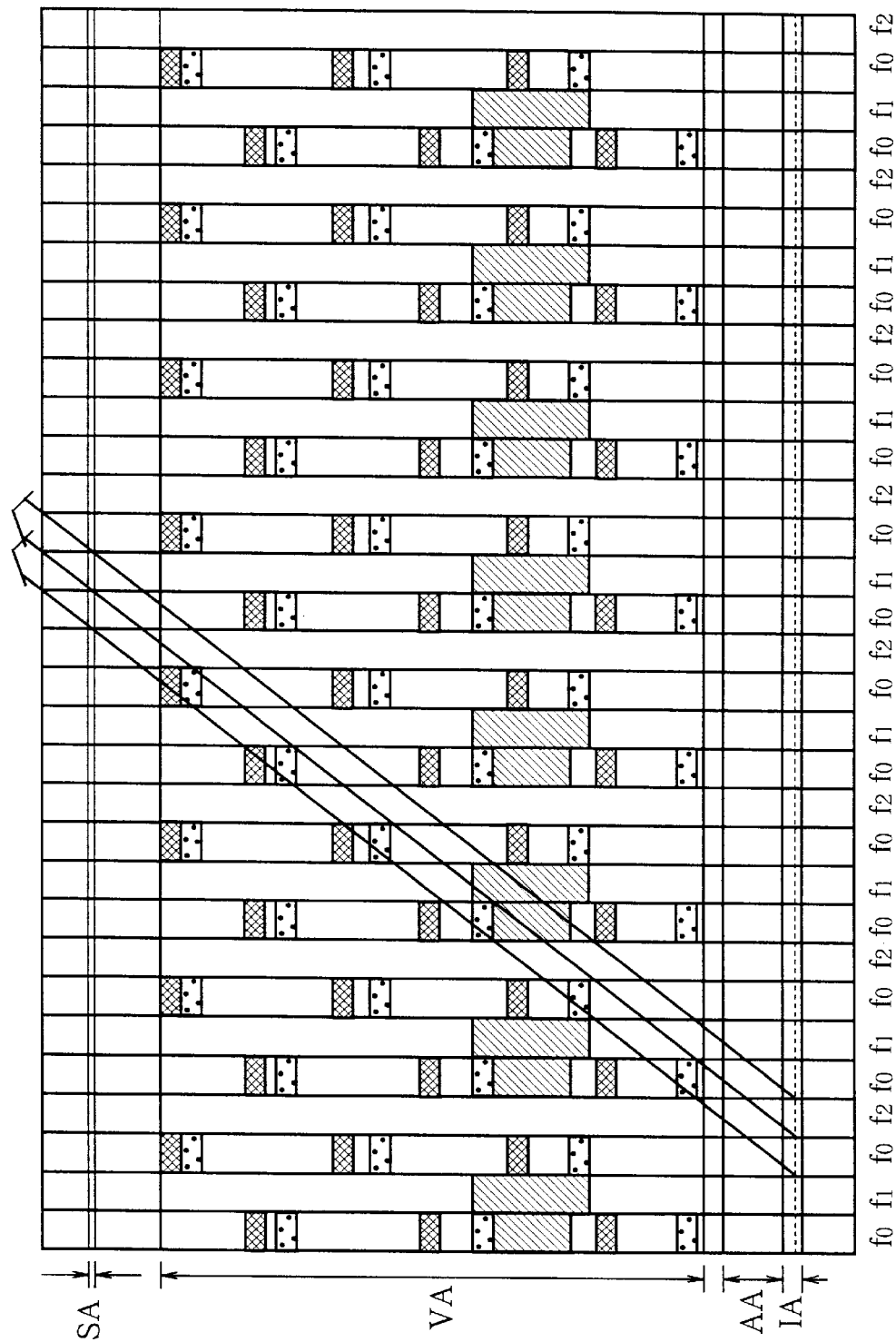
FIG. 32 shows scanning traces when 16×speed playback is performed from the recording pattern according to Embodiment B5 with a 2 channels×1 drum configuration.

FIG. 32 shows scanning traces when 16×speed playback is performed with a 2 channels×1 drum configuration. The arrows indicate scanning traces during 16×speed playback. The 16×speed playback data is recorded, being repeated eight times to form eight units of such 16×speed playback data. One of the eight units is scanned by the heads of 2 channels. It is therefore possible to reproduce 16×speed playback data recorded by the A-channel head. The head also scans the sub-code area to obtain the signals in the sub-code area. Incidentally, it is possible to apply tracking using the pilot signals recorded in the ITI areas.

Figure 33:
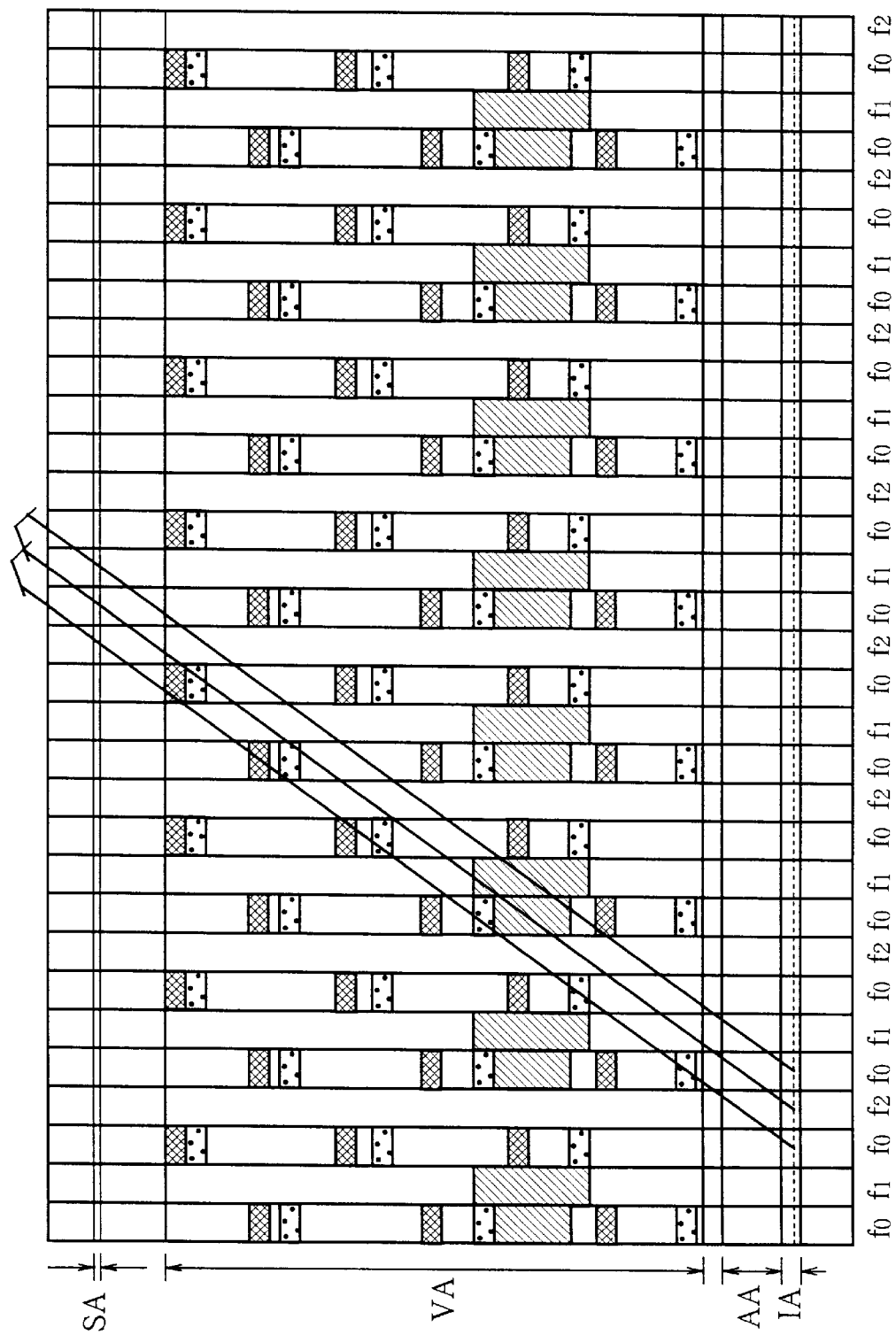
FIG. 33 shows scanning traces when 8×speed playback is performed from the recording pattern according to Embodiment B5 with a 2 channels×2 drum configuration.

FIG. 33 shows scanning traces when 8×speed playback is performed with a 2 channels×2 drum configuration. The arrows indicate scanning traces during 8×speed playback. The 16×speed playback data is recorded, being repeated eight times to form eight units of such 16×speed playback data. One of the eight units is scanned by the heads of 2 channels. It is therefore possible to reproduce, during 8×speed playback, the 16×speed playback data recorded by an A-channel head.

Figure 34:
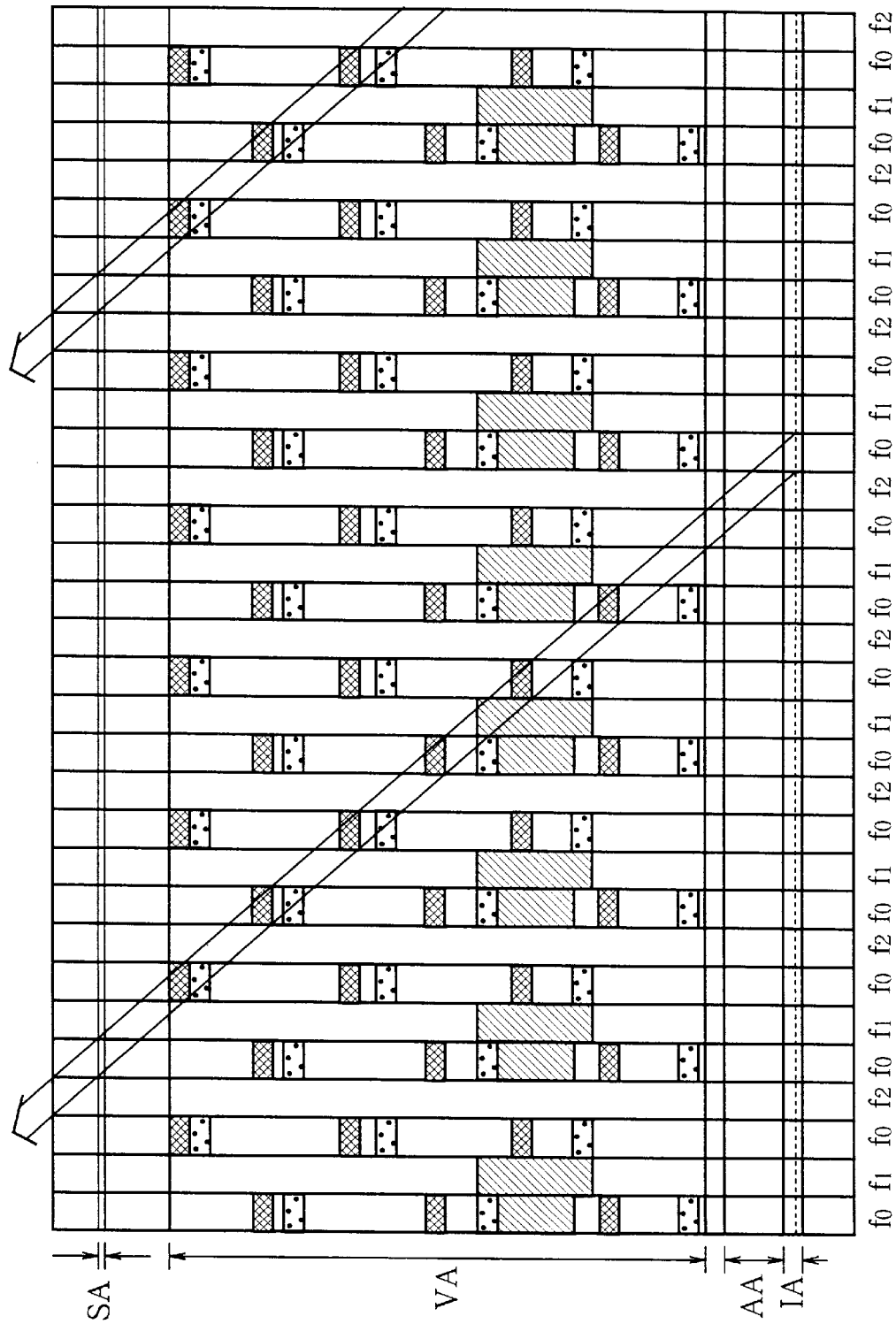
FIG. 34 shows scanning traces when −16×speed playback is performed from the recording pattern according to Embodiment B5 with a 1 channel×2 drum configuration.

FIG. 34 shows scanning traces when −16×speed playback is performed with a 1 channel×2 drum configuration. The arrows indicate scanning traces during −16×speed playback. The −16×speed playback data is recorded by an A-channel head, being repeated eight times to form eight units of such −16×speed playback data. One of the eight units is scanned by an A-channel head, while one of the other eight units is scanned by a B-channel head. It is therefore possible to reproduce −16×speed playback data recorded by the A-channel head. The head also scans the sub-code area to obtain the signals in the sub-code area. Incidentally, it is possible to apply tracking using the pilot signals recorded in the ITI areas.

Figure 35:
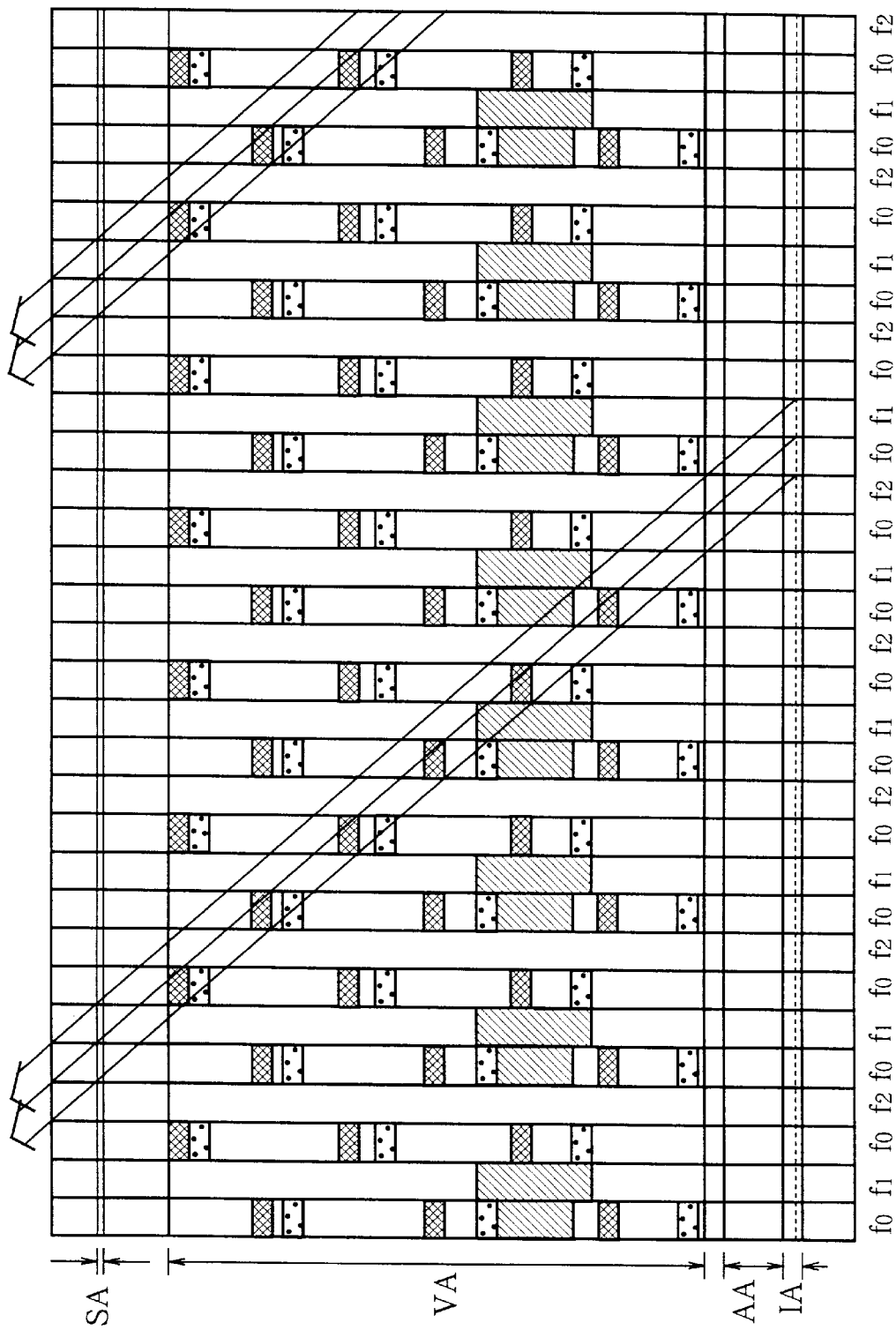
FIG. 35 shows scanning traces when −16×speed playback is performed from the recording pattern according to Embodiment B5 with a 2 channels×1 drum configuration.

FIG. 35 shows scanning traces when −16×speed playback is performed with a 2 channels×1 drum configuration. The arrows indicate scanning traces during −16×speed playback. The −16×speed playback data is recorded, being repeated eight times to form eight units of such −16×speed playback data. One of the eight units is scanned by the heads of 2 channels. It is therefore possible to reproduce −16×speed playback data recorded by the A-channel head. The head also scans the sub-code area to obtain the signals in the sub-code area. Incidentally, it is possible to apply tracking using the pilot signals recorded in the ITI areas.

Figure 36:
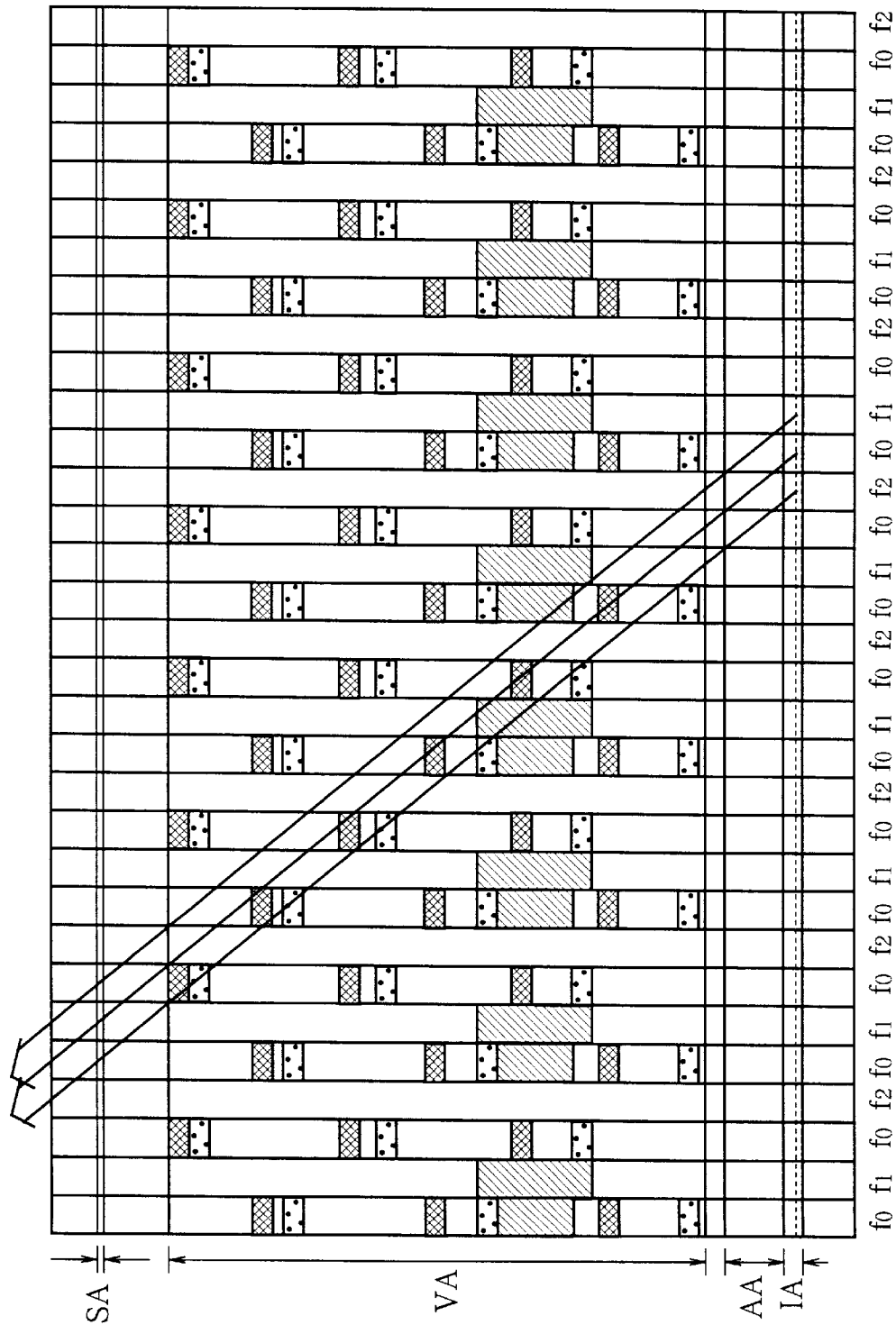
FIG. 36 shows scanning traces when −8×speed playback is performed from the recording pattern according to Embodiment B5 with a 2 channels×2 drum configuration.

FIG. 36 shows scanning traces when −8×speed playback is performed with a 2 channels×2 drum configuration. The arrows indicate scanning traces during −8×speed playback. The −16×speed playback data is recorded, being repeated eight times to form eight units of such −16×speed playback data. One of the eight units is scanned by the heads of 2 channels. It is therefore possible to reproduce, during −8×speed playback, the −16×speed playback data recorded by an A-channel head.

The signal processing during playback is identical to that described with reference to FIG. 21.

By using only the data recorded in the main areas during during normal playback, and using only the data recorded in the special playback data area during special playback for each of the playback speeds, it is possible to achieve the special playback at each of the special playback speeds.

Embodiment B7

Figure 37:
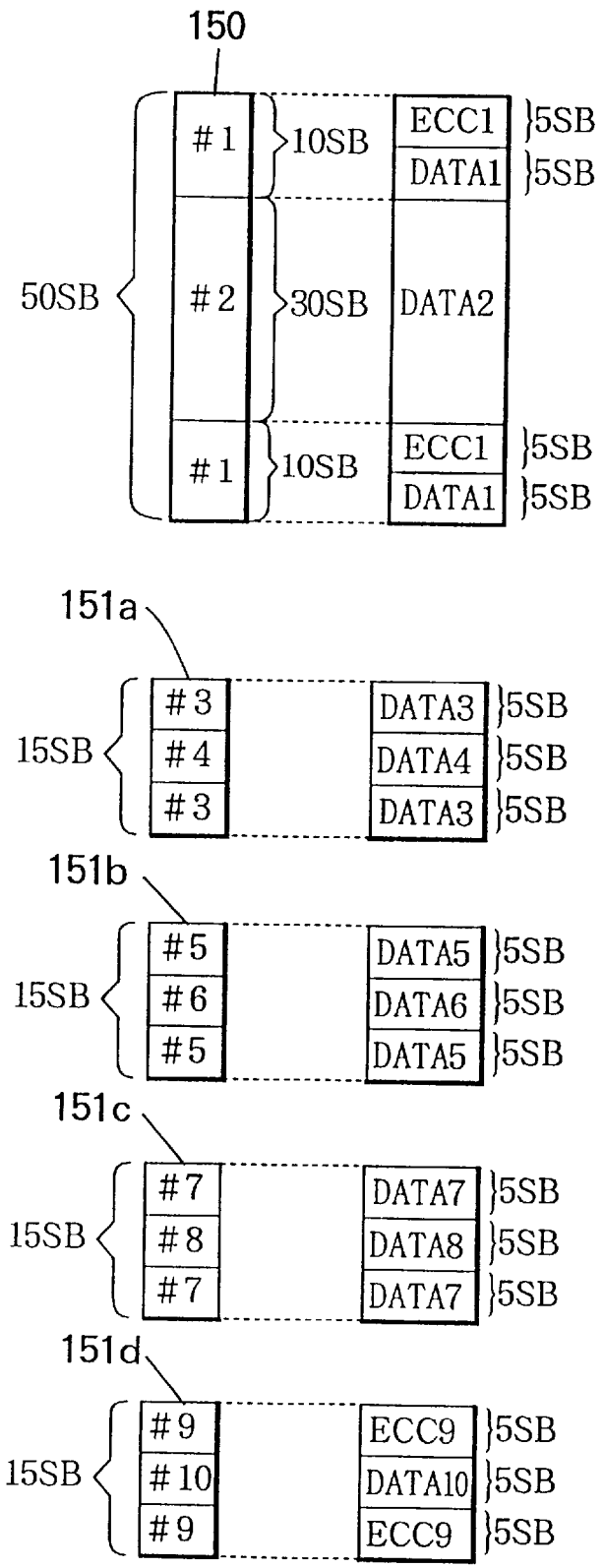
FIG. 37 shows an example of the configuration of the data containing error correction codes in special playback areas shown in FIG. 10.

Embodiment B7 relates to an example of data configuration in the special playback areas shown in FIG. 10 in connection with Embodiment B1. In the description of Embodiment B1 with reference to FIG. 10, the areas with identical numbers (#1 to #10) contain identical data. In this embodiment, description will be made of the configuration and arrangement of the image data and the error correction code (ECC) data appended to the special playback data for error correction during high-speed playback. Referring to FIG. 10, the data in subarea #1 in area 150 and subarea #3 in area 151a, subarea #5 in area 151b, the subarea #7 in area 151c, and subarea #9 in area 151d are stored in duplication. FIG. 37 shows the internal configuration of the data recorded in duplication. Each of the two subareas #1 in area 150 is formed of data #1 of 5 sync block and ECC #1 of 5 sync blocks. The subarea #2 in area 150 is formed only of data #2 of 30 sync blocks. Each of the two subarea #3 in area 151a is formed of data #3 of 5 sync blocks. The subarea #4 in area 151a is form of data #4 of 5 sync blocks. Each of the two subareas #5 in area 151b is formed of data #5 of 5 sync blocks. The subarea #6 in area 151b is formed of data #6 of 5 sync blocks. Each of the subareas #7 in area 151c is formed of data #7 of 5 sync blocks. The subarea #8 in area 151c is formed of data #8 of 5 sync blocks. Each of the two subareas #9 in area 151d is formed of ECC #9 of 5 sync blocks. The subarea #10 in area 151d is formed of data #10.

By adopting a data configuration in which the image data and ECC data are written in duplication in the duplication areas, the configuration of the error correction codes for the 4×speed data reproduced from the area 150 will be a product (40, 35, 6) Reed-Solomon code, i.e., Reed Solomon code with a code length 40, the amount of information symbols 35 and distance 6.

Figure 38:
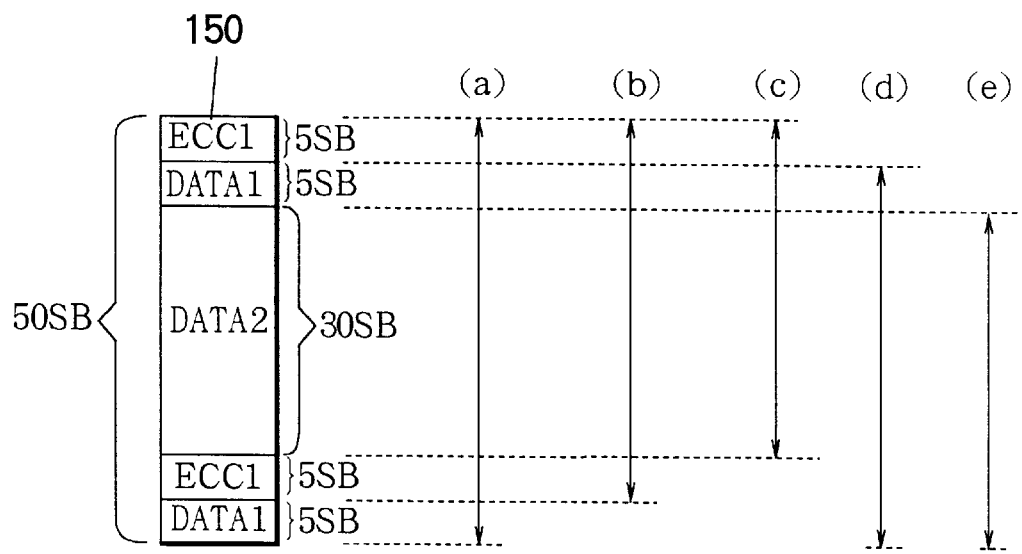
FIG. 38 and FIG. 39 show the how the data is reproduced during playback and the error correction capability at the time of such playback.

The state of reproduction and the error correction capability at the time of such playback will be described with reference to FIG. 38. The range of data which is reproduced is indicated by arrowheaded lines. When the data in the area 150 of 50 sync blocks is all reproduced as indicated at (a) in FIG. 38, then up to five errors can be corrected when the number of information is 35. When the data #1 of 5 sync blocks within area 150 at the lower end of the track is not reproduced as shown in FIG. 38 at (b), up to five errors can be corrected when the number of information is 35. When the data #1 of 5 sync blocks and ECC #1 of 5 sync blocks (i.e., ten sync blocks in all) within area 150 at the lower end of the track are not reproduced as shown in FIG. 38 at (c), up to five errors can be corrected when the number of information is 35. When the ECC #1 of 5 sync blocks within area 150 at the upper end of the track is not reproduced as shown in FIG. 38 at (d), up to five errors can be corrected when the number of information is 35. When the ECC #1 of 5 sync blocks and data #1 of 5 sync blocks (i.e., ten sync blocks in all) within area 150 at the upper end of the track are not reproduced as shown in FIG. 38 at (e), again, up to five errors can be corrected when the number of information is 35.

Figure 39:
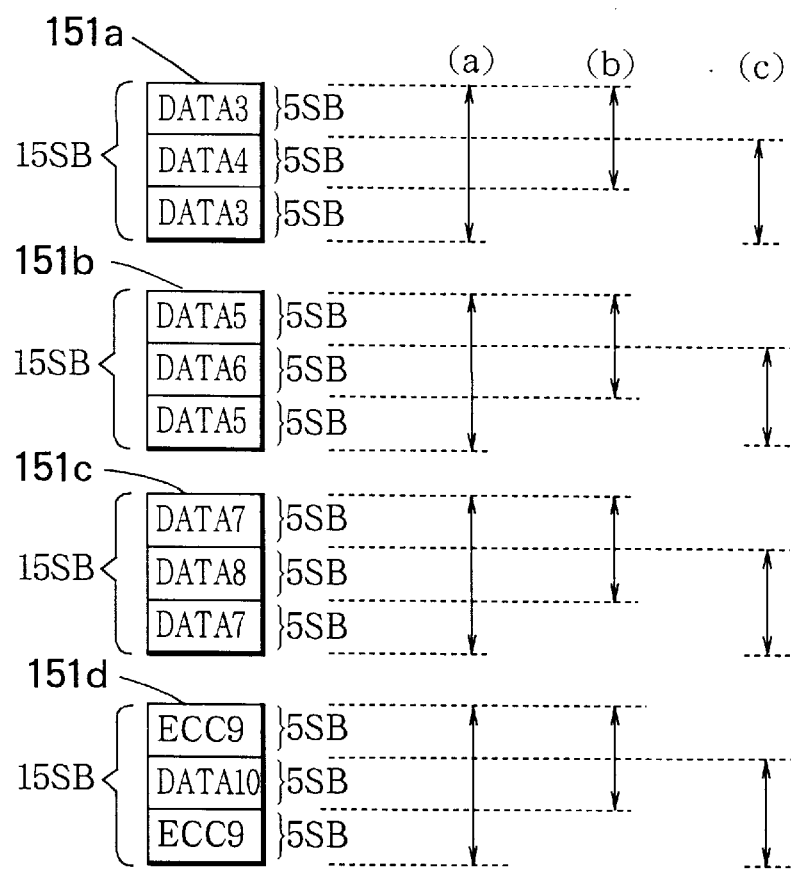

The configuration of the error correction code for 16xspeed playback data is also (40, 35, 6) Reed-Solomon code. The state of data reproduction and the error correction capability will be explained with reference to FIG. 39. The four 16xspeed data areas 151a to 151d are reproduced by one scan of the head, and it is assumed that substantially identical proportion of data is reproduced from all the areas. The arrowheaded lines indicate the range of data which is reproduced. When all the data from the areas 151a to 151d of 15 sync blocks is reproduced as shown in FIG. 39 at (a), up to five errors can be corrected when the number of information is 35. When the data from the data #3, #5 and #7 and ECC #9 in the subareas #3, #5, #7 and #9 at the lower end of the track, within the areas 151a to 151d of 15 sync blocks, are not reproduced as shown in FIG. 39 at (b), up to five errors can be corrected when the number of information is 35. When the data from the data #3, #5 and #7 and ECC #9 in the subareas #3, #5, #7 and #9 at the upper end of the track, within the areas 151a to 151d of 15 sync blocks, are not reproduced as shown in FIG. 39 at (c), up to five errors can be corrected when the number of information is 35. By adopting the data configuration, the same the ECC configuration is used for both of the 4xspeed special playback data and the 16xspeed special playback data, and the ECC circuit can be shared, so that the size of the circuitry can be reduced.

Embodiment B8

Figure 40:
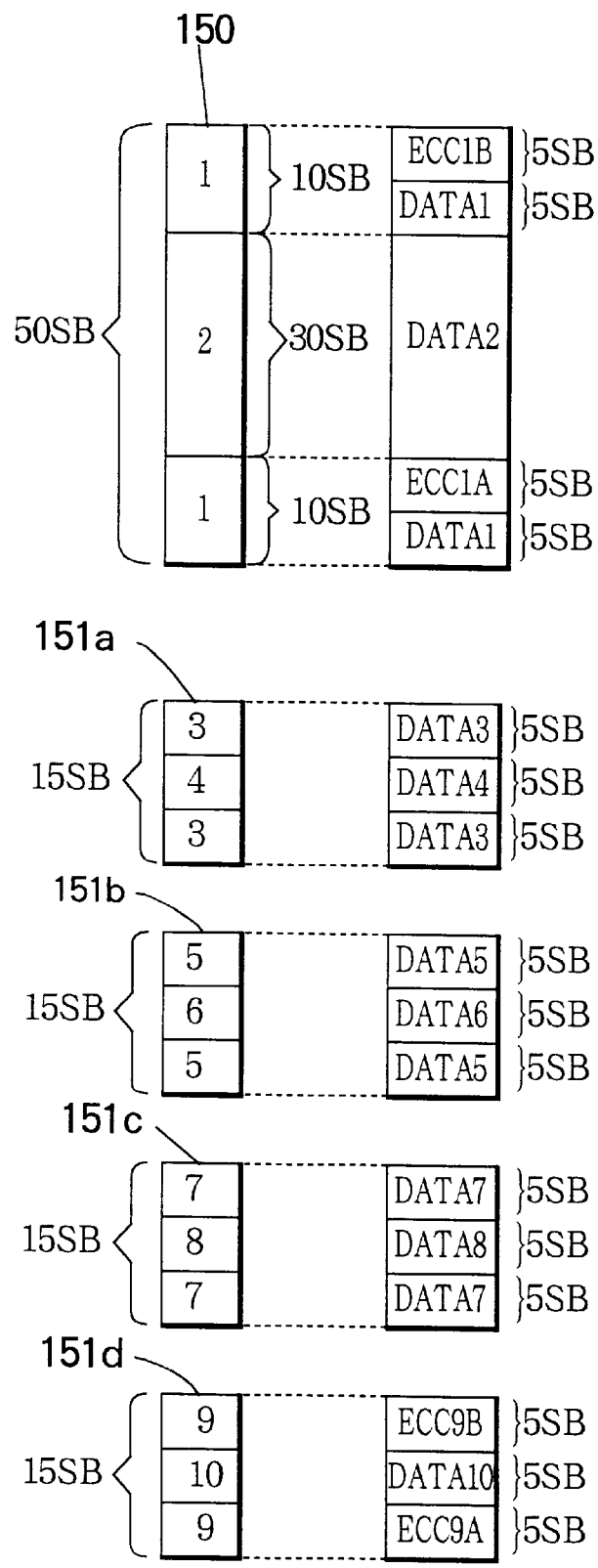
FIG. 40 shows another example of the configuration of the data containing error correction codes in special playback areas shown in FIG. 10.

Embodiment B8 relates to another example of data configuration in the special playback areas shown in FIG. 10 in connection with Embodiment B1. Referring to FIG. 40, description will be made of the configuration and arrangement of the image data and the error correction code (ECC) data for special playback. As illustrated, one of the two subareas #1 in area 150, at the lower end of the track (below the subarea #2) is formed of data #1 of 5 sync block and ECC #1A of 5 sync blocks. The other of the two subareas #1 in area 150, at the upper end of the track (above the subarea #2) is formed of data #1 of 5 sync block and ECC #1B of 5 sync blocks. The ECC #1A and ECC #1B are different ECC data. The subarea #2 in area 150 is formed only of data #2 of 30 sync blocks. Each of the two subarea #3 in area 151a is formed of data #3 of 5 sync blocks. The subarea #4 in area 151a is form of data #4 of 5 sync blocks. Each of the two subareas #5 in area 151b is formed of data #5 of 5 sync blocks. The subarea #6 in area 151b is formed of data #6 of 5 sync blocks. Each of the subareas #7 in area 151c is formed of data #7 of 5 sync blocks. The subarea #8 in area 151c is formed of data #8 of 5 sync blocks. One of the two subareas #9 in area 151d at the lower end of the track (below the subarea #10) is formed of ECC #9A of 5 sync blocks. The other of the two subareas #9 in area 151d at the upper end of the track (above the subarea #10) is formed of ECC #9B of 5 sync blocks. The ECC #9A and ECC #9B are different ECC data. The subarea #10 in area 151d is formed of data #10.

By adopting a data configuration in which the image data is written in duplication in the duplication areas, while the identical ECC data is written just once, the configuration of the error correction codes for the 4xspeed data reproduced from the area 150 will be a product (45, 35, 11) Reed-Solomon code, i.e., Reed Solomon code with a code length 45, the amount of information symbols 35 and distance 11.

Figure 41:
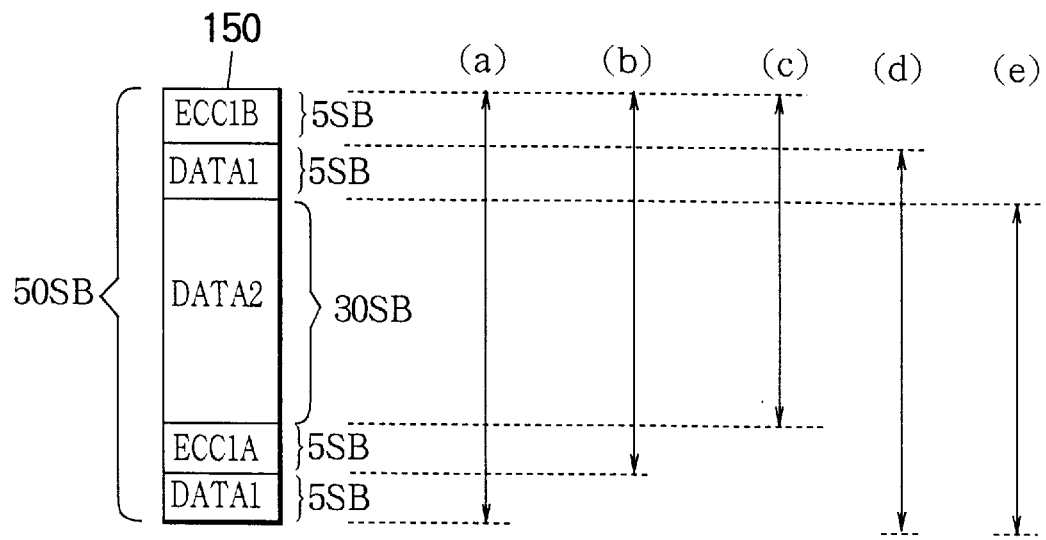
FIG. 41 and FIG. 42 show the how the data is reproduced during playback and the error correction capability at the time of such playback.

The state of reproduction and the error correction capability at the time of such playback will be described with reference to FIG. 41. The range of data which is reproduced is indicated by arrowheaded lines. When the data in the area 150 of 50 sync blocks is all reproduced as indicated at (a) in FIG. 41, then up to ten errors can be corrected when the number of information is 35. When the data #1 of 5 sync blocks within area 150 at the lower end of the track is not reproduced as shown in FIG. 41 at (b), up to ten errors can be corrected when the number of information is 35. When the data #1 of 5 sync blocks and ECC #1A of 5 sync blocks (i.e., ten sync blocks in all) within area 150 at the lower end of the track are not reproduced as shown in FIG. 41 at (c), up to five errors can be corrected when the number of information is 35. When the ECC #1B of 5 sync blocks within area 150 at the upper end of the track is not reproduced as shown in FIG. 41 at (d), up to five errors can be corrected when the number of information is 35. When the ECC #1B of 5 sync blocks and data #1 of 5 sync blocks (i.e., ten sync blocks in all) within area 150 at the upper end of the track are not reproduced as shown in FIG. 41 at (e), again, up to five errors can be corrected when the number of information is 35.

Figure 42:
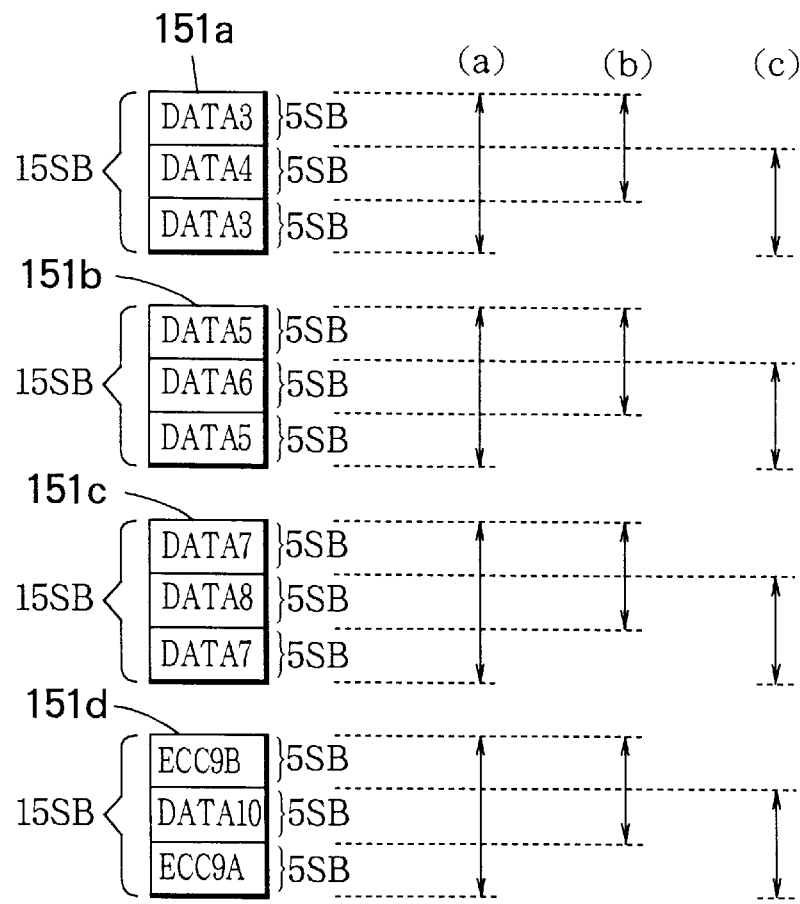

The configuration of the error correction code for 16xspeed playback data is also (45, 35, 11) Reed-Solomon code. The state of data reproduction and the error correction capability will be explained with reference to FIG. 42. The four 16xspeed data areas 151a to 151d are reproduced by one scan of the head, and it is assumed that substantially identical proportion of data is reproduced from all the areas. The arrowheaded lines indicate the range of data which is reproduced. When all the data from the areas 151a to 151d of 15 sync blocks is reproduced as shown in FIG. 42 at (a), up to ten errors can be corrected when the number of information is 35. When the data from the data #3, #5 and #7 and ECC #9A in the subareas #3, #5, #7 and #9 at the lower end of the track, within the areas 151a to 151d of 15 sync blocks, are not reproduced as shown in FIG. 42 at (b), up to five errors can be corrected when the number of information is 35. When the data from the data #3, #5 and #7 and ECC #9B in the subareas #3, #5, #7 and #9 at the upper end of the track, within the areas 151a to 151d of 15 sync blocks, are not reproduced as shown in FIG. 42 at (c), up to five errors can be corrected when the number of information is 35. By adopting the data configuration as described above, the same the ECC configuration is used for both of the 4xspeed special playback data and the 16xspeed special playback data, and the ECC circuit can be shared, so that the size of the circuitry can be reduced.

Embodiment B9

Figure 43:
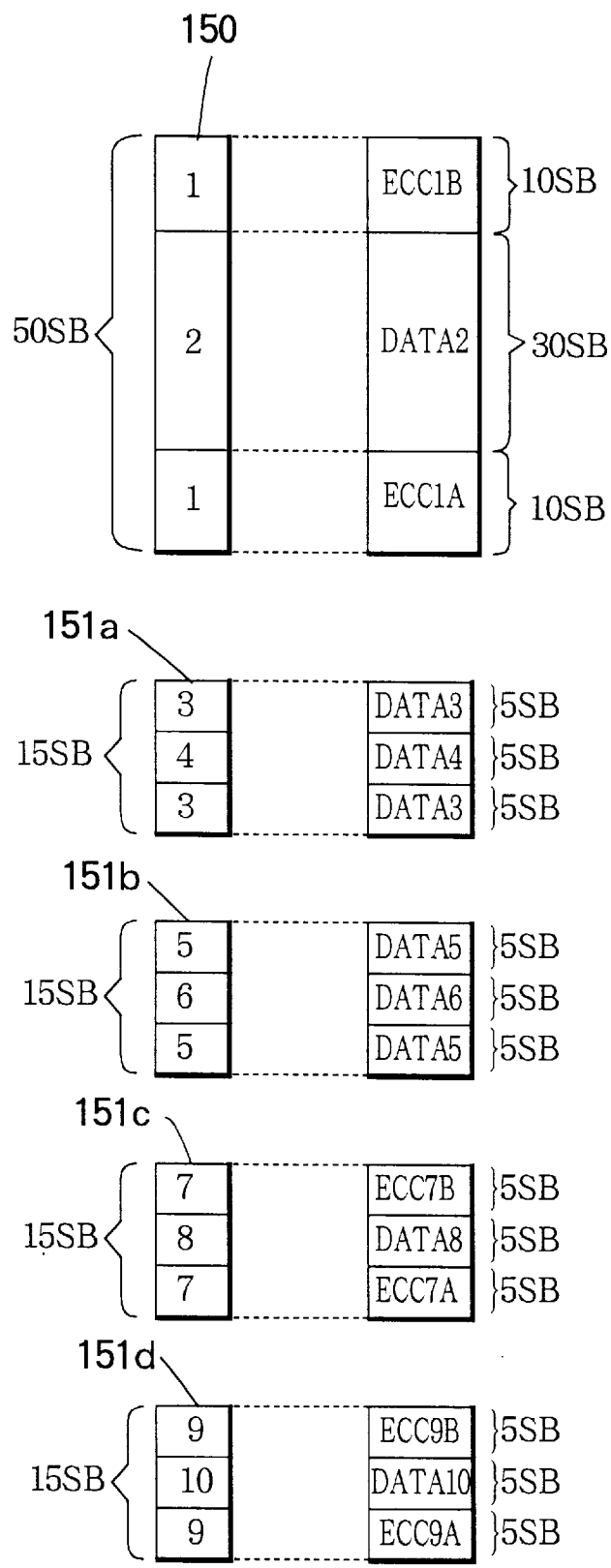
FIG. 43 shows another example of the configuration of the data containing error correction codes in special playback areas shown in FIG. 10.

Embodiment B9 relates to another example of data configuration in the special playback areas shown in FIG. 10 in connection with Embodiment B1. Referring to FIG. 43, description will be made of the configuration and arrangement of the image data and the error correction code (ECC) data for special playback. As illustrated, one of the two subareas #1 in area 150, at the lower end of the track (below the subarea #2) is formed of ECC #1A of 10 sync blocks. The other of the two subareas #1 in area 150, at the upper end of the track (above the subarea #2) is formed of ECC

1B of 10 sync blocks. The ECC #1A and ECC #1B are different ECC data. The subarea #2 in area 150 is formed only of data #2 of 30 sync blocks. Each of the two subarea #3 in area 151*a* is formed of data #3 of 5 sync blocks. The subarea #4 in area 151*a* is form of data #4 of 5 sync blocks. Each of the two subareas #5 in area 151*b* is formed of data #5 of 5 sync blocks. The subarea #6 in area 151*b* is formed of data #6 of 5 sync blocks. One of the two subareas #7 in area 151*c,* at the lower end of the track (below the subarea #8) is formed of ECC #7A of 5 sync blocks. The other of the two subareas #7 in area 151*c,* at the upper end of the track (above the subarea #8) is formed of ECC #7B of 5 sync blocks. The ECC #7A and ECC #7B are different ECC data. The subarea #8 in area 151*c* is formed of data #8 of 5 sync blocks. One of the two subareas #9 in area 151*d* at the lower end of the track (below the subarea #10) is formed of ECC #9A of 5 sync blocks. The other of the two subareas #9 in area 151*d* at the upper end of the track (above the subarea #10) is formed of ECC #9B of 5 sync blocks. The ECC #9A and ECC #9B are different ECC data. The subarea #10 in area 151*d* is formed of data #10.

By adopting a data configuration in which the image data and ECC data is written just once, the configuration of the error correction codes for the 4×speed data reproduced from the area 150 will be a product (50, 30, 21) Reed-Solomon code, i.e., Reed Solomon code with a code length 50, the amount of information symbols 30 and distance 21.

Figure 44:
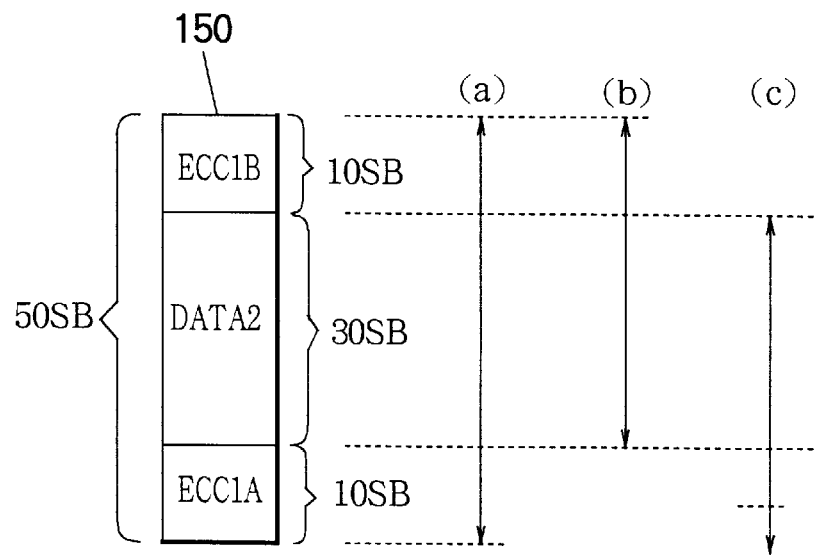
FIG. 44 and FIG. 45 show the how the data is reproduced during playback and the error correction capability at the time of such playback.

The state of reproduction and the error correction capability at the time of such playback will be described with reference to FIG. 44. The range of data which is reproduced is indicated by arrowheaded lines. When the data in the area 150 of 50 sync blocks is all reproduced as indicated at (a) in FIG. 44, then up to twenty errors can be corrected when the number of information is 30. When the ECC #1A of 10 sync blocks within area 150 at the lower end of the track is not reproduced as shown in FIG. 44 at (b), up to ten errors can be corrected when the number of information is 30. When the ECC #1B of 10 sync blocks within area 150 at the upper end of the track is not reproduced as shown in FIG. 44 at (c), up to ten errors can be corrected when the number of information is 30.

Figure 45:
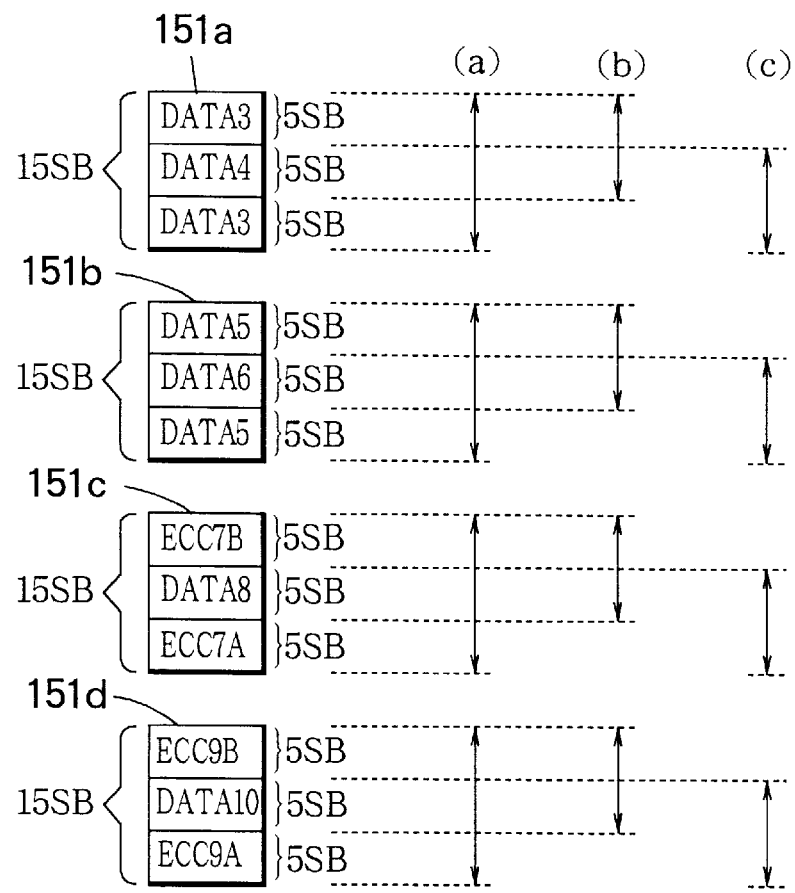
Figure 46:
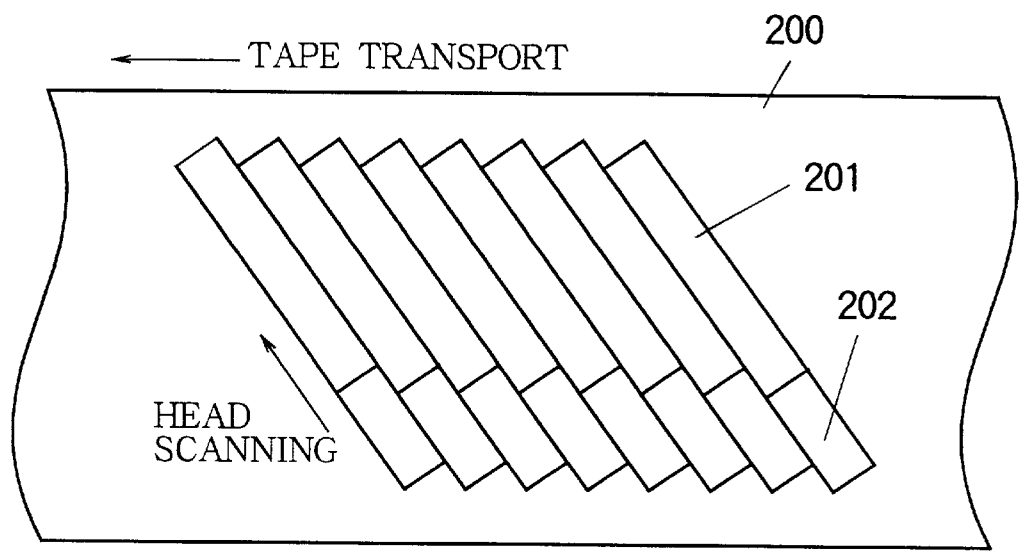
FIG. 46 shows the track pattern of an ordinary consumer digital VTR.
Figure 47A:
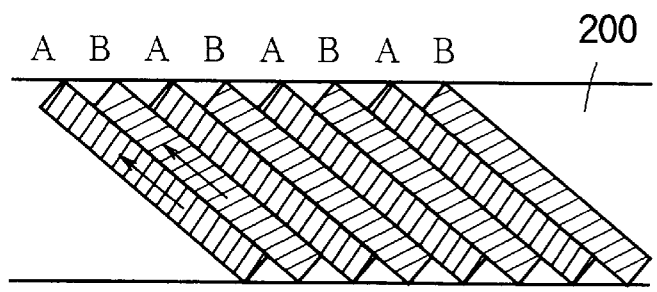
FIG. 47A and FIG. 47B are diagrams showing head scanning traces of a rotary head during normal playback and fast playback in a conventional digital VTR.
Figure 47B:
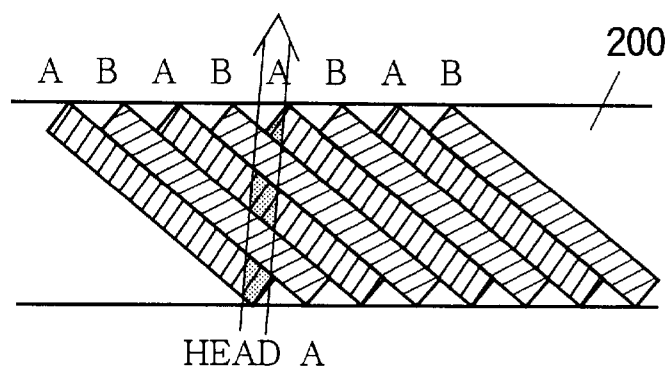
Figure 48:
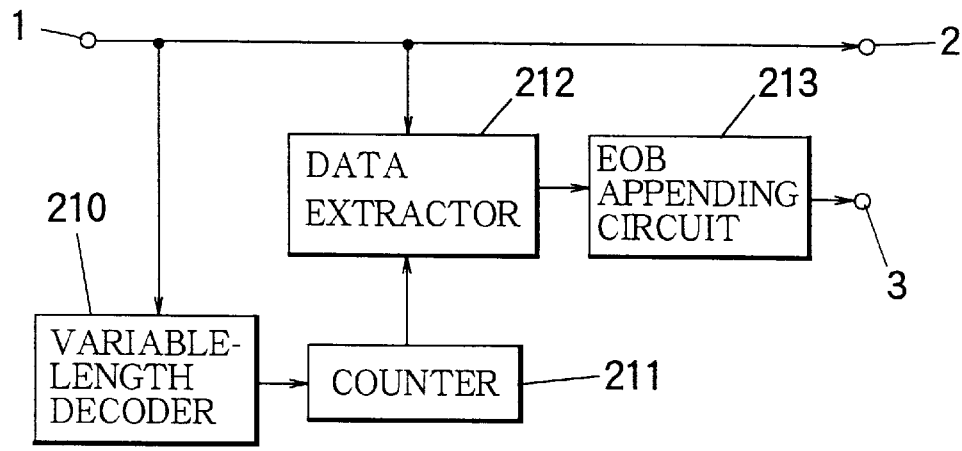
FIG. 48 is a block diagram of a conventional bit stream recording device that is capable of fast playback.

The configuration of the error correction code for 16×speed playback data is also (50, 30, 11) Reed-Solomon code. The state of data reproduction and the error correction capability will be explained with reference to FIG. 45. The four 16×speed data areas 151*a* to 151*d* are reproduced by one scan of the head, and it is assumed that substantially identical proportion of data is reproduced from all the areas. The arrowheaded lines indicate the range of data which is reproduced. When all the data from the areas 151*a* to 151*d* of 15 sync blocks is reproduced as shown in FIG. 45 at (a), up to twenty errors can be corrected when the number of information is 30. When the data from the data #3 and #5, and ECC #7A and #9A in the subareas #3, #5, #7 and #9 at the lower end of the track, within the areas 151*a* to 151*d* of 15 sync blocks, are not reproduced as shown in FIG. 45 at (b), up to ten errors can be corrected when the number of information is 30. When the data from the data 43 and #5, and ECC #7 and #9B in the subareas #3, #5, #7 and #9 at the upper end of the track, within the areas 151*a* to 151*d* of 15 sync blocks, are not reproduced as shown in FIG. 45 at (c), up to ten errors can be corrected when the number of information is 30. By adopting the data configuration, the same the ECC configuration is used for both of the 4×speed special playback data and the 16×speed special playback data, and the ECC circuit can be shared, so that the size of the circuitry can be reduced.

In Embodiments B7 to B9, the ECC data in the special playback data areas is assumed to be disposed at both ends of the data areas for each of the special playback speeds. The invention is not limited to such disposition, and the ECC data may be disposed at the center of the data areas for each of the special playback speeds, e.g., in subarea #2 for the case of 4×speed playback area in FIG. 10) where the special playback data is written just once.

In Embodiments B7 to B9, the recording format of Embodiment B1 is adopted. This however should not be taken only as a limitation. The data configuration described in connection with Embodiments B7 to B9 is applicable to other recording format, e.g., that described in connection with Embodiment B5.

What is claimed is:

1. A digital VTR which receives at least a digital video signal input in the form of a bit stream, and which records the bit stream in a transparent recording method comprising:

header extracting means for extracting header information from the bit stream;

block extracting means for detecting and extracting intra-coded block components from the bit stream; and means for configuring one track with an area for recording the input bit stream and an area for recording fast playback HP data;

said block extracting means extracting, as said intra-coded block components, a predefined number of orthogonal transform coefficients; and said configuring means configuring the fast playback HP data without address pointers, which point to addresses in a decoder memory, and without appending EOB codes to said intra-coded block components.

2. The digital VTR according to claim 1, wherein said block extracting means extracts only the DC components of the orthogonal transform coefficients, as said intra-coded block components.

3. The digital VTR according to claim 1, wherein components of a playback bit stream formed from HP data during fast playback is made up of a predefined number of orthogonal transform coefficients, and said VTR further comprises means for playing back by appending EOB codes to said components of the playback bit stream.

4. The digital VTR according to claim 1, further comprising means for separating the bit stream into a bit stream from a main area and a bit stream from a duplication area, and transmitting the bit stream from one of the main area and the duplication area to a decoder depending on a playback mode.

5. A digital VTR which receives at least a digital video signal input in the form of a bit stream, formed of variable-length codes, and which records the bit stream in a transparent recording method, comprising:

header extracting means for extracting header information from the bit stream;

block extracting means for detecting and extracting intra-coded block components from the bit stream; and means for configuring one track with an area for recording the input bit stream and an area for recording fast playback HP data, said block extracting means extracting, as said intra-coded block components, a predefined number of variable-length codes; and said configuring means configuring the fast playback HP data without address pointers, which point to addresses in a decoder memory, and without appending EOB codes to said intra-coded block components.

6. The digital VTR according to claim 5, wherein intra-coded block components of a playback bit stream formed from the fast playback HP data during fast playback is made up of a predefined number of orthogonal transform coefficients, and said VTR further comprises means for playing back by appending EOB codes to said intra-coded block components of the playback bit stream.

7. The digital VTR according to claim 5, further comprising means for separating the playback bit stream into a bit stream from a main area and a bit stream from a duplication area, and transmitting the bit stream from one of the main area and the duplication area to a decoder depending on a playback mode.

8. A digital VTR which receives at least a digital video signal input in the form of a bit stream, formed by variable-length coding using a plurality of code maps, and which records the bit stream in a transparent recording method, comprising:

header extracting means for extracting header information from the bit stream;

means for modifying the header information;

block extracting means for detecting and extracting intra-coded block components from the bit stream; and means for configuring one track with an area for recording the input bit stream and an area for recording fast playback HP data;

said block extracting means extracting, as said intra-coded block components, a predefined number of orthogonal transform coefficients, and said configuring means selecting a shortest EOB code from said plurality of code maps, and configuring the fast playback HP data by appending the selected EOB code to said intra-coded block components.

9. The digital VTR according to claim 8, wherein said block extracting means extracts only the DC components of the orthogonal transform coefficients, as said intra-coded block components.

10. The digital VTR according to claim 8, wherein said header information modifying means modifies at least a signal in the header identifying the code map used by the input bit stream, into a signal indicating the code map containing the shortest EOB code.

11. A digital VTR which receives at least a digital video signal input in the form of a bit stream, formed by variable-length coding using a plurality of code maps, and which records the bit stream in a transparent recording method, comprising:

header extracting means for extracting header information from the bit stream;

means for modifying the header information;

block extracting means for detecting and extracting intra-coded block components from the bit stream; and means for configuring one track with an area for recording the input bit stream and an area for recording fast playback HP data;

said block extracting means extracting, as said intra-coded block components, a predefined number of variable-length codes; and said configuring means selecting a shortest EOB code from said plurality of code maps, and configuring the fast playback HP data by appending the selected EOB code to said intra-coded block components.

12. The digital VTR according to claim 11, wherein said header information modifying means modifies at least a signal in the header identifying the code map used by the input bit stream, into a signal indicating the code map containing the shortest EOB code.

13. A magnetic recording/playback device recording signals along helical tracks formed on a magnetic tape by means of a rotary drum with heads having two different azimuths mounted thereon, comprising:

means for extracting fast playback signals from normal recording signals;

fast playback signal recording means for recording the fast playback signals in predefined regions on predefined tracks, said fast playback signals including a first playback signal used for playback at a first speed and a second playback signal used for playback at a second speed which is higher than said first speed, said fast playback signal recording means recording said first playback signal in an area at one location on one track per one scan of the head, within a first region of a track of a first azimuth, and recording said second playback signal for said second speed in a plurality of areas on one track per one scan of the head, within a second region of a track of a second azimuth; and means for recording identification signals for identifying the tracks on which the fast playback signals are recorded.

14. A magnetic recording/playback device according to claim 13, wherein said first speed is an even multiple of a normal playback speed, and said second speed is also an even multiple of the normal playback speed.

15. A magnetic recording/playback device according to claim 14, wherein during playback at each of the playback speed, the head scans a tracking signal area and sub-code area.

16. A magnetic recording/playback device according to claim 15, further comprising:

means for reproducing the identification signals.

17. A magnetic recording/playback device recording signals along helical tracks formed on a magnetic tape by means of a rotary drum with heads having two different azimuths mounted thereon, comprising:

means for extracting fast playback signals from normal recording signals;

fast playback signal recording means for recording the fast playback signals in predefined regions on predefined tracks, said fast playback signals including a first playback signal used for playback at a first speed and a second playback signal used for playback at a second speed which is higher than said first speed, a first region for recording the first playback signal being substantially equally divided into five sections, and a second region for recording the second playback signal being substantially equally divided into three sections, signals containing different error correction code data and identical image data being recorded in sections at both ends of said first region, and different error correction code data being recorded in sections at both ends of said second region; and means for recording identification signals for identifying the tracks on which the fast playback signals are recorded.

18. A magnetic recording/playback device recording signals along helical tracks formed on a magnetic tape by means of a rotary drum with heads having two different azimuths mounted thereon, comprising:

means for extracting fast playback signals from normal recording signals;

fast playback signal recording means for recording the fast playback signals in predefined regions on predefined tracks, said fast playback signals including a first playback signal used for playback at a first speed and a second playback signal used for playback at a second speed which is higher than said first speed, a first region for recording the first playback signal being substantially equally divided into five sections, and a second region for recording the second playback signal being substantially equally divided into three sections, different error correction code data being recorded in sections at both ends of said first region, and different error correction code data being recorded in sections at both ends of said second region; and means for recording identification signals for identifying the tracks on which the fast playback signals are recorded.

19. A magnetic recording/playback device recording signals along helical tracks formed on a magnetic tape by means of a rotary drum with heads having two different azimuths mounted thereon, comprising:

means for extracting fast playback signals from normal recording signals;

fast playback signal recording means for recording the fast playback signals in predefined regions on redefined tracks, said fast playback signals including a first playback signal used for playback at a first speed and a second playback signal used for playback at a second speed which is higher than said first speed, said fast playback signals being recorded on a trace position intermediate a first head scanning position by means of two heads at a speed 2n (n being an even multiple) times the normal playback speed and a second head scanning position by means of four heads at a speed n times the normal playback speed, with said heads having two different azimuths; and means for recording identification signals for identifying the tracks on which the fast playback signals are recorded.

20. A magnetic recording/playback device recording signals along helical tracks formed on a magnetic tape by means of a rotary drum with heads having two different azimuths mounted thereon, comprising:

means for extracting fast playback signals from normal recording signals;

fast playback signal recording means for recording the fast playback signals in predefined regions on predefined tracks such that a first region on a track of a first azimuth for recording a first signal used for playback at a first speed is larger than a second region on a track of a second azimuth for recording a second signal used for playback at a second speed higher than said first speed, and said first and second regions are provided with copy areas where identical data is recorded in duplication; and means for recording identification signals for identifying the tracks on which the fast playback signals are recorded.

21. A magnetic recording/playback device according to claim 20, wherein the copy areas provided at both ends of said first and second regions for recording signals in duplication are provided in greater numbers toward edges of the magnetic tape.

22. A magnetic recording/playback device according to claim 20, wherein the first region is provided at both ends with sections as the copy areas, and the second region is provided at both ends with sections as the copy areas.

23. A magnetic recording/playback device according to claim 22, wherein identical signals consisting of error correction code data and image are data recorded in said sections at both ends of the first region, and identical error correction code data is recorded in said sections at both ends of the second region.

24. A magnetic recording/playback device according to claim 22, wherein signals containing different error correction code data and identical image data are recorded in said sections at both ends of the first region, and different error correction code data are recorded in said sections at both ends of the second region.

25. A magnetic recording/playback device according to claim 22, wherein different error correction code data are recorded in said sections at both ends of the first region, and different error correction code data are recorded in said sections at both ends of the second region.

26. A magnetic recording/playback device according to claim 24, wherein said copy areas have a size of five sync blocks or a multiple thereof.

27. A magnetic recording/playback device recording signals along helical tracks formed on a magnetic tape by means of a rotary drum with heads having two different azimuths mounted thereon, comprising:

means for extracting fast playback signals from normal recording signals;

fast playback signal recording means for recording the fast playback signals in predefined regions on predefined tracks, said fast playback signals including a first playback signal used for playback at a first speed, a second playback signal used for playback in a forward direction at a second speed which is higher than said first speed, and a third playback signal used for playback in a reverse direction at a third speed which is higher than said first speed, said fast playback signal recording means recording said first playback signal in an area at one location on one track per one scan of a head, within a region of a track of a first azimuth, said second playback signal in a plurality of areas on one track per one scan of a head, within a region of a track of a second azimuth, and said third playback signal in a plurality of areas on one track per one scan of a head, within a region of a track of said second azimuth; and means for recording identification signals for identifying the tracks on which the fast playback signals are recorded.

28. A magnetic recording/playback device according to claim 27, wherein said first speed is an even multiple of a normal playback speed, and said second speed is also an even multiple of the normal playback speed.

29. A magnetic recording/playback device recording signals along helical tracks formed on a magnetic tape by means of a rotary drum with heads having two different azimuths mounted thereon, comprising:

means for extracting fast playback signals from normal recording signals;

fast playback signal recording means for recording the fast playback signals in a predefined region on a predefined track based on the position of the predefined track within a unit formed by a predetermined number of tracks, said fast playback signals including a first playback signal used for playback at a first speed and a second playback signal used for playback at a second speed which is higher than said first speed; and means for recording a tracking signal on said predefined track for identifying the predefined track within each unit on which the fast playback signals are recorded, said tracking signal including a plurality of different types of pilot signals, said pilot signals allocated periodically to corresponding predefined tracks in the unit so that during playback at each of the first and second playback speeds, the predefined track is identified by detecting the pilot signals of adjacent tracks.

30. The magnetic recording/playback device according to claim 29, wherein during playback at each of the first and second playback speeds, the head scans a sub-code area based on said tracking signal and reproduces at least one of time information and item number information for head-of-item finding from said sub-code area to perform tracking control and head-of-item finding.

31. The magnetic recording/playback device according to claim 29, wherein each unit is formed by four tracks.

32. The magnetic recording/playback device according to claim 29, wherein said pilot signals include three different types of pilot signals.

33. The magnetic recording/playback device according to claim 29, wherein during tracking control in fast playback, a head follows a trace inclined with respect to the tracks and scans a tracking signal area of a specific one of the tracks in each unit.

34. A magnetic recording/playback device recording signals along helical tracks formed on a magnetic tape by means of a rotary drum with heads having two different azimuths mounted thereon, comprising:

means for extracting fast playback signals from normal recording signals;

fast playback signal recording means for recording the fast playback signals in predefined regions on predefined tracks such that a first region for recording a first playback signal for playback at a first speed on a track of a first azimuth is provided a second region for recording a second playback signal for playback at the first speed on a subsequent track of a second azimuth is provided, a length of the second region being about twice the length of the first region, and a center of the second region in the subsequent track of the second azimuth and a center of the first region in the track of the first azimuth are about the same; and means for recording identification signals for identifying the tracks on which the fast playback signals are recorded.

35. A magnetic recording/playback device recording signals along helical tracks formed on a magnetic tape by means of a rotary drum with heads having two different azimuths mounted thereon, comprising:

means for extracting fast playback signals from normal recording signals;

fast playback signal recording means for recording the fast playback signals in predefined regions on predefined tracks, said fast playback signals including a first and second playback signal, said first playback signal being recorded in a first region, said second playback signal being recorded in a second region, said second region being substantially equally divided into three sections, and the first playback signal recorded in said first region being same as the second playback signal recorded in the sections at both ends of said second region; and means for recording identification signals for identifying the tracks on which the fast playback signals are recorded.

36. A magnetic recording/playback device recording signals along helical tracks formed on a magnetic tape by means of a rotary drum with heads having two different azimuths mounted thereon, comprising:

means for extracting fast playback signals from normal recording signals;

fast playback signal recording means for recording the fast playback signals in predefined regions on predefined tracks, said fast playback signals for predefined speeds being disposed at predefined positions on predefined tracks in M consecutive tracks, and the fast playback signals being recorded, repeatedly, taking the M tracks as a unit, and a plurality of the fast playback signals, for playback at M×n (n being a positive integer) times the normal playback speed, being recorded, and a signal for each of the M×n speeds being repeated 2×n times, taking the M tracks as a unit; and means for recording identification signals for identifying the tracks on which the fast playback signals are recorded.

37. A magnetic recording/playback device according to claim 36, wherein M is 4, and pilot signals consisting of repetitions of three types of frequency signals f0, f1 and f2 for control over tape speed are used.

38. A magnetic recording/playback device according to claim 37, wherein playback at a speed which is an arbitrary even multiple of the normal playback speed and which is not larger than (M×n) is performed using a signal recorded as an M×n speed playback signal.

* * * * *